United States Patent
Mitsui et al.

(10) Patent No.: US 9,311,648 B2
(45) Date of Patent: Apr. 12, 2016

(54) ADVERTISEMENT SERVER DEVICE, ADVERTISEMENT DISPLAY METHOD, AND ADVERTISEMENT SERVER PROGRAM

(75) Inventors: Shingo Mitsui, Shinagawa-ku (JP); Hikaru Mizutani, Shinagawa-ku (JP); Kanetsune Yoshida, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 1008 days.

(21) Appl. No.: 12/600,268

(22) PCT Filed: Mar. 21, 2008

(86) PCT No.: PCT/JP2008/055270
§ 371 (c)(1),
(2), (4) Date: Mar. 5, 2010

(87) PCT Pub. No.: WO2008/139782
PCT Pub. Date: Nov. 20, 2008

(65) Prior Publication Data
US 2010/0161417 A1    Jun. 24, 2010

(30) Foreign Application Priority Data
May 16, 2007 (JP) .................................. 2007-130999

(51) Int. Cl.
G06Q 30/00 (2012.01)
G06Q 30/02 (2012.01)

(52) U.S. Cl.
CPC ............ *G06Q 30/02* (2013.01); *G06Q 30/0256* (2013.01); *G06Q 30/0273* (2013.01); *G06Q 30/0275* (2013.01); *G06Q 30/0244* (2013.01); *G06Q 30/0277* (2013.01)

(58) Field of Classification Search
CPC .......... G06Q 30/0244; G06Q 30/0256; G06Q 30/0273; G06Q 30/0275; G06Q 30/0277

USPC ........... 705/14.54, 14.43, 14.69, 14.71, 14.73
See application file for complete search history.

(56) References Cited

U.S. PATENT DOCUMENTS 5,974,398 A * 10/1999 Hanson et al. ............. 705/14.64
6,016,478 A *  1/2000 Zhang .............. G06Q 10/06314
                                                              705/7.19

(Continued)

FOREIGN PATENT DOCUMENTS

| JP | 2002-026844 | 1/2002 |
|---|---|---|
| JP | 2003-228676 | 8/2003 |

(Continued)

*Primary Examiner* — Bennett Sigmond
(74) *Attorney, Agent, or Firm* — Paul A. Guss

(57) ABSTRACT

An advertisement server device 1 includes: a bid advertisement frame display means 34 for generating a bid information registration page 500 for causing an advertiser terminal device 3-$k$ to display one or more advertisement frames each of which corresponds to a search word and has a specified display position on a search result page 800, together with a bid status of each of the advertisement frames; a bid amount acceptance means 35 for accepting a bid amount for each advertisement placement period, for a designated advertisement frame; and a successful bid determination means 37 for, at a time of accepting a search word transmitted from a user terminal device 2-$k$, determining that the advertisement frame is successfully bid with a highest bid amount included in bid information whose advertisement placement period contains the time, from among bid information stored for the advertisement frame. This makes it possible to provide an advertisement server device that can easily display an advertisement in a manner better suited to the advertiser's needs, when displaying an advertisement within a page for displaying search results based on an entered search word or the like.

20 Claims, 40 Drawing Sheets

(56) References Cited

U.S. PATENT DOCUMENTS

| | | | |
|---|---|---|---|
| 6,269,361 B1* | 7/2001 | Davis | G06F 17/30864 |
| 6,487,538 B1* | 11/2002 | Gupta et al. | 705/14.66 |
| 6,986,100 B1* | 1/2006 | Roper | G06F 17/212 |
| | | | 705/14.52 |
| 7,039,599 B2* | 5/2006 | Merriman | G06Q 30/02 |
| | | | 705/14.52 |
| 7,117,436 B1* | 10/2006 | O'Rourke et al. | 715/205 |
| 7,136,875 B2* | 11/2006 | Anderson | G06Q 30/02 |
| 7,299,457 B2* | 11/2007 | Marshall | 717/131 |
| 7,555,485 B2* | 6/2009 | Soulanille | G06F 17/30864 |
| 7,702,537 B2* | 4/2010 | Meisel | G06F 17/30864 |
| | | | 705/14.51 |
| 7,752,190 B2* | 7/2010 | Skinner | G06Q 30/02 |
| | | | 705/14.41 |
| 7,778,874 B1* | 8/2010 | Saunders | 705/14.67 |
| 2001/0014876 A1* | 8/2001 | Miyashita | G06Q 30/02 |
| | | | 705/37 |
| 2002/0007324 A1* | 1/2002 | Centner et al. | 705/26 |
| 2002/0032724 A1* | 3/2002 | Shibusawa | G06F 17/30867 |
| | | | 709/203 |
| 2002/0059327 A1* | 5/2002 | Starkey | G06F 17/30893 |
| 2002/0143659 A1* | 10/2002 | Keezer | G06Q 30/0641 |
| | | | 705/27.1 |
| 2003/0004856 A1* | 1/2003 | Brown | G06Q 10/109 |
| | | | 705/37 |
| 2003/0018560 A1* | 1/2003 | Dietrich | G06Q 30/0601 |
| | | | 705/37 |
| 2003/0084051 A1* | 5/2003 | Depura | G06Q 30/08 |
| 2003/0093285 A1* | 5/2003 | Colace | G06Q 30/02 |
| | | | 705/1.1 |
| 2003/0105677 A1* | 6/2003 | Skinner | G06Q 30/02 |
| | | | 705/26.1 |
| 2003/0130927 A1* | 7/2003 | Kellam | G06Q 30/0605 |
| | | | 705/37 |
| 2003/0145305 A1* | 7/2003 | Ruggier | 717/100 |
| 2003/0158789 A1* | 8/2003 | Miura | G06Q 30/02 |
| | | | 705/14.61 |
| 2003/0220866 A1* | 11/2003 | Pisaris-Henderson | G06Q 30/02 |
| | | | 705/37 |
| 2004/0044571 A1* | 3/2004 | Bronnimann | G06Q 30/02 |
| | | | 705/14.71 |
| 2004/0059665 A1* | 3/2004 | Suri | G06Q 40/04 |
| | | | 705/37 |
| 2004/0068460 A1* | 4/2004 | Feeley | G06Q 40/04 |
| | | | 705/37 |
| 2004/0123157 A1* | 6/2004 | Alagna | G06F 21/606 |
| | | | 726/8 |
| 2004/0162757 A1* | 8/2004 | Pisaris-Henderson | G06Q 30/02 |
| | | | 705/14.53 |
| 2005/0044032 A1* | 2/2005 | Lee et al. | 705/37 |
| 2005/0065844 A1* | 3/2005 | Raj et al. | 705/14 |
| 2005/0144064 A1* | 6/2005 | Calabria | G06Q 30/02 |
| | | | 705/14.71 |
| 2005/0149396 A1* | 7/2005 | Horowitz et al. | 705/14 |
| 2005/0165650 A1* | 7/2005 | Kothapalli | G06Q 30/08 |
| | | | 705/26.3 |
| 2006/0080613 A1* | 4/2006 | Savant | G06Q 30/06 |
| | | | 715/745 |
| 2006/0095336 A1* | 5/2006 | Heckerman | G06Q 30/02 |
| | | | 705/26.3 |
| 2006/0190387 A1* | 8/2006 | Molloy | G06Q 30/08 |
| | | | 705/37 |
| 2006/0224496 A1* | 10/2006 | Sandholm | G06Q 30/02 |
| | | | 705/37 |
| 2006/0271438 A1* | 11/2006 | Shotland | G06Q 30/02 |
| | | | 705/14.46 |
| 2006/0287916 A1* | 12/2006 | Starr | G06Q 30/02 |
| | | | 705/14.46 |
| 2007/0022005 A1* | 1/2007 | Hanna | 705/14 |
| 2007/0025723 A1* | 2/2007 | Baudisch | G03B 13/02 |
| | | | 396/287 |
| 2007/0027762 A1* | 2/2007 | Collins et al. | G06F 17/2785 |
| | | | 705/14.58 |
| 2007/0028214 A1* | 2/2007 | Shu et al. | 717/120 |
| 2007/0038508 A1* | 2/2007 | Jain et al. | 705/14 |
| 2007/0038509 A1* | 2/2007 | Jain | G06Q 30/02 |
| | | | 705/14.48 |
| 2007/0061363 A1* | 3/2007 | Ramer | G06Q 30/02 |
| 2007/0067219 A1* | 3/2007 | Altberg et al. | 705/14 |
| 2007/0121848 A1* | 5/2007 | Faber | G06Q 30/02 |
| | | | 379/114.13 |
| 2007/0143181 A1* | 6/2007 | Linkner | G06Q 30/02 |
| | | | 705/14.21 |
| 2007/0174124 A1* | 7/2007 | Zagofsky | G06Q 30/02 |
| | | | 705/14.46 |
| 2007/0174127 A1* | 7/2007 | Lee | G06Q 30/02 |
| | | | 705/14.61 |
| 2007/0203823 A1* | 8/2007 | Whelchel | G06Q 30/00 |
| | | | 705/37 |
| 2007/0276800 A1* | 11/2007 | Lee | G06Q 30/02 |
| 2008/0034047 A1* | 2/2008 | Rosenberg et al. | 709/206 |
| 2008/0077492 A1* | 3/2008 | Ho | G06F 17/212 |
| | | | 705/14.69 |
| 2008/0097838 A1* | 4/2008 | Lin et al. | 705/14 |
| 2008/0103892 A1* | 5/2008 | Chatwin | G06Q 30/02 |
| | | | 705/14.54 |
| 2008/0103893 A1* | 5/2008 | Nagarajan | G06Q 30/02 |
| | | | 705/14.41 |
| 2008/0300974 A1* | 12/2008 | Bhandari | G06Q 30/02 |
| | | | 705/14.46 |
| 2009/0024719 A1* | 1/2009 | Wyler | H04L 67/42 |
| | | | 709/219 |
| 2009/0112609 A1* | 4/2009 | Dangaltchev | G06Q 30/02 |
| | | | 705/14.1 |
| 2009/0132507 A1* | 5/2009 | Kadambi | G06Q 30/02 |
| 2009/0300490 A1* | 12/2009 | Lejano | G06F 17/212 |
| | | | 715/277 |
| 2009/0307085 A1* | 12/2009 | Lejano | G06Q 30/02 |
| | | | 705/14.49 |
| 2010/0161417 A1* | 6/2010 | Mitsui | G06Q 30/0256 |
| | | | 705/14.54 |
| 2010/0198694 A1* | 8/2010 | Muthukrishnan | G06Q 30/0275 |
| | | | 705/14.71 |
| 2010/0235243 A1* | 9/2010 | Hecht | G06Q 30/02 |
| | | | 705/14.71 |

FOREIGN PATENT DOCUMENTS

| | | |
|---|---|---|
| JP | 2003-242372 | 8/2003 |
| JP | 2004-038370 | 2/2004 |
| JP | 2005-017942 | 1/2005 |
| JP | 2005-085165 | 3/2005 |
| JP | 3676999 | 5/2005 |
| JP | 2006-222620 | 8/2006 |
| WO | WO 00/73960 | 12/2000 |

* cited by examiner

FIG.3

<MEMBER INFORMATION DATABASE>

| ADVERTISER ID | PASSWORD | ACCOUNT NUMBER | NAME | ADDRESS | PHONE | ... |
|---|---|---|---|---|---|---|
| 1000001 | abcdef | 5000001 | ○○KABUSHIKIGAISHA | HOKKAIDO... | . | . |
| 1000010 | ghijkl | 5000010 | △△YUGENGAISHA | HOKKAIDO... | . | . |
| . | . | . | . | . | . | . |
| 1999999 | uvwxyz | 5999999 | ××KABUSHIKIGAISHA | TOKYO... | . | . |

<CONTENT DATABASE>

| CONTENT ID | ADVERTISER ID | TITLE | URL | TEXT | IMAGE |
|---|---|---|---|---|---|
| a-1000111 | 1000001 | ○○INSURER OFFERS | aaa.co.jp/ | FOR INSURANCE... | |
| b-1000222 | 1000010 | IF△△ | bbb.co.jp/ | CONTRACT RATIO... | file.*** |
| . | . | . | . | . | . |
| . | . | . | . | . | . |
| . | . | . | . | . | . |

| CATEGORY | KEYWORD | ADVERTISEMENT FRAME | CONTENT ID | BID AMOUNT | BID DATE | PLACEMENT START TIME | PLACEMENT END TIME | ADVERTISER ID | NUMBER OF CLICKS | CHARGE AMOUNT | MAXIMUM NUMBER OF CLICKS | MAXIMUM CHARGE AMOUNT | CLICK NUMBER UPPER LIMIT FLAG | CHARGE AMOUNT UPPER LIMIT FLAG | PLACEMENT HALT FLAG |
|---|---|---|---|---|---|---|---|---|---|---|---|---|---|---|---|
| INSURANCE | INSURANCE | C-1 | a-1000111 | 12 | 2007/2/23 | 2007/3/23/0:00 | 2007/5/31/24:00 | 1000001 | 277 | ¥3,324 | 2000 | | 1 | 0 | 0 |
| | | C-1 | : | 10 | 2007/1/14 | 2007/3/1/0:00 | 2007/4/30/24:00 | 1000011 | 91 | ¥910 | 10000 | ¥100,000 | 0 | 1 | 0 |
| | | C-1 | : | 7 | 2007/1/5 | 2007/3/1/0:00 | 2007/5/31/24:00 | 1000111 | 3974 | ¥27,818 | 12000 | | 1 | 0 | 0 |
| | | C-1 | : | 6 | 2007/1/3 | 2007/2/5/0:00 | 2007/5/31/24:00 | 1001111 | 4196 | ¥25,176 | 10000 | | 1 | 0 | 0 |
| | | C-1 | : | 5 | 2006/12/25 | 2007/2/1/0:00 | 2007/6/30/24:00 | 1011111 | 236 | ¥1,180 | | | 1 | 0 | 0 |
| | | C-2 | b-1000222 | 8 | 2007/1/11 | 2007/3/2/0:00 | 2007/3/31/24:00 | 1022222 | 2291 | ¥18,328 | 6000 | ¥75,000 | 1 | 0 | 0 |
| | | C-2 | : | 6 | 2006/12/20 | 2007/3/1/0:00 | 2007/5/31/24:00 | 1012345 | 176 | ¥1,056 | | | 0 | 1 | 0 |
| | | C-3 | | | | | | | | | | | | | |
| | | R-1 | | 5 | 2007/2/12 | 2007/5/1/0:00 | 2007/5/5/24:00 | 1000011 | 488 | ¥2,440 | | | 0 | 0 | 0 |
| | | R-1 | | 4 | 2007/2/1 | 2007/5/16/0:00 | 2007/5/20/24:00 | 1000011 | 0 | ¥0 | | | 0 | 0 | 0 |
| | | R-1 | | 2 | 2007/1/21 | 2007/5/11/0:00 | | 1000312 | 0 | ¥0 | | ¥20,000 | 0 | 1 | 0 |
| | | R-1 | | 1 | 2006/12/25 | 2007/5/1/0:00 | 2007/5/31/24:00 | 1000551 | 292 | ¥292 | | | 0 | 0 | 0 |
| | | R-2 | | 6 | : | : | : | : | : | : | : | : | : | : | : |
| | | R-2 | | 5 | : | : | : | : | : | : | : | : | : | : | : |
| | | R-3 | | : | : | : | : | : | : | : | : | : | : | : | : |
| | GOLF INSURANCE | C-1 | a-1000112 | | | | | | | | | | | | |
| | | C-2 | | | | | | | | | | | | | |
| | | C-3 | | | | | | | | | | | | | |
| | | R-1 | | | | | | | | | | | | | |
| | | R-2 | | | | | | | | | | | | | |
| | | R-3 | | | | | | | | | | | | | |
| | NONLIFE INSURANCE | C-1 | | | | | | | | | | | | | |
| | | C-2 | | | | | | | | | | | | | |
| | | C-2 | | | | | | | | | | | | | |
| | | C-3 | | | | | | | | | | | | | |
| | | C-3 | | | | | | | | | | | | | |
| | | R-1 | | | | | | | | | | | | | |
| | | R-1 | | | | | | | | | | | | | |
| | | R-2 | | | | | | | | | | | | | |
| | | R-2 | | | | | | | | | | | | | |
| | | R-3 | | | | | | | | | | | | | |
| | | R-3 | | | | | | | | | | | | | |

<CHARGE DATABASE>

| ADVERTISER ID | ACCOUNT NUMBER | CATEGORY | KEYWORD | ADVERTISEMENT FRAME | UNIT PRICE | NUMBER OF CLICKS | CHARGE AMOUNT |
|---|---|---|---|---|---|---|---|
| 1000001 | 5000001 | INSURANCE | INSURANCE | C-1 | ¥12 | 277 | ¥3,324 |
| | 5000001 | INSURANCE | GOLF INSURANCE | R-1 | ¥1 | 29 | ¥29 |
| | | | | | | TOTAL | ¥3,353 |
| 1000010 | 5000010 | | | | ¥8 | 211 | ¥1,688 |
| · | 5000010 | | | | ¥5 | 96 | ¥480 |
| | | | | | | TOTAL | ¥2,168 |
| 1999999 | 5999999 | | | | ¥72 | 72 | ¥72 |
| | | | | | | | |

MEMBER INFORMATION REGISTRATION/CONFIRMATION/CHANGE PAGE

- MEMBER NAME
- POSTAL CODE
- ADDRESS
- PHONE NUMBER
- FAX NUMBER
- DEPARTMENT
- CONTACT NAME
- MAIL ADDRESS
- ID
- PASSWORD
- PASSWORD CONFIRMATION
- ACCOUNT ID
- ACCOUNT NUMBER

RETURN — 303
REGISTRATION — 302
301
300

FIG.10

MEMBER INFORMATION CONFIRMATION PAGE　　　[REENTRY] — 313

310

| | |
|---|---|
| MEMBER NAME | R INSURER |
| POSTAL CODE | 106-6118 |
| ADDRESS | TOKYO... |
| PHONE NUMBER | 03-**-** |
| FAX NUMBER | 03-**-** |
| DEPARTMENT | * * DEPARTMENT |
| CONTACT NAME | * * * |
| MAIL ADDRESS | aaa@bb.co.jp |
| ID | RRR |
| PASSWORD | 1234567890 |
| PASSWORD CONFIRMATION | 1234567890 |
| ACCOUNT ID | RRR1000 |
| ACCOUNT NUMBER | 5000001 |

311

AFTER CONFIRMING ENTERED INFORMATION,
CLICK "CONFIRMATION" BUTTON.

[CONFIRMATION] — 312

FIG.16

BIDDING PAGE: WHEN COMPANY A BIDS FOR TOP RIGHT ADVERTISEMENT FRAME (R-1)
(PRIOR TO BIDDING OPERATION)

KEYWORD: INSURANCE

DATE (MAY 2007)

TO COMPANY A:
BID FOR FIRST FRAME (R-1) IN RIGHT COLUMN
TO BID, DRAG THE DATE TO SET PERIOD, ENTER AMOUNT, AND CLICK "BIDDING" BUTTON.

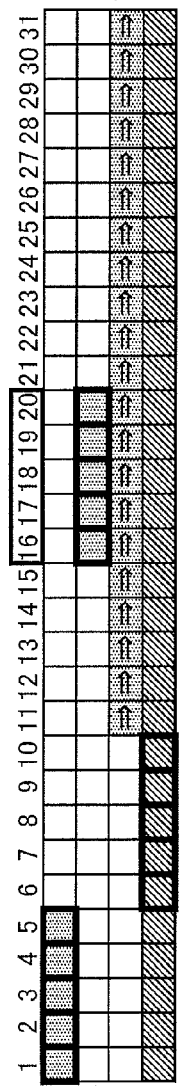

FIG.18

BIDDING PAGE: AFTER BIDDING OPERATION OF COMPANY A
(PERIOD OF 16TH TO 20TH IS BID WITH 5 YEN, AND PERIOD OF 21ST TO 25TH IS BID WITH 3 YEN)

KEYWORD: INSURANCE

RETURN — 532

530

533a { REMARKS
ADDITION OF NEW RECORD
ADDITION OF NEW RECORD WITH UPPER LIMIT
POSSIBLE DISPLAY WHEN HIGHER RANKING ADVERTISEMENT PLACEMENT IS HALTED
533b

DATE (MAY 2007)
BID AMOUNT  1 2 3 4 5 6 7 8 9 10 11 12 13 14 15 16 17 18 19 20 21 22 23 24 25 26 27 28 29 30 31
COMPANY A 5
COMPANY A 4
COMPANY A 3
COMPANY A 2
COMPANY A 1

START TIME  2 0 0 7 / 0 5 / 1 6   0 0 : 0 0
END TIME    2 0 0 7 / 0 5 / 2 0   2 4 : 0 0

TO COMPANY A:
BID FOR FIRST FRAME (R-1) IN RIGHT COLUMN
TO BID, DRAG THE DATE TO SET PERIOD, ENTER AMOUNT, AND CLICK "BIDDING" BUTTON.

BID AMOUNT                    [ 5 ] YEN
538a ☐   MAXIMUM NUMBER OF CLICKS  [  ] TIMES — 538b    [ BIDDING ] — 535
539a ☐   MAXIMUM CHARGE AMOUNT     [  ] YEN — 539b
         ADVERTISEMENT CONTENT ID  [a-1000112 ▽] — 536    [ADVERTISEMENT CONTENT ENTRY] — 537

534

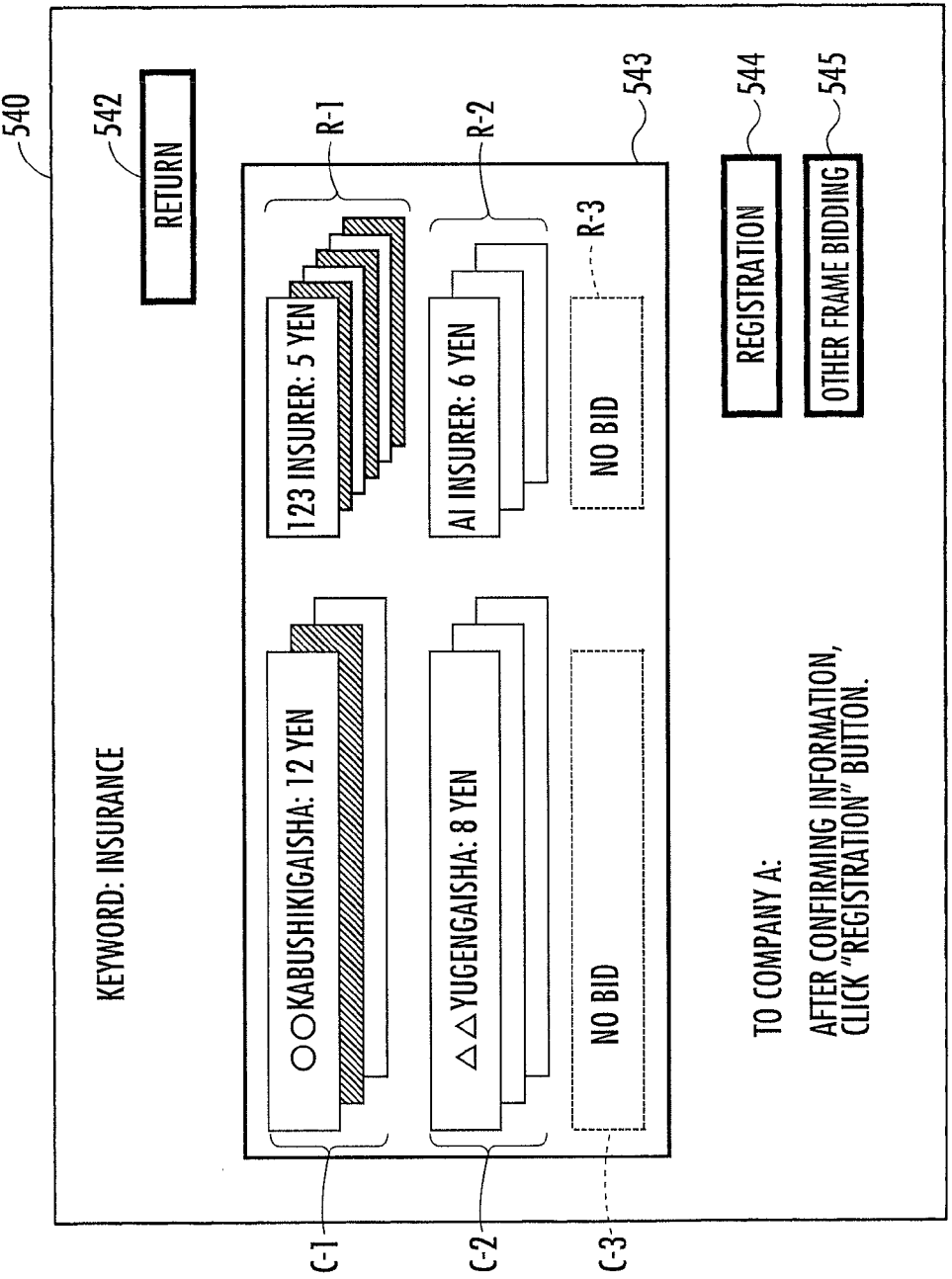

FIG.20

BIDDING PAGE: WHEN COMPANY B BIDS FOR ADVERTISEMENT FRAM (R-1)
(PRIOR TO BIDDING OPERATION)

RETURN — 532

KEYWORD: INSURANCE

DATE (MAY 2007)

BID AMOUNT  1 2 3 4 5 6 7 8 9 10 11 12 13 14 15 16 17 18 19 20 21 22 23 24 25 26 27 28 29 30 31  REMARKS
COMPANY B 5
          4
          3
          2
          1

533a {
WITH UPPER LIMIT
POSSIBLE DISPLAY WHEN HIGHER RANKING ADVERTISEMENT PLACEMENT IS HALTED
} 533b

START TIME
END TIME

TO COMPANY B:
BID FOR FIRST FRAME (R-1) IN RIGHT COLUMN
TO BID, DRAG THE DATE TO SET PERIOD, ENTER AMOUNT, AND CLICK "BIDDING" BUTTON.

| BID AMOUNT | 6 | YEN | 538b BIDDING | 535 |
| 538a ☐ MAXIMUM NUMBER OF CLICKS | | TIMES | |
| 539a ☐ MAXIMUM CHARGE AMOUNT | | YEN | 539b |
| ADVERTISEMENT CONTENT ID | a-1000112 ▽ | | ADVERTISEMENT CONTENT ENTRY — 537 |

Figure 21:
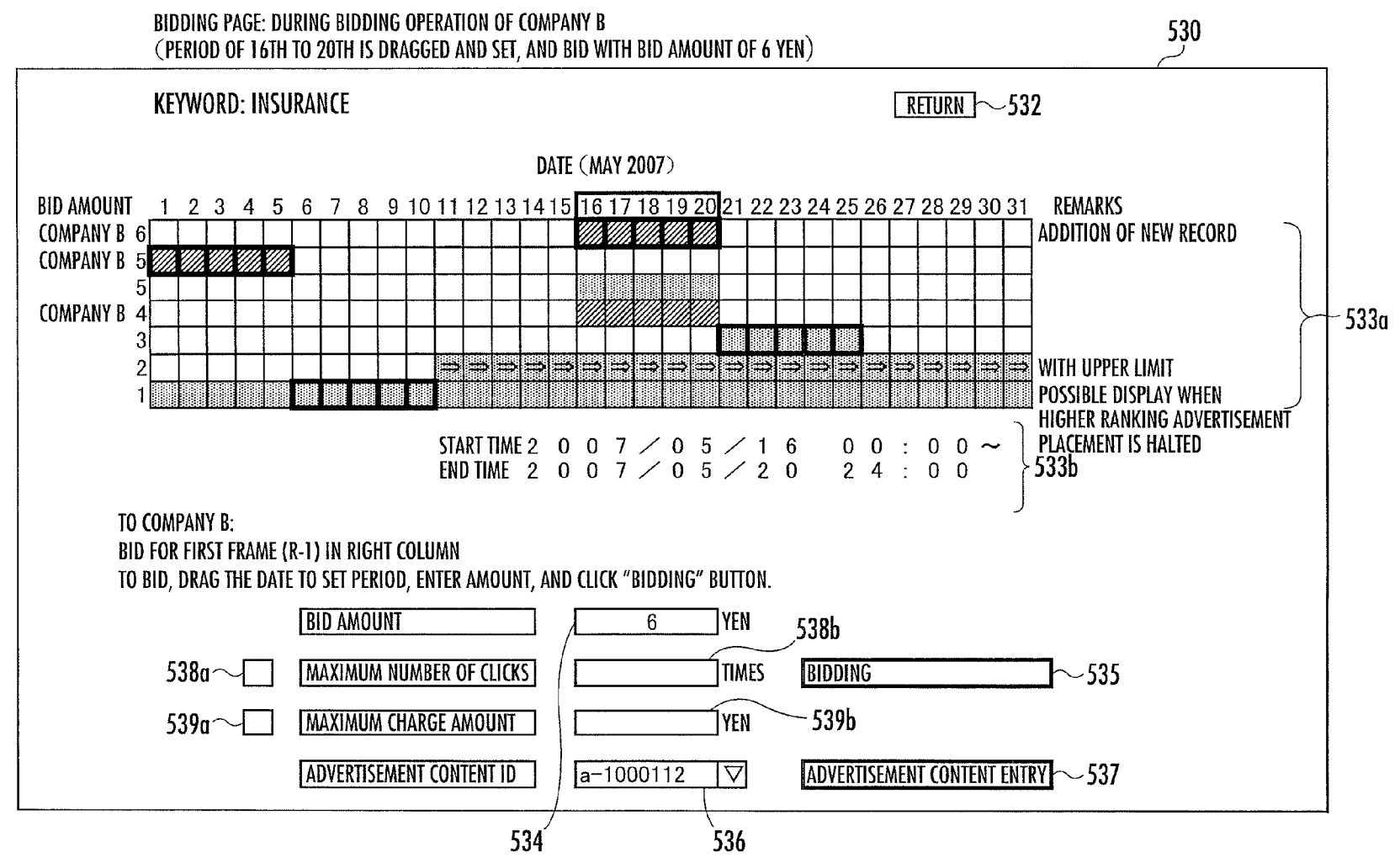

BIDDING PAGE: DURING BIDDING OPERATION OF COMPANY B
(PERIOD OF 16TH TO 20TH IS DRAGGED AND SET, AND BID WITH BID AMOUNT OF 6 YEN)

BIDDING PAGE: AFTER BIDDING OPERATION BY COMPANY C

KEYWORD: INSURANCE

RETURN — 532

530

533a { ADDITION OF NEW RECORD
WITH UPPER LIMIT
POSSIBLE DISPLAY WHEN
HIGHER RANKING ADVERTISEMENT
PLACEMENT IS HALTED
533b

BID AMOUNT / DATE (MAY 2007) 1–31 / REMARKS

COMPANY C 3

START TIME
END TIME

TO COMPANY C:
BID FOR FIRST FRAME (R-1) IN RIGHT COLUMN
TO BID, DRAG THE DATE TO SET PERIOD, ENTER AMOUNT, AND CLICK "BIDDING" BUTTON.

538a — ☐ BID AMOUNT [   ] YEN — 538b
         MAXIMUM NUMBER OF CLICKS [   ] TIMES      BIDDING — 535
539a — ☐ MAXIMUM CHARGE AMOUNT [   ] YEN — 539b
         ADVERTISEMENT CONTENT ID [ ▽ ] — 536      ADVERTISEMENT CONTENT ENTRY — 537

BIDDING PAGE: WHEN BIDDING FOR UNBID ADVERTISEMENT FRAME (C-3) ~530

RETURN ~532

KEYWORD: INSURANCE

DATE (MAY 2007)

BID AMOUNT  1 2 3 4 5 6 7 8 9 10 11 12 13 14 15 16 17 18 19 20 21 22 23 24 25 26 27 28 29 30 31  REMARKS ~533a
COMPANY A

START TIME
END TIME
~533b

TO COMPANY A:
BID FOR THIRD FRAME (C-3) IN MIDDLE COLUMN
TO BID, DRAG THE DATE TO SET PERIOD, ENTER AMOUNT, AND CLICK "BIDDING" BUTTON.

BID AMOUNT [  1  ] YEN
538a □  MAXIMUM NUMBER OF CLICKS [    ] TIMES ~538b
539a □  MAXIMUM CHARGE AMOUNT [    ] YEN ~539b  BIDDING ~535
ADVERTISEMENT CONTENT ID [c-1000890 ▽]  ADVERTISEMENT CONTENT ENTRY ~537
~534  ~536

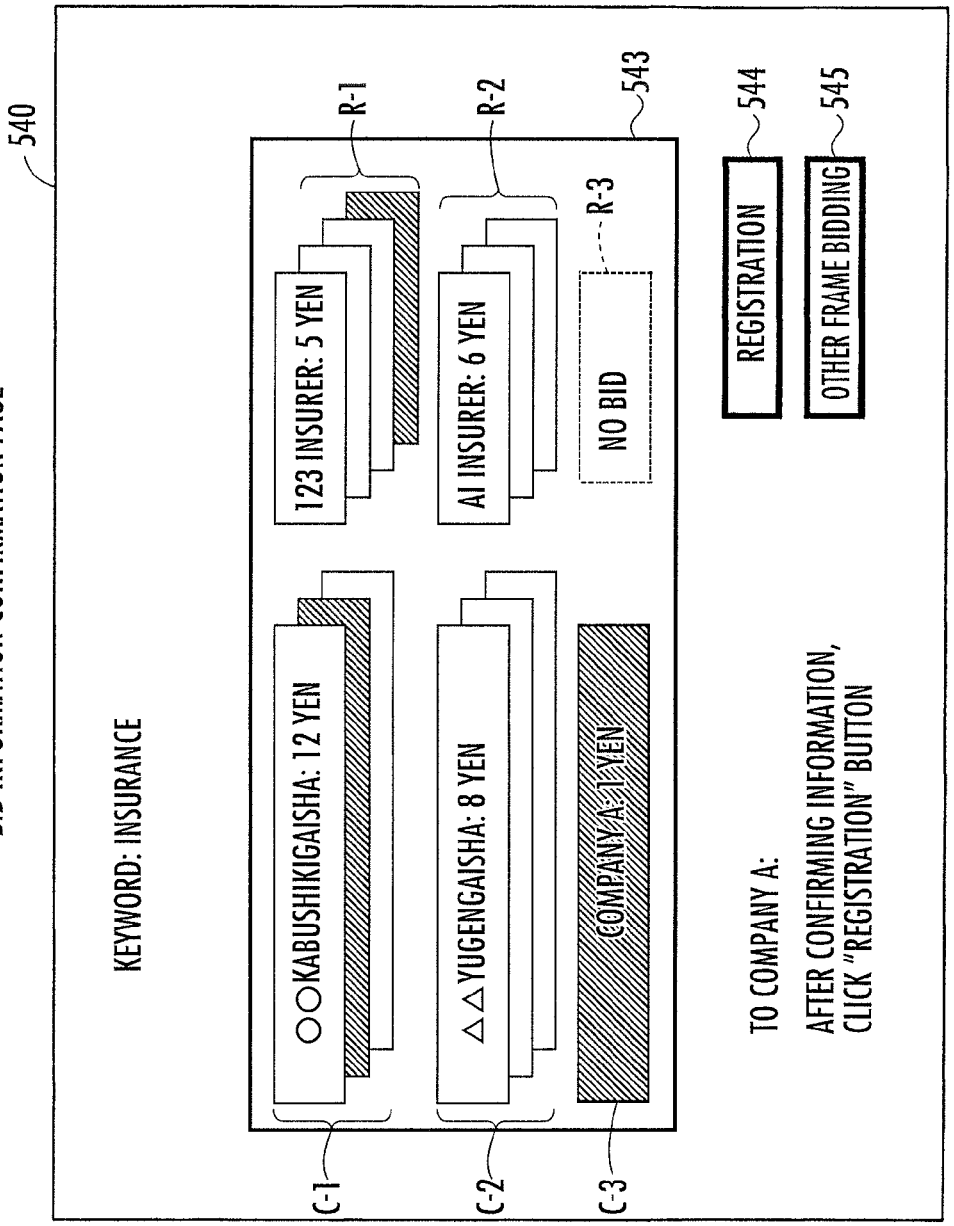

FIG.28

BIDDING PAGE: WHEN BIDDING FOR ADVERTISEMENT FRAM (C-1)

KEYWORD: GOLF INSURANCE

BID AMOUNT    DATE (MAY 2007)
COMPANY A     1 2 3 4 5 6 7 8 9 10 11 12 13 14 15 16 17 18 19 20 21 22 23 24 25 26 27 28 29 30 31    REMARKS — 533a

} 533b

START TIME
END TIME

TO COMPANY A:
BID FOR FIRST FRAME (C-1) IN MIDDLE COLUMN
TO BID, DRAG THE DATE TO SET PERIOD, ENTER AMOUNT, AND CLICK "BIDDING" BUTTON.

538a □  BID AMOUNT                    [        ] YEN      538b
539a □  MAXIMUM NUMBER OF CLICKS      [   1    ] TIMES
        MAXIMUM CHARGE AMOUNT         [        ] YEN      539b
        ADVERTISEMENT CONTENT ID      [c-1000890 ▽]       BIDDING — 535
                                       534                ADVERTISEMENT CONTENT ENTRY — 537
                                       536

RETURN — 532

530

ADVERTISEMENT SERVER DEVICE, ADVERTISEMENT DISPLAY METHOD, AND ADVERTISEMENT SERVER PROGRAM

TECHNICAL FIELD

The present invention relates to an advertisement server device, an advertisement display method, and an advertisement server program that can, when displaying an advertisement within a page for displaying search results based on an entered search word or the like, designate and bid for a display frame of the advertisement within the page.

BACKGROUND ART

A system in which a user connects to a network such as the Internet using a terminal device such as a personal computer and obtains information through a web page provided by a server device or the like has been conventionally used. Since there are enormous amounts of web pages on the Internet, for example the user searches for information by using a search service and the like and efficiently locates interesting information based on search results. This search service uses a search engine for executing a search process based on a search word or the like entered by the user, and generates a list of web pages relevant to an object of the user's interest to generate a search result page.

Meanwhile, web pages are also very useful as advertising media. In particular, the search service is a service frequently used by the user, and displaying on the search result page has significant advertisement effects. Furthermore, by displaying an advertisement relevant to the search word entered by the user, it is possible to efficiently present the advertisement to the user who is a potential customer.

As an example of a method for easily displaying such an advertisement, there is a method whereby information about a web site of an advertiser is included in a list of search results. Here, the advertiser registers a keyword and the like associated with a search word beforehand so that its advertisement is displayed on a search result page when a search is performed based on the search word associated with the keyword. In detail, a system in which a plurality of advertisers bid for a predetermined keyword and display advertisements according to these bids is used. It is believed that a higher ranking in the search result list for the search word entered by the user calls more attention of the user who performs the search. In view of this, for example, a system in which rankings in the search result list displayed in the search result page are determined according to bid amounts of the advertisers is proposed (as an example, see Japanese Patent No. 3676999 (hereafter referred to as patent document 1)).

However, the system of patent document 1 merely determines the rankings in the search result list in decreasing order of bid amount and displays the advertisements in the search result page according to the rankings. On the other hand, an advertiser may desire various display forms depending on, for instance, budget or public relations activities. For example, the advertiser may want to display the advertisement in association with a lot of keywords at a low price even in a small space, or may want to display the advertisement prominently in a larger space rather than simply displaying it at the top. Moreover, the advertiser may want to display the advertisement at a specific ranking (for example, second or third) or position. Furthermore, the advertiser may want to display the advertisement intensively for a short period of time in accordance with a specific date and time such as an opening day or an inventory clearance day. In these cases, in the system of patent document 1, the advertiser may not be able to display such an advertisement that is suited to its budget or public relations activities. For example, the ranking changes in relation to the bid amounts of the other advertisers in the system of patent document 1. This being so, even when the advertiser wants to display the advertisement continuously at the same ranking or position in the web page, such a desire of the advertiser is unable to be satisfied.

Besides, in the case where many advertisers want to display their advertisements at a specific ranking or position, the following problem arises. In a typical auction, it is impossible to bid without a bid amount that exceeds a highest bid amount. Meanwhile, an advertisement is not displayed for an indefinite period of time, and it is expected that the placement of the advertisement has a time limit as in the case where the advertisement ends after a predetermined advertisement placement period, the advertisement ends with a predetermined number of clicks as an upper limit, or the advertisement ends with a predetermined charge amount as an upper limit. In such a case where the placement of the advertisement has a time limit, though it is impossible to successfully bid with the current bid amount, once the current advertisement ends, it becomes possible to successfully bid even with a bid amount not higher than the current bid amount or a bid amount below the current bid amount. There may be an advertiser that does not intend to bid with the current bid amount due to its budget and the like, but is willing to bid once the advertisement of the current bid amount ends.

This being the case, it is inconvenient for both the advertiser and the server operator if the currently bid advertisement frame is unable to be bid without a bid amount exceeding the current bid amount. In other words, the advertiser misses a good opportunity to advertise with a relatively low bid amount, and the server operator has a problem of the advertisement frame being left unsold after the currently displayed advertisement ends, until the next advertiser appears.

DISCLOSURE OF THE INVENTION

Problem to be Solved by the Invention

In view of the above circumstances, an object of the present invention is to provide an advertisement server device, an advertisement display method, and an advertisement server program that can, when displaying an advertisement within a page for displaying search results based on an entered search word or the like, easily display the advertisement in a manner better suited to the advertiser's needs.

Another object of the present invention is to provide an advertisement server device, an advertisement display method, and an advertisement server program that can present the current bid status to the advertiser in chronological order of advertisement placement periods, thereby presenting an appropriate bid amount for a successful bid to the advertiser.

Still another object of the present invention is to provide an advertisement server device, an advertisement display method, and an advertisement server program that can, when presenting the current bid status to the advertiser in chronological order of advertisement placement periods, present the bid status in a display form that is visually easy to understand.

Still another object of the present invention is to provide an advertisement server device, an advertisement display method, and an advertisement server program that can, when presenting the current bid status to the advertiser in chronological order of advertisement placement periods, present the bid status in a display form that is visually easy to understand, and also deliver an easy bidding operation.

Means for Solving the Problems

The advertisement server device of the present invention is connected to a user terminal device and an advertiser terminal device via a network, and comprises: a search result page generation means for generating, according to a search word transmitted from the user terminal device, a search result page to which advertisement content relevant to the search word is added; and a search result provision means for transmitting the search result page to the user terminal device.

The advertisement server device comprises: a search word acceptance means for accepting a search word transmitted from the advertiser terminal device; a bid advertisement frame display means for generating a bid information registration page for causing the advertiser terminal device to display plurality of advertisement frames each of which corresponds to the search word accepted by the search word acceptance means and has a specified display position on the search result page, together with a bid status of each of the advertisement frames; a bid amount acceptance means for accepting a bid amount for each predetermined advertisement placement period, for an advertisement frame designated in the advertiser terminal device; a storage means for, every time the bid amount is accepted, storing information for specifying an advertiser, the search word, the advertisement frame, the advertisement placement period, the bid amount, and advertisement content in association with each other, as a set of bid information; an advertisement frame extraction means for, when the search word transmitted from the user terminal device is accepted, referencing the storage means, and extracting an advertisement frame associated with the search word; a successful bid determination means for, at a time of accepting the search word transmitted from the user terminal device, extracting, for each advertisement frame extracted by the advertisement frame extraction means, each set of bid information whose advertisement placement period contains the time from among sets of bid information stored in the storage means, and determining that the advertisement frame is successfully bid with a highest bid amount included in the extracted set of bid information; and an advertisement extraction means for extracting advertisement content associated with the advertisement frame for which the successful bid is determined by the successful bid determination means, as the advertisement content to be added to the search result page by the search result page generation means, wherein, for each of the advertisement frames, the bid advertisement frame display means overlap-displays sets of bid information while shifting the sets of bid information in position by a predetermined distance based on bid amounts stored in the storage means, a set of bid information of an advertiser currently in a bidding operation being displayed distinguishably from a set of bid information of an other advertiser.

In the advertisement server device of the present invention, according to the search word transmitted from the advertiser terminal device, one or more advertisement frames displayed on the search result page can be provided so as to be biddable by the advertiser for each advertisement placement period. The display positions of these advertisement frames can be arbitrarily set, which makes it possible to meet various needs of the advertiser. By designating an advertisement placement period for each advertisement frame and bidding for the advertisement frame, the advertiser can successfully bid for a desired number of advertisement frames at desired positions.

Thus, the advertiser can display its advertisement on the search result page in a manner suited to the advertiser's needs.

That is, by displaying the advertisement content continuously at the same position, the advertiser can enhance the user's awareness of the advertisement content, and suppress a decrease in click-through rate due to an advertisement position change. This makes it possible to guide the user stably. For the user, on the other hand, since the position of the advertisement content does not change, there is no trouble of searching for the advertisement on the page, and the user can receive the previously used service from the same position on the page. Moreover, because the advertiser can designate the advertisement placement period, for example the advertiser can bid so that the advertisement is displayed intensively for a short period of time in accordance with a specific date and time such as an opening day or an inventory clearance day, or bid so that the advertisement is displayed after the advertisement placement period of another advertiser ends.

Here, the advertisement frames are displayed in the bid information registration page generated by the bid advertisement frame display means, in such a manner that enables the display positions of the advertisement frames on the search result page to be specified. Furthermore, the advertisement frames are each displayed in the bid information registration page together with the bid status of the advertisement frame. This allows the advertiser to specify a desired advertisement frame while recognizing the display of the bid information registration page as well as the bid status of each advertisement frame in the advertiser terminal device, and easily bid for the designated advertisement frame by entering the bid amount.

In addition, every time the bid amount is accepted by the bid amount acceptance means, the bid information such as the bid amount is stored in the storage means. Accordingly, at the time of entering the bid amount, the bid amount does not need to exceed the current bid amount, as every accepted bid amount is stored. At the time of accepting the search word transmitted from the user terminal device, the advertisement extraction frame extraction means extracts an advertisement frame, and for each extracted advertisement frame, the successful bid determination means extracts bid information whose advertisement placement period contains the time of accepting the search word, and determines that the advertisement frame is successfully bid with a highest bid amount included in the extracted bid information. Thus, the successful bid is determined while reflecting the bid status at the time when the search is performed by the user.

According to the determined successful bid, the advertisement content to be added to the search result page is extracted by the advertisement extraction means. In this way, the advertisement content corresponding to the search word is extracted while promptly reflecting the bids from the advertisers. The advertisement content extracted by the advertisement extraction means in correspondence with the search word is displayed in the corresponding advertisement frame in the search result page. Hence, the advertisement can be efficiently presented to the user who is a potential customer.

As described above, according to the present invention, when displaying an advertisement within a page for displaying search results based on an entered search word, the advertisement can be easily displayed in a manner better suited to the advertiser's needs.

Preferably, in the advertisement server device of the present invention, the advertisement placement period is set by a placement start time which is a desired date and time to start advertisement placement in the advertisement frame and a placement end time which is a desired date and time to end the advertisement placement in the advertisement frame, and the bid advertisement frame display means generates the bid information registration page so as to enable the advertiser to set the placement start time and the placement end time from the advertiser terminal device.

In detail, the advertisement placement period is set, for example, as a continuous period from the placement start time to the placement end time. Since the placement start time and the placement end time can be set from the advertiser terminal device through the bid information registration page, the advertiser can arbitrarily set and bid for a desired advertisement placement period.

Preferably, in the advertisement server device of the present invention, the bid advertisement frame display means causes the advertiser terminal device to display the advertisement frames in a layout similar to a layout displayed in the search result page on the user terminal device.

In this case, the advertisement frames are displayed in a layout similar to a layout on the search result page in the user terminal device. This allows the advertiser to designate and bid for a desired advertisement frame in consideration of the user's point of view, from among the advertisement frames that vary in layout such as position and size.

Preferably, in the advertisement server device of the present invention, the bid advertisement frame display means causes the advertiser terminal device to display, as the bid status of each of the advertisement frames, whether or not the advertisement frame is bid.

In this case, while recognizing whether or not there is a bid for each advertisement frame in the search result page corresponding to the search word which the advertiser intends to bid, the advertiser can designate and bid for a desired advertisement frame.

Preferably, in the advertisement server device of the present invention, the bid advertisement frame display means causes the advertiser terminal device to display, as the bid status of each of the advertisement frames, each set of bid information stored in the storage means for the advertisement frame.

In this case, while recognizing the bid information such as the bid amount already stored in the storage means for each advertisement frame in the search result page corresponding to the search word which the advertiser intends to bid, the advertiser can designate and bid for a desired advertisement frame.

Preferably, in the advertisement server device of the present invention, the bid advertisement frame display means causes the advertiser terminal device to display, as the bid status of each of the advertisement frames, each of a predetermined number of sets of bid information for the advertisement frame.

In detail, because the bid information is stored in the storage means every time the bid amount is accepted, there can be a plurality of sets of bid information for each advertisement frame. In such a case, by causing the advertiser terminal device to display each of the predetermined number of sets of bid information based on the bid amount, the advertisement placement period, and the like, the advertiser can recognize each set of bid information for the advertisement frame. As a result, the advertiser can easily designate and bid for a desired advertisement frame while accurately understanding the bid status.

Preferably, in the advertisement server device of the present invention, the bid advertisement frame display means causes the advertiser terminal device to display each set of bid information for the advertisement frame so that a set of bid information accepted from a predetermined advertiser is distinguished from a set of bid information accepted from another advertiser.

In this case, from the bid status of each advertisement frame in the search result page corresponding to the search word which the advertiser intends to bid, the advertiser can distinguish its own bid information from bid information of other advertisers, and easily designate and bid for a desired advertisement frame.

Preferably, in the advertisement server device of the present invention, the bid advertisement frame display means causes the advertiser terminal device to display the bid status of each of the advertisement frames in chronological order of advertisement placement periods.

In this case, since the bid status of each advertisement frame is displayed in chronological order of advertisement placement periods, the advertiser can bid while recognizing an appropriate bid amount for each advertisement placement period for the advertisement frame in the search result page corresponding to the search word which the advertiser intends to bid.

Preferably, in the advertisement server device of the present invention, the bid information registration page includes: a bid advertisement frame display page for displaying one or more advertisement frames corresponding to the search word so as to be designatable by the advertiser; and a bid amount entry page for entering a bid amount for the advertisement frame designated by the advertiser from the bid advertisement frame display page, and the bid advertisement frame display means generates the bid information registration page so that the advertisement frame is designated by performing a click operation on the advertisement frame on the bid advertisement frame display page, and the bid amount entry page for the designated advertisement frame is displayed.

In this case, by clicking the advertisement frame on the bid advertisement frame display page, the advertiser can designate the advertisement frame and display the bid amount registration page, and enter the bid amount for the advertisement frame. Thus, the advertiser can easily designate and bid for a desired advertisement frame.

Preferably, in the advertisement server device of the present invention, the bid advertisement frame display means causes a bid status of the advertisement frame designated from the bid advertisement frame display page, to be displayed in a form of a calendar on the bid amount entry page.

In this case, the bid status of the designated advertisement frame is displayed in the calendar form on the bid amount entry page, so that the current bid status of the advertisement frame is presented in a display form which is visually easy to understand. Accordingly, for the advertisement frame in the search result page corresponding to the search word which the advertiser intends to bid, the advertiser can bid while easily recognizing an appropriate bid amount for each desired advertisement placement period based on the bid status displayed on the bid amount entry page.

Preferably, in the advertisement server device of the present invention, the bid advertisement frame display means generates the bid amount entry page so that an advertisement placement period of each set of bid information stored in the storage means for the advertisement frame is displayed on the calendar indicating the bid status of the designated advertisement frame in the bid amount entry page, and a drag operation of a period designating an advertisement placement period for the bid amount entered in the bid amount entry page for the advertisement frame is performed on the calendar to set the advertisement placement period for the bid amount.

In this case, the advertisement placement period of each set of bid information is displayed on the calendar indicating the bid status of the designated advertisement frame, so that the advertisement placement period of each current set of bid information for the advertisement frame is visually easy to understand. When entering the bid amount on the bid amount entry page, the advertiser can designate the advertisement placement period by a drag operation of the period on this calendar. Thus, the advertiser can easily set and bid for a desired advertisement placement period for the bid amount.

Preferably, the advertisement server device of the present invention comprises a charge management means for, based at least on a bid amount of each advertisement frame, computing a charge amount to the advertiser for displaying advertisement content in the advertisement frame, and also restricting the charge amount based on a predetermined upper limit.

In this case, for the bid from the advertiser, the charge amount can be successively computed by the charge management means based on the bid amount. For example, having set the bid amount as a bid unit price, the charge amount is computed by multiplying the bid unit price by a predetermined value corresponding to the advertisement effectiveness such as the number of times the advertisement is displayed, the display period, and the number of clicks. Here, the charge management means restricts the charge amount based on the predetermined upper limit, as a result of which the charge amount can be kept from becoming not less than an amount estimated by the advertiser, as an example. This enables the advertiser to more easily display the advertisement suited to the advertiser's needs by estimating the charge amount depending on, for example, budget or advertisement policy.

Preferably, in the advertisement server device of the present invention, the upper limit is a predetermined maximum charge amount set beforehand for the advertisement frame, and the maximum charge amount is settable in the bid information registration page, and, when the charge amount for displaying the advertisement content in the advertisement frame becomes not less than the maximum charge amount set for the advertisement frame, the charge management means halts the display of the advertisement content in the advertisement frame.

In this case, the upper limit for restricting the charge amount is the predetermined maximum charge amount set beforehand for each advertisement frame, and the maximum charge amount can be set in the bid information registration page. Therefore, the advertiser can bid while setting the upper limit of the charge amount beforehand. When the charge amount for displaying the advertisement content in the advertisement frame becomes not less than the maximum charge amount, the charge management means halts the display of the advertisement content in the advertisement frame. In this way, the charge amount to the advertiser for displaying the advertisement content is restricted so as not to increase further. This enables the advertiser to more easily display the advertisement suited to the advertiser's needs by estimating the charge amount depending on, for example, budget or advertisement policy.

Preferably, in the advertisement server device of the present invention, the charge amount is a value obtained by multiplying the bid amount of the advertisement frame by the number of clicks on the advertisement content displayed in the advertisement frame on the search result page, the upper limit is a predetermined maximum number of clicks set beforehand as an upper limit of the number of clicks, and the maximum number of clicks is settable in the bid information registration page, and, when the number of clicks on the advertisement content displayed in the advertisement frame becomes not less than the maximum number of clicks set for the advertisement frame, the charge management means halts the display of the advertisement content in the advertisement frame.

In detail, it is typically assumed that the advertisement content contains a hyperlink to a web site of the advertiser. In such a case, the number of clicks on the advertisement content corresponds to the number of times the user is introduced to the web site of the advertiser. Therefore, by setting the value obtained by multiplying the bid amount by the number of clicks as the charge amount, the charge amount that directly reflects the profit the advertiser has received from the advertisement can be properly determined. Here, the upper limit for restricting the charge amount is the predetermined maximum number of clicks set beforehand as the upper limit of the number of clicks, and the maximum number of clicks can be set in the bid information registration page. Hence, the advertiser can bid while setting the upper limit of the number of clicks beforehand. When the number of clicks on the advertisement content in the advertisement frame becomes not less than the maximum number of clicks, the charge management means halts the display of the advertisement content in the advertisement frame. Thus, the charge amount to the advertiser for displaying the advertisement content is restricted so as not to increase further. This enables the advertiser to more easily display the advertisement suited to the advertiser's needs by estimating the charge amount or the advertisement effectiveness depending on, for example, budget or advertisement policy.

Preferably, in the advertisement server device of the present invention, when display of predetermined advertisement content in the advertisement frame is halted by the charge management means, the successful bid determination means performs a process of determining a successful bid while excluding, from the extracted set of bid information, a set of bid information relating to the advertisement content the display of which in the advertisement frame is halted by the charge management means.

In detail, the successful bid determination means determines the successful bid at the time when the search is performed by the user. Here, the successful bid determination means performs the process of determining the successful bid while excluding the bid information relating to the advertisement content the display of which is halted at the time. As a result, from among the bid information stored in the storage means, the advertisement content of the next highest bid amount for the advertisement frame can be moved up and displayed. Thus, the advertisement can be efficiently provided by reducing a period during which no advertisement is displayed.

Preferably, in the advertisement server device of the present invention, the bid advertisement frame display means causes the advertiser terminal device to display, as the bid status of each of the advertisement frames, whether or not the upper limit for restricting the charge amount is set for advertisement content of each set of bid information stored in the storage means for the advertisement frame.

In detail, in the case where the upper limit for restricting the charge amount, such as the maximum charge amount or the maximum number of clicks, is set for the advertisement content, there is a possibility that, when the charge amount or the number of clicks reaches the upper limit, the display of the advertisement content is halted and other advertisement content of a lower bid amount is displayed. Accordingly, by displaying the bid status indicating whether or not the upper limit is set, it becomes possible for the advertiser to bid while recognizing such a display possibility.

Moreover, in the advertisement server device of the present invention, the search result page preferably has a link function for displaying the bid information registration page. In detail, having transmitted the search word from the user terminal device and viewed the search result page, the user may want to, as an advertiser, display an advertisement on the search result page for the search word. Also, the advertiser may want to add or change an advertisement for the search word as a result of transmitting, as a user, the search word and viewing the search result page. In such a case, the like function provides access form the search result page to the bid information registration page, so that it is possible to easily bid for the search word as an advertiser.

The advertisement display method of the present invention comprises: a search result page generation step of generating, according to a search word transmitted from a user terminal device via a network, a search result page to which advertisement content relevant to the search word is added; and a search result provision step of transmitting the search result page to the user terminal device.

The advertisement display method of the present invention comprises: a search word acceptance step of accepting a search word transmitted from an advertiser terminal device; a bid advertisement frame display step of generating a bid information registration page for causing the advertiser terminal device to display plurality of advertisement frames each of which corresponds to the search word accepted in the search word acceptance means and has a specified display position on the search result page, together with a bid status of each of the advertisement frames; a bid amount acceptance step of accepting a bid amount for each predetermined advertisement placement period, for an advertisement frame designated in the advertiser terminal device; a storage step of, every time the bid amount is accepted, storing information for specifying an advertiser, the search word, the advertisement frame, the advertisement placement period, the bid amount, and advertisement content in a storage means in association with each other, as a set of bid information; an advertisement frame extraction step of, when the search word transmitted from the user terminal device is accepted, referencing the storage means, and extracting an advertisement frame associated with the search word; a successful bid determination step of, at a time of accepting the search word transmitted from the user terminal device, extracting, for each advertisement frame extracted in the advertisement frame extraction step, each set of bid information whose advertisement placement period contains the time from among sets of bid information stored in the storage means, and determining that the advertisement frame is successfully bid with a highest bid amount included in the extracted set of bid information; and an advertisement extraction step of extracting advertisement content associated with the advertisement frame for which the successful bid is determined in the successful bid determination step, as the advertisement content to be added to the search result page, wherein, for each of the advertisement frames, the bid advertisement frame display means overlap-displays sets of bid information while shifting the sets of bid information in position by a predetermined distance based on bid amounts stored in the storage means, a set of bid information of an advertiser currently in a bidding operation being displayed distinguishably from a set of bid information of an other advertisement.

As described in regard to the advertisement server device of the present invention, according to the advertisement display method of the present invention, the advertiser can easily bid for each desired advertisement placement period and advertisement frame for the search word while recognizing the display on the advertiser terminal device, by the bid advertisement frame display step. Therefore, according to the present invention, the advertisement can be displayed in the search result page in a manner suited to the advertiser's needs, thereby efficiently presenting the advertisement to the user who is a potential customer.

The advertisement display program of the present invention causes a computer to execute: a search result page generation process of generating, according to a search word transmitted from a user terminal device via a network, a search result page to which advertisement content relevant to the search word is added; and a search result provision process of transmitting the search result page to the user terminal device.

The advertisement display program of the present invention has a function for causing the computer to execute: a search word acceptance process of accepting a search word transmitted from an advertiser terminal device; a bid advertisement frame display process of generating a bid information registration page for causing the advertiser terminal device to display a plurality of advertisement frames each of which corresponds to the search word accepted in the search word acceptance means and has a specified display position on the search result page, together with a bid status of each of the advertisement frames; a bid amount acceptance process of accepting a bid amount for each predetermined advertisement placement period, for an advertisement frame designated in the advertiser terminal device; a storage process of, every time the bid amount is accepted, storing information for specifying an advertiser, the search word, the advertisement frame, the advertisement placement period, the bid amount, and advertisement content in a storage means in association with each other, as a set of bid information; an advertisement frame extraction process of, when the search word transmitted from the user terminal device is accepted, referencing the storage means, and extracting an advertisement frame associated with the search word; a successful bid determination process of, at a time of accepting the search word transmitted from the user terminal device, extracting, for each advertisement frame extracted in the advertisement frame extraction process, each set of bid information whose advertisement placement period contains the time from among sets of bid information stored in the storage means, and determining that the advertisement frame is successfully bid with a highest bid amount included in the extracted set of bid information; and an advertisement extraction process of extracting advertisement content associated with the advertisement frame for which the successful bid is determined in the successful bid determination process, as the advertisement content to be added to the search result page, wherein, for each of the advertisement frames, the bid advertisement frame display means overlap-displays sets of bid information while shifting the sets of bid information in position by a predetermined distance based on bid amounts stored in the storage means, a set of bid information of an advertiser currently in a bidding operation being displayed distinguishably from a set of bid information of an other advertiser.

According to the advertisement server program of the present invention, the process for achieving the advantages described in regard to the advertisement server device of the present invention can be executed on a computer.

BRIEF DESCRIPTION OF THE DRAWINGS

FIG. 3 is a diagram showing information registered in a member information database in a storage unit in the advertisement server device shown in FIG. 2.

FIG. 4 is a diagram showing information registered in a content database in the storage unit in the advertisement server device shown in FIG. 2.

FIG. 5 is a diagram showing information registered in a bid database in the storage unit in the advertisement server device shown in FIG. 2.

FIG. 6 is a diagram showing information registered in a charge database in the storage unit in the advertisement server device shown in FIG. 2.

FIG. 9 is a screen display example of a member information registration/confirmation/change page in the advertiser terminal device by the advertisement server device shown in FIG. 2.

FIG. 10 is a screen display example of a member information confirmation page in the advertiser terminal device by the advertisement server device shown in FIG. 2.

FIG. 16 is a screen display example of a bidding page in the case of transitioning from the bid advertisement frame display/designation page shown in FIG. 15.

FIG. 17 is a screen display example of the bidding page shown in FIG. 16 during a bidding operation.

FIG. 18 is a screen display example of the bidding page shown in FIG. 16 after the bidding operation.

FIG. 19 is a screen display example of a bid information confirmation page transitioned from the bidding page shown in FIG. 18.

FIG. 20 is a second screen display example of the bidding page in the advertiser terminal device by the advertisement server device shown in FIG. 2.

FIG. 21 is a screen display example of the bidding page shown in FIG. 20 during a bidding operation.

FIG. 22 is a third screen display example of the bidding page in the advertiser terminal device by the advertisement server device shown in FIG. 2.

FIG. 23 is a screen display example of the bidding page shown in FIG. 22 during a bidding operation.

FIG. 24 is a fourth screen display example of the bidding page in the advertiser terminal device by the advertisement server device shown in FIG. 2.

FIG. 25 is a screen display example of the bid information confirmation page in the case of transitioning from the bidding page shown in FIG. 24.

FIG. 26 is a fifth screen display example of the bidding page in the advertiser terminal device by the advertisement server device shown in FIG. 2.

FIG. 28 is a screen display example of the bidding page in the case of transitioning from the bid advertisement frame display/designation page shown in FIG. 27.

BEST MODE FOR CARRYING OUT THE INVENTION

The following describes an embodiment of a server device of the present invention, with reference to FIGS. 1 to 41.

Figure 1:
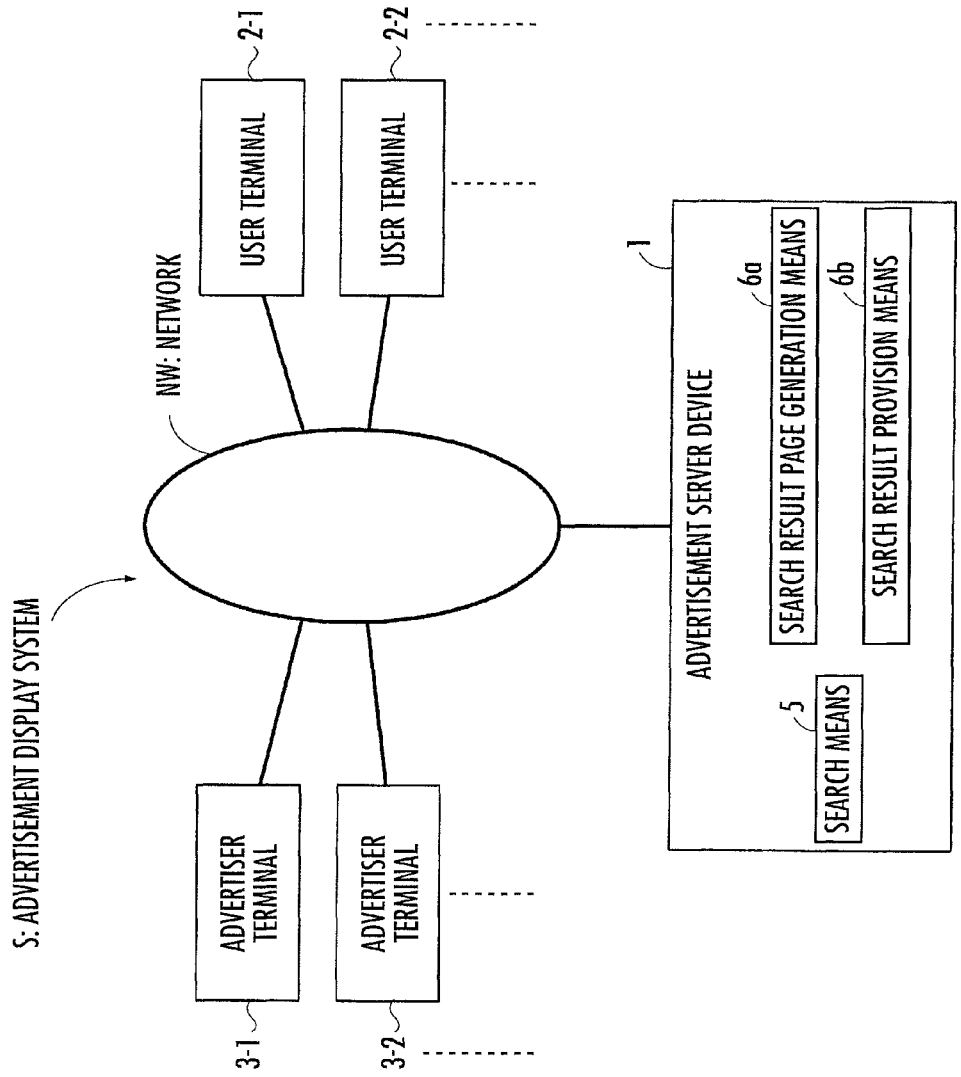
FIG. 1 is a system configuration diagram of an advertisement display system according to an embodiment of the present invention.

First, with reference to FIG. 1, an advertisement server device 1 in this embodiment is a search engine server, and is connected to a user terminal device 2-k (k=1, 2, ..., n) and an advertiser terminal device 3-k (k=1, 2, ..., n) via a network NW. The advertisement server device 1, the user terminal device 2-k, and the advertiser terminal device 3-k constitute an advertisement display system S.

Figure 31:
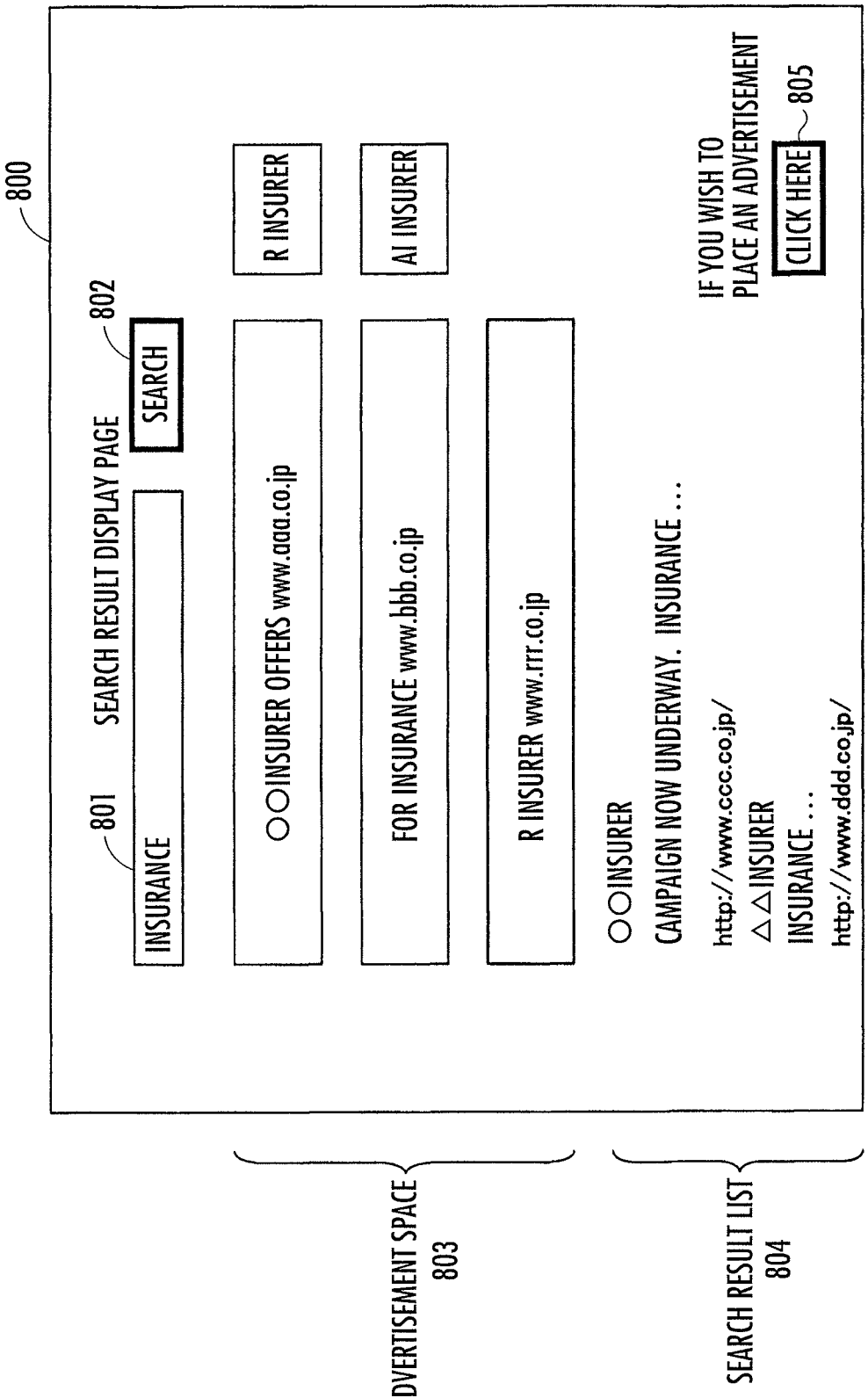
FIG. 31 is a screen display example of a search result page transitioned from the search page shown in FIG. 30.

This advertisement display system S is a system that provides a user with search results based on a search word entered by the user in a search site and, when providing the search results, displays advertisement content relevant to the search word in addition to the search results (see FIG. 31). By registering as a member of the advertisement display system S, an advertiser can register advertisement content in association with a search word that is expected to be entered by the user for performing a search, and place an advertisement when a predetermined condition is satisfied after bidding.

The advertisement server device 1 is a server device operated by an operator of the search site. The advertisement server device 1 includes, as its functions, a search result page generation means 6a for generating, according to a search word entered from the user terminal device 2-k, a search result page to which advertisement content relevant to the search word is added, and a search result provision means 6b for transmitting the generated search result page to the user terminal device 2-k.

The advertisement server device 1 further includes, as its function, a search means 5 for performing a search on search objects based on the search word entered from the user terminal device 2-k. For example, the search means 5 uses site-related information (text data such as site name, description, web page, and text content) as the search objects. The search means 5 extracts sites whose site-related information contains the search word, and outputs a list for displaying the extracted sites as the search results (see sign 804 in FIG. 31). Though this embodiment shows an example where the advertisement server device 1 includes the search means 5, there is also the case where the advertisement server device 1 does not include the search means 5 and performs the search through an external OEM supply of the search engine.

Moreover, the advertisement server device 1 is capable of mutual data transmission/reception with the user terminal device 2-k and the advertiser terminal device 3-k via the network NW using, for example, TCP/IP (Transmission Control Protocol/Internet Protocol) or the like as a communication protocol. Note that the network NW is constructed, for example, by the Internet, a dedicated communication line (for example, CATV (Community Antenna Television) line), a mobile communication network (including a base station and the like), a gateway, or the like.

The user terminal device 2-k is a terminal device used by the user of the search site in the advertisement display system S. For instance, a personal computer, a PDA (Personal Digital Assistant), a STB (Set Top Box), a mobile phone, or the like on which a web browser application is installed is applicable to the user terminal device 2-k. The user terminal device 2-k itself does not need to have particular functions other than the web browser application and other commonly-used functions. The advertisement display system S is realized by the advertisement server device 1 displaying various pages on a screen of the user terminal device 2-k and obtaining information entered by the user on these pages, through the web browser application of the user terminal device 2-k. Thus, when the user enters a search word in a search page of the search site, a search result page corresponding to the search word is provided from the advertisement server device 1 and displayed on the screen by the browser of the user terminal device 2-k. The advertiser terminal device 3-k is a terminal device used by the advertiser that is a member of the advertisement display system S. For instance, a personal computer or the like on which a web browser application is installed is applicable to the advertiser terminal device 3-k. Like the user terminal device 2-k, the advertiser terminal device 3-k itself does not need to have particular functions other than the web browser application and other commonly-used functions. The advertisement display system S is realized by the advertisement server device 1 displaying various pages on a screen of the advertiser terminal device 3-k and obtaining information entered by the advertiser on these pages, through the web browser application of the advertiser terminal device 3-k. Thus, when the advertiser logs into an advertisement management site, various pages including member information, advertisement content, bid information, charge status, and the like of the registered advertiser are provided from the advertisement server device 1 and displayed on the screen by the browser of the advertiser terminal device 3-k (see FIG. 7). Through these pages, the advertiser can conduct management such as registration/change/confirmation of member information, advertisement content, bid information, charge status, and so on.

Figure 2:
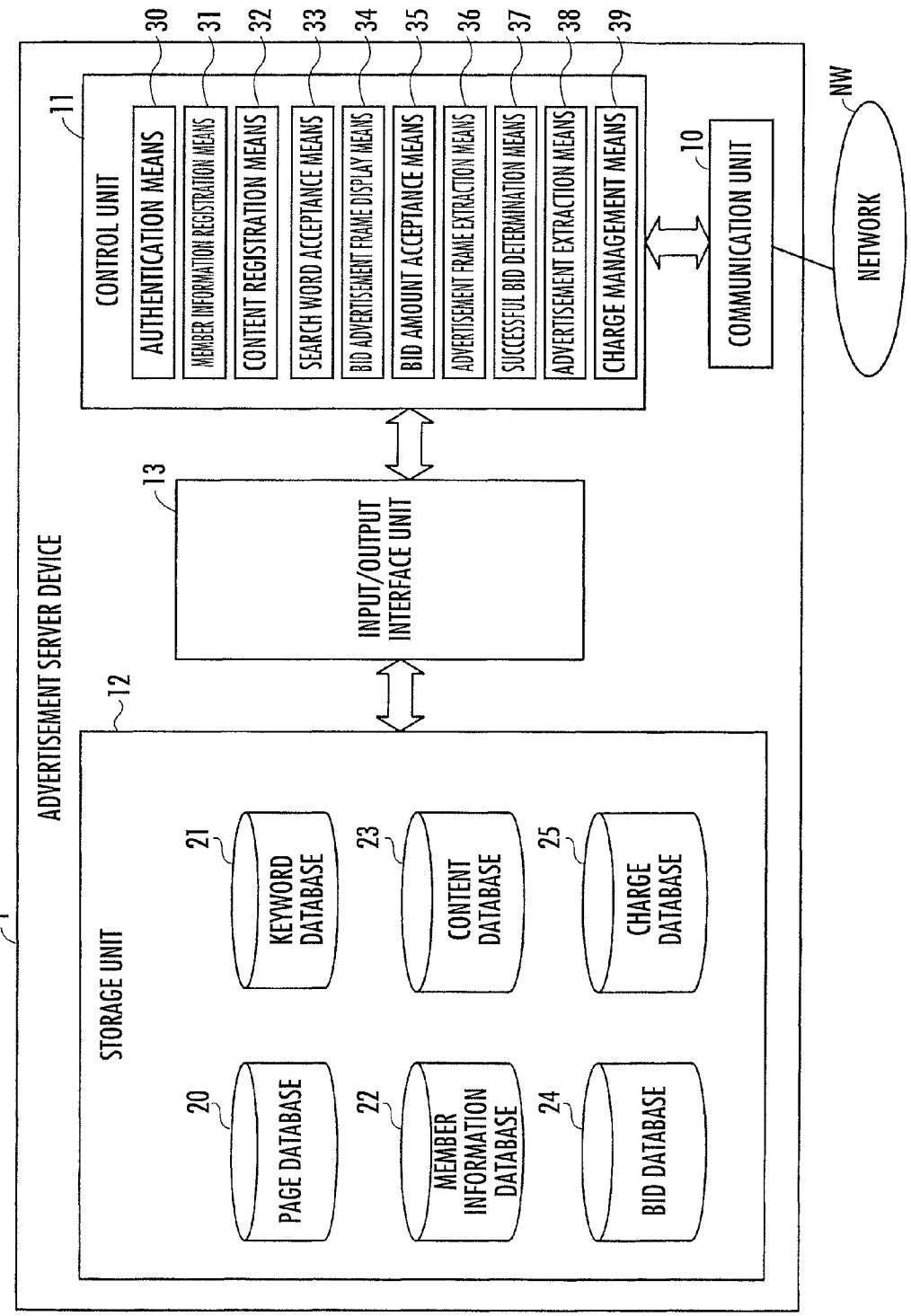
FIG. 2 is a functional block diagram showing a configuration of an advertisement server device in the advertisement display system shown in FIG. 1.

The following describes a configuration of the advertisement server device 1, with reference to FIG. 2.

The advertisement server device 1 includes: a communication unit 10 that connects to the network NW and controls communication states with the user terminal device 2-k, the advertiser terminal device 3-k, and the like; a control unit 11 (a processor circuit including a CPU, a ROM, a RAM, an input/output circuit, and so on) that performs various operations; a storage unit 12 (for example, a hard disk drive and the like) that stores various data, programs, and the like; and an input/output interface unit 13 that performs interface processing (such as data reading and writing) between these units. Note that the storage unit 12 corresponds to the storage means in the present invention. The advertisement server device 1 may further include a drive unit that reads data and the like from a storage medium such as a flexible disk, a CD (Compact Disc), or a DVD (Digital Versatile Disc), and records data and the like on the storage medium.

In the storage unit 12, a page database 20, a keyword database 21, a member information database 22, a content database 23, a bid database 24, and a charge database 25 are specifically constructed as databases for storing data used by the search result page generation means 6a and the search result provision means 6b.

The page database 20 stores information about various pages provided from the advertisement server device 1 to the user terminal device 2-k and the advertiser terminal device 3-k and displayed on the screen. In detail, for example, HTML data, audio data, text data, and the like constituting web pages are registered in the page database 20. Page types and page structures will be described later.

The information stored in this page database 20 includes information about advertisement frames. An advertisement frame is a frame in which an advertisement associated with a search word is displayed, in a search result page (see FIG. 25). One advertisement content can be displayed in each advertisement frame. Moreover, the advertiser can designate and bid for an advertisement frame for each search word. In detail, information about an advertisement frame is, as an example, HTML data or the like that corresponds to a number indicating the advertisement frame such as C-1 or R-1 shown in FIG. 15 described later and that is for displaying advertisement content in a layout of a predetermined position, size, and the like on the search result page.

Figure 14:
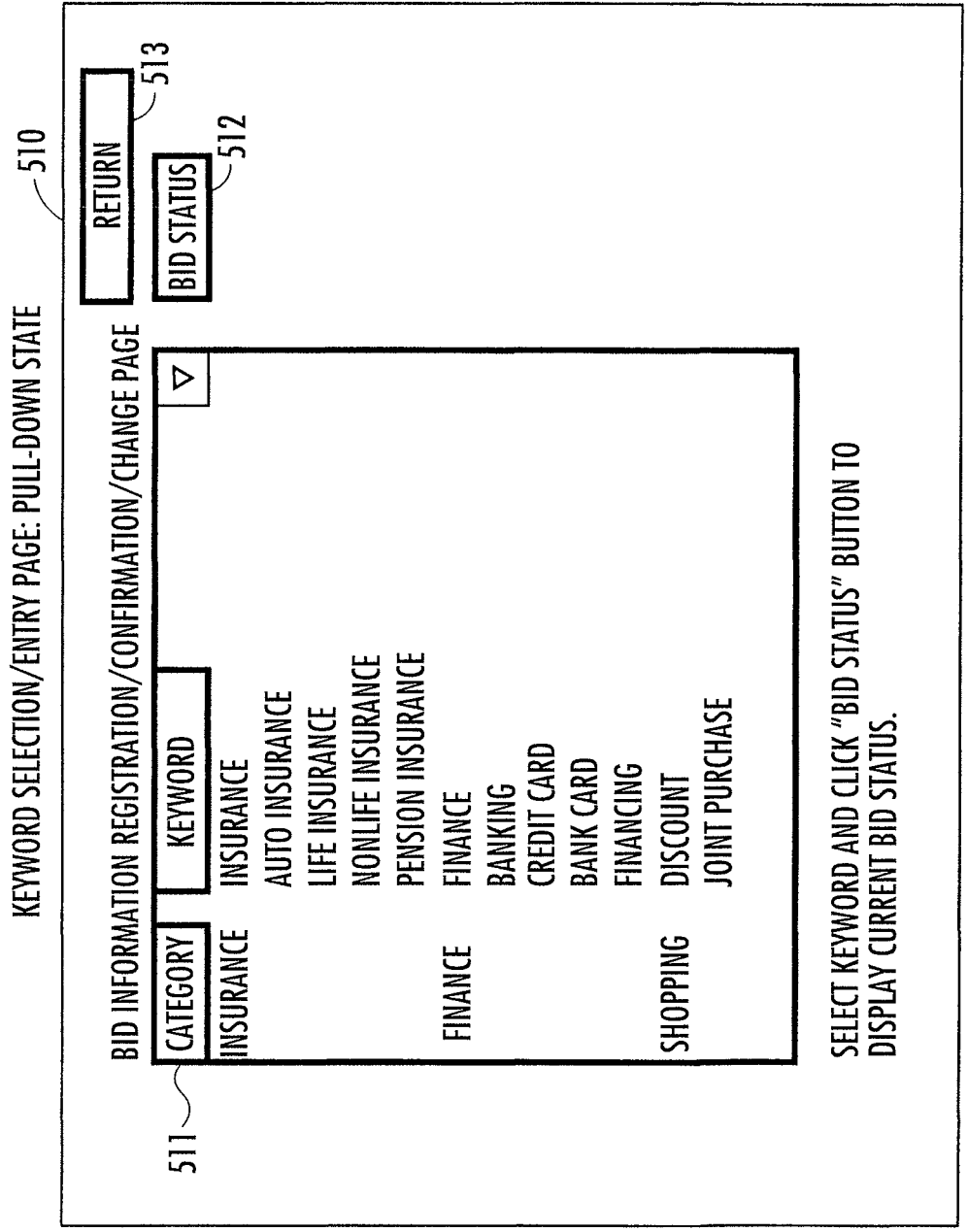
FIG. 14 is a screen display example of a pull-down state of the keyword selection/entry page in the advertiser terminal device by the advertisement server device shown in FIG. 2.

The keyword database 21 stores search words entered by the user and the advertiser. A search word is a keyword classified by category as shown in FIG. 14 described later.

The member information database 22 stores information about each advertiser that is a member of the advertisement display system S, in association with an advertiser ID for identifying the advertiser (for specifying the advertiser). In detail, for example, an advertiser ID, a password for login, an account ID for identifying an account for the advertiser to pay an advertisement fee, an account number, the advertiser's name, postal code, address, phone number, fax number, department, contact name, mail address, and the like are registered in the member information database 22, as shown in FIG. 3.

Note that the account ID and the mail address are in a one-to-one correspondence with the advertiser ID and therefore can be used as information for identifying the advertiser, instead of the advertiser ID.

The content database 23 stores information about advertisement content, in association with a content ID for identifying the advertisement content and an advertiser ID. In detail, for example, a content ID, an advertiser ID, a title displayed as advertisement content, a URL for linking to the advertiser's webpage, text showing the advertisement, file reference information of an image displayed as the advertisement, and the like are registered in the content database 23, as shown in FIG. 4.

The bid database 24 stores bid information such as a bid amount for displaying an advertisement for each advertisement frame, in association with an advertiser ID, an advertisement frame, and a content ID. In detail, a search word (keyword classified by category) and a predetermined number of a plurality of advertisement frames for the search word are registered in the bid database 24, as shown in FIG. 5. The search word and the plurality of advertisement frames are registered beforehand, or registered by an operation of an advertiser. At least one record is registered for each search word and advertisement frame.

For instance, as the search word "insurance" and a plurality of advertisement frames corresponding to this search word, a record of the keyword "insurance" classified in the category "insurance" and records of six advertisement frames C-1, C-2, C-3, R-1, R-2, and R-3 corresponding to the keyword "insurance" are registered in the bid database 24, as shown in FIG. 5. Further, five records, two records, one record, four records, two records, and one record are registered respectively for the six advertisement frames "C-1", "C-2", "C-3", "R-1", "R-2", and "R-3".

Note that, when a new search word is registered, a record of the search word and records of the predetermined number of a plurality of advertisement frames for the search word are added, and at least one record is generated for each advertisement frame.

As an example, when the search word "golf insurance" is newly registered, a record of "golf insurance" classified in the category "insurance" and records of six advertisement frames C-1, C-2, C-3, R-1, R-2, and R-3 corresponding to the keyword "golf insurance" are added, and one record is generated for each of the six advertisement frames, as shown in FIG. 5.

Each record for each search word and advertisement frame is added every time a bid amount is accepted, and bid information such as a bid amount and an advertisement placement period is registered in each record. In detail, for example, a bid amount (unit price), a bid date, a placement start time, a placement end time, an advertiser ID, the number of clicks on advertisement content by users, a charge amount, a maximum number of clicks, a maximum charge amount, a click number upper limit flag, a charge amount upper limit flag, a placement halt flag, and the like are registered in each record for each search word and advertisement frame, as shown in FIG. 5.

The placement start time is a date and time desired by the advertiser to start the advertisement placement. The placement end time is a date and time desired by the advertiser to end the advertisement placement. The advertisement placement period is set as a continuous period from the placement start time to the placement end time.

The advertisement halt flag is a flag showing a placement state of the advertisement content. In the case where the advertisement content is in a placeable state, the advertisement halt flag is set to 0. In the case where the advertisement content is in a placement halt state, the placement halt flag is set to 1.

The maximum number of clicks indicates a predetermined upper limit set beforehand by the advertiser for the number of clicks on the advertisement content in each advertisement frame. The click number upper limit flag is a flag for setting whether or not to halt the placement of the advertisement content based on the maximum number of clicks. In the case where the click number upper limit flag is set to 0, the maximum number of clicks is not used as the upper limit, and the advertisement content is placed regardless of the number of clicks. In the case where the click number upper limit flag is set to 1, the maximum number of clicks is used as the upper limit, and the placement of the advertisement content is halted when the number of clicks becomes not less than the maximum number of clicks.

The maximum charge amount indicates a predetermined upper limit set beforehand for the charge amount for displaying the advertisement content in each advertisement frame. The charge amount upper limit flag is a flag for setting whether or not to halt the placement of the advertisement content based on the maximum charge amount. In the case where the charge amount upper limit flag is set to 0, the maximum charge amount is not used as the upper limit, and the advertisement content is placed regardless of the charge amount. In the case where the charge amount upper limit flag is set to 1, the maximum charge amount is used as the upper limit, and the placement of the advertisement content is halted when the charge amount becomes not less than the maximum charge amount.

The charge database 25 stores charge-related information such as a charge amount for advertisement placement, in association with an advertiser ID. In detail, for example, an advertiser ID, an account number, a category, a keyword, an advertisement frame, a unit price for advertisement display, the number of clicks, a charge amount, and the like are registered in the charge database 26, as shown in FIG. 6. As the unit price, the bid amount is used as an example. As the charge amount, a value obtained by multiplying the unit price by the number of clicks is used as an example.

In addition, a database of information about sites that are used by the search means 5 as search objects is constructed in the storage unit 12. The storage unit 12 further stores, in addition to a predetermined operating system, a WWW (World Wide Web) server program for generating web pages based on various data stored in the storage unit 12 and transmitting the web pages to the user terminal device 2-k, the advertiser terminal device 3-k, and the like according to requests transmitted from the user terminal device 2 and the advertiser terminal device 3-k through the use of a HTTP protocol, and other various programs for realizing the functions of the search means 5, the search result page generation means 6a, and the search result provision means 6b.

For example, various data and programs may be obtained from another server device or the like via the network NW, or recorded on a storage medium such as a CD-ROM and read via the drive unit.

The control unit 11 includes various functional structures for realizing the functions of the search means 5, the search result page generation means 6a, and the search result provision means 6b. These functions are realized by reading a program stored beforehand in the storage unit 12 or the ROM of the control unit 11 in the advertisement server device 1 and executing the program by the CPU of the control unit 11. This program includes the advertisement server program in the present invention.

In more detail, as the functional structures relating to the search result page generation means 6a and the search result provision means 6b, the control unit 11 includes: an authentication means 30 for performing a login process of the advertiser that accesses the advertisement management site; a member information registration means 31 for enabling the advertiser to register information about the advertiser; a content registration means 32 for accepting advertisement content corresponding to a search word and an advertisement frame from the advertiser terminal device 3-k; a search word acceptance means 33 for accepting the search word transmitted from the advertiser terminal device 3-k; a bid advertisement frame display means 34 for generating a bid information registration/change/confirmation page 500 described later for displaying an advertisement frame corresponding to the search word accepted by the search word acceptance means 33 together with bid information of the advertisement frame, and causing the advertiser terminal device 3-k to display the bid information registration/change/confirmation page 500; a bid amount acceptance means 35 for accepting a bid amount for an advertisement frame designated in the advertiser terminal device 3-k for each advertisement placement period; an advertisement frame extraction means 36 for extracting an advertisement frame corresponding to a search word upon receiving the search word transmitted from the user terminal device 2-k; a successful bid determination means 37 for determining a successful bid according to a record that satisfies a predetermined condition from among records stored in the bid database 24 for each extracted advertisement frame; an advertisement extraction means 38 for extracting advertisement content to be added to a search result page 800 in correspondence with the determined record; and a charge management means 39 for computing a charge amount to the advertiser, and restricting the charge amount by halting the display of the advertisement content based on a predetermined upper limit (the maximum charge amount, the maximum number of clicks), as shown in FIG. 2.

Figure 15:
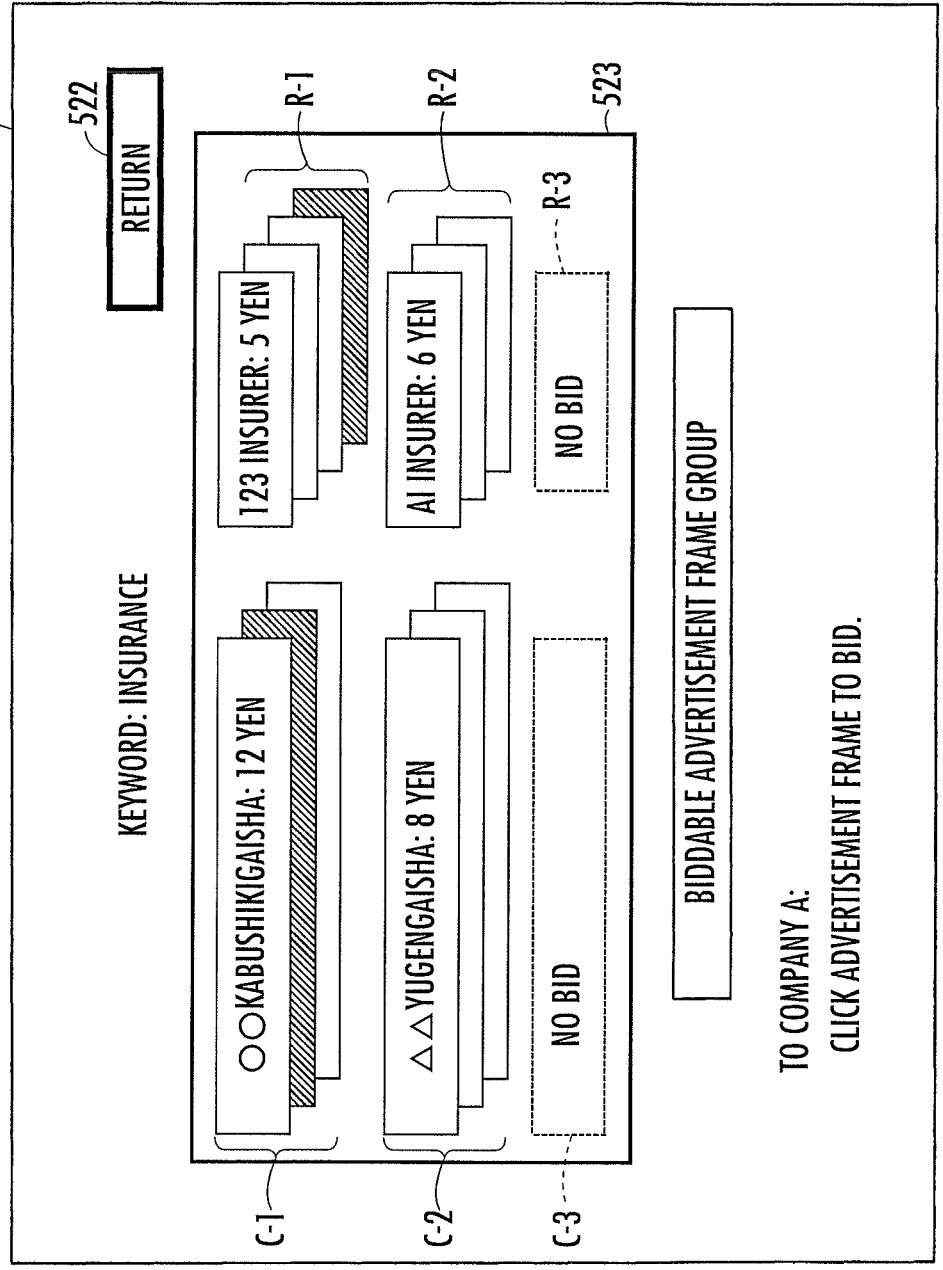
FIG. 15 is a screen display example of a bid advertisement frame display/designation page in the case of transitioning from the keyword selection/entry page shown in FIG. 14.

The bid information registration/change/confirmation page 500 (the bid information registration page in the present invention) displayed by the bid advertisement frame display means 34 specifically includes: an advertisement frame display/designation page 520 (the bid advertisement frame display page in the present invention) for displaying, when a search word is transmitted from the advertiser currently logged in the advertisement management site via the advertiser terminal device 3-k, one or more advertisement frames corresponding to the search word so as to be designatable by the advertiser, as shown in FIG. 15 described later; and a bidding page 530 (the bid amount entry page in the present invention) for entering a bid amount for an advertisement frame designated by the advertiser from the advertisement frame display/designation page 520, as shown in FIG. 16 described later. The advertisement frame display/designation page 520 and the bidding page 530 will be described in detail later.

The bid amount acceptance means 35 accepts a bid amount for the advertisement frame designated in the advertiser terminal device 3-k, for each advertisement placement period. Every time the bid amount is accepted by the bid amount acceptance means 35, a record is added to the bid database 24 and bid information such as the bid amount is stored. That is, the bid amount is accepted irrespective of whether or not it is higher than the other bid amounts already accepted, and the bid information is successively stored in the bid database 24.

The advertisement frame extraction means 36, when a search word transmitted from the user terminal device 2-k is accepted, references the storage unit 12 and extracts an advertisement frame associated with the search word. In detail, when a search is performed from the user terminal device 2-k according to an arbitrary search word, the advertisement extraction means 38 references the bid database 24 and extracts an advertisement frame associated with the search word.

The successful bid determination means 37, at the time of accepting the search word transmitted from the user terminal device 2-k, extracts records of bid information whose advertisement placement period contains the time from among the bid information stored in the storage unit 12, for each advertisement frame extracted by the advertisement frame extraction means 36. When doing so, the successful bid determination unit 37 excludes a record corresponding to advertisement placement which is in a halted state due to the full number of clicks or the full charge amount, from the extracted records. The successful bid determination unit 37 then determines that the advertisement frame is successfully bid by a highest bid amount out of bid amounts included in the extracted bid information.

In detail, when the search is performed, the successful bid determination means 37 references the bid database 24. From among the records stored for each search word and advertisement frame, the successful bid determination means 37 determines a record of a highest bid amount satisfying the condition that the current time is within the advertisement placement period (the current time is between the placement start time and the placement end time) and the condition that the placement is not halted (the placement halt flag is not 1), as a record of advertisement content to be displayed as an advertisement. Here, since bid amounts entered by advertisers are all accepted by the bid amount acceptance means 35 regardless of the amount and stored in the bid database 24, it is possible to appropriately respond to the case where a next highest bid amount or below is moved up and determined as a successful bid by the successful bid determination means 37 due to the full number of clicks, the full charge amount, a lapse of the advertisement placement period, or the like.

The advertisement extraction means 38 extracts advertisement content associated with the record determined by the successful bid determination means 37 for each advertisement frame, as advertisement content to be added to the search result page 800. In detail, for each extracted advertisement frame, the advertisement extraction means 38 obtains a content ID of advertisement content associated with the bid amount determined by the successful bid determination means 37 from the bid database 24, and extracts information about the advertisement content associated with the content ID from the content database 23.

The search result page generation means 6a generates the search result page to which the advertisement content extracted by the advertisement extraction means 38 is added, according to the search word transmitted from the user terminal device 2-k. The search result provision means 6b transmits the search result page to the user terminal device 2-k.

Figure 7:
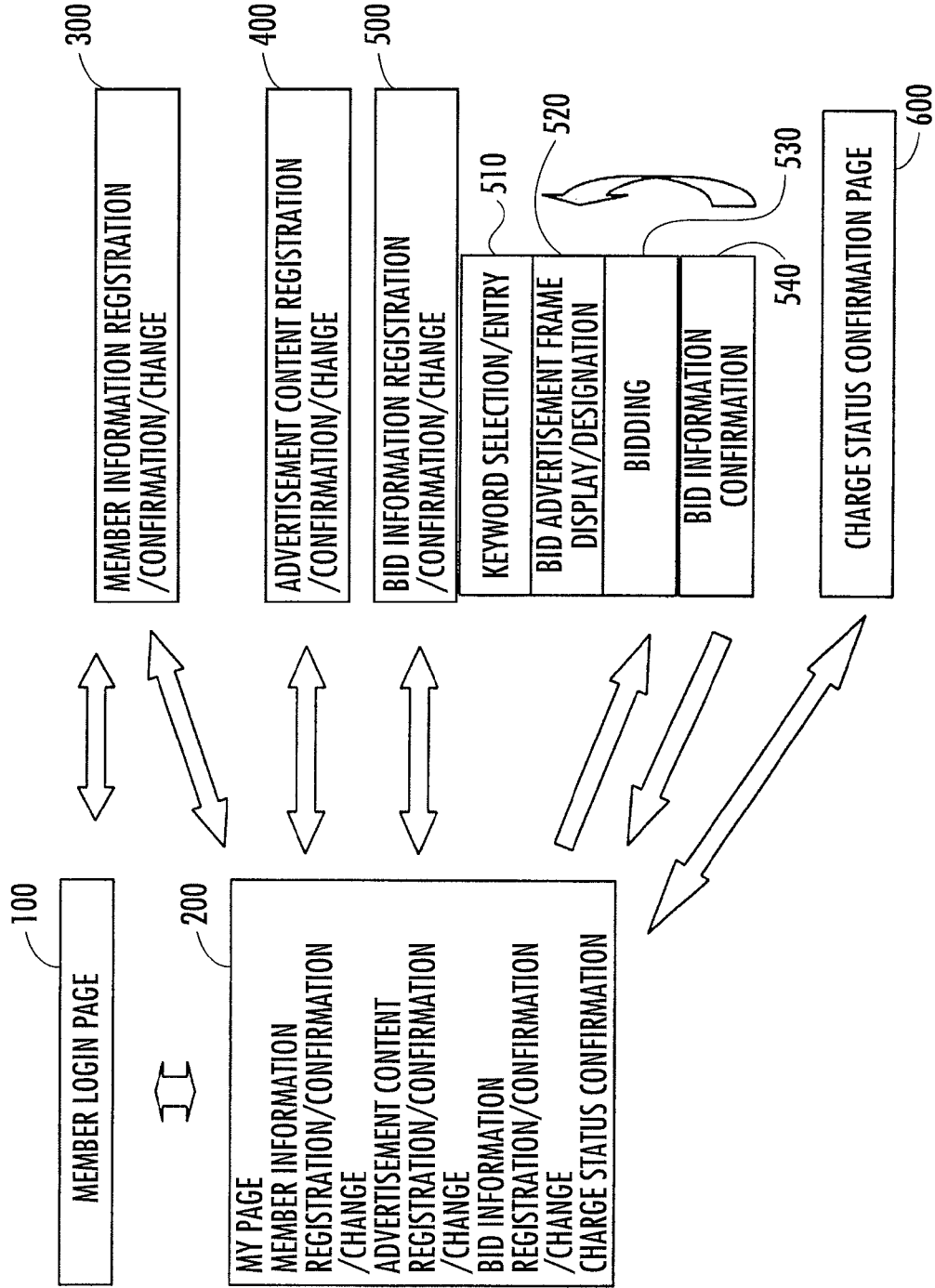
FIG. 7 is a screen transition diagram of an advertiser terminal device by the advertisement server device shown in FIG. 2.

The following describes page structures of pages provided (transmitted) from the advertisement server device 1 to the advertiser terminal device 3-k and the user terminal device 2-k, with reference to FIGS. 7 to 34. As shown in FIG. 7, examples of pages provided to the advertiser terminal device 3-k include a member login page 100, my page 200 which is a top page for enabling the advertiser currently logged in to perform various management such as registration/confirmation/change, a page 300 relating to member information registration/confirmation/change, a page 400 relating to advertisement content registration/confirmation/change, a page 500 relating to bid information registration/confirmation/ change, and a page 600 relating to charge status confirmation. The bid information registration/confirmation/change-related page 500 specifically includes, for example, four types of pages that are a keyword selection/entry page 510, the bid advertisement frame display/designation page 520, the bidding page 530, and a bid information confirmation page 540. Arrows shown in FIG. 7 indicate screen transitions between these pages. On the other hand, examples of pages provided to the user terminal device 2-k include a search page 700 (see FIG. 30) for enabling the user to enter a search word and the search result page 800 (see FIG. 31) for displaying search results for the user.

The page structure of each page is described below, with reference to FIGS. 8 to 34.

Figure 8:
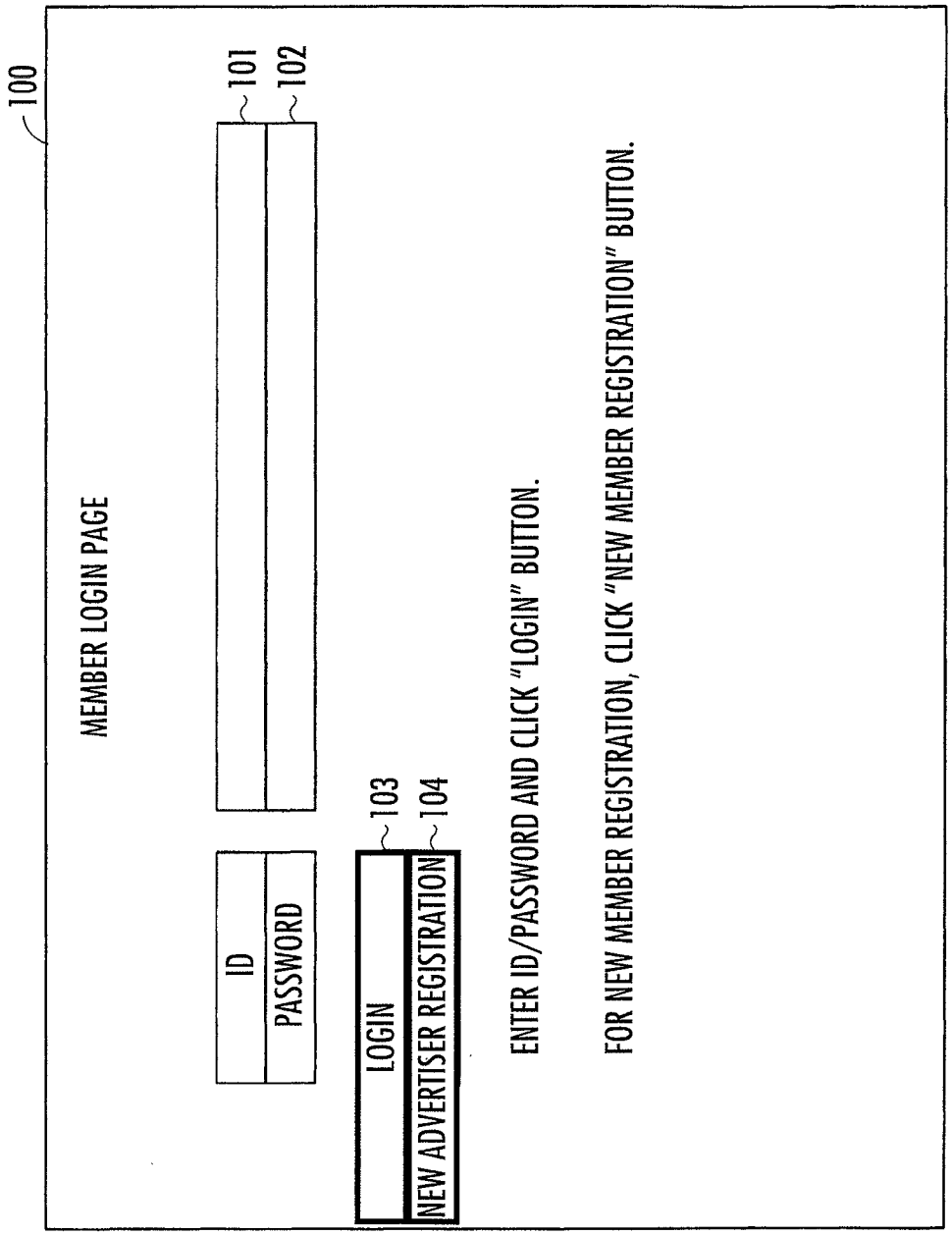
FIG. 8 is a screen display example of a member login page in the advertiser terminal device by the advertisement server device shown in FIG. 2.

The page structure of the member login page 100 is described first, with reference to FIG. 8. FIG. 8 shows a screen display example of the member login page 100. The member login page 100 is a page for enabling the advertiser that is a member of the advertisement display system S to log into the advertisement management site.

As shown in FIG. 8, the member login page 100 includes an advertiser ID entry area 101, a password entry area 102, a login button 103, and a new registration button 104. An entry form for entering an advertiser ID is displayed in the advertiser ID entry area 101, and an entry form for entering a password is displayed in the password entry area 102. When the login button 103 is selected by the advertiser, the authentication means 30 performs password authentication using the advertiser ID and the password entered by the advertiser on the member login page 100. When the password authentication process is successful, a transition is made to my page by the authentication means 30. When the new member registration button 104 is selected, a transition is made to the member information registration/confirmation/change page 300 by the member information registration means 31.

The page structure of the member information registration/confirmation/change-related page 300 is described below, with reference to FIGS. 9 and 10. FIG. 9 shows a screen display example of the member information registration/confirmation/change page (top page) 300, and FIG. 10 shows a screen display example of a member information confirmation page 310 transitioned from the member information registration/confirmation/change page 300. The member information registration/confirmation/change page 300 is a page for enabling the advertiser to register in the advertisement display system S as a new member, confirm information about the advertiser itself that is a member of the advertisement display system S, and register/change/delete the information and the like.

For instance, the member information registration/confirmation/change page 300 is a page to which a transition is made when the new member registration button 104 is selected in the member login page 100, when a member information registration/confirmation/change link is selected in my page 200, and when a reentry button is selected in the member information confirmation page 310.

As shown in FIG. 9, the member information registration/confirmation/change page 300 includes a member information display/entry area 301, a registration button 302, and a "return" button 303. Each entry form for displaying/entering information about the advertiser such as a member name, a postal code, and an address is displayed in the member information display/entry area 301. Note that, in the case of a transition from my page 200, information stored in the member information database 22 in association with the advertiser ID is changeably displayed in each corresponding entry form.

When the "return" button 303 is selected by the advertiser, a transition is made back to a page before transitioning to the member information registration/confirmation/change page 300. When the registration button is selected by the advertiser, a transition is made to the member information confirmation page 310.

As shown in FIG. 10, the member information confirmation page 310 includes a member information display area 311, a reentry button 312, and a confirmation button 313. The information displayed/entered in the member information registration/confirmation/change page 300 is displayed in the member information display area 311. When the confirmation button 313 is selected by the advertiser, the information displayed in the member information confirmation page 310 is registered in the member information database 22 as information about the advertiser. When the "reentry" button 312 is selected, a transition is made to the member information registration/confirmation/change page 300.

Figure 11:
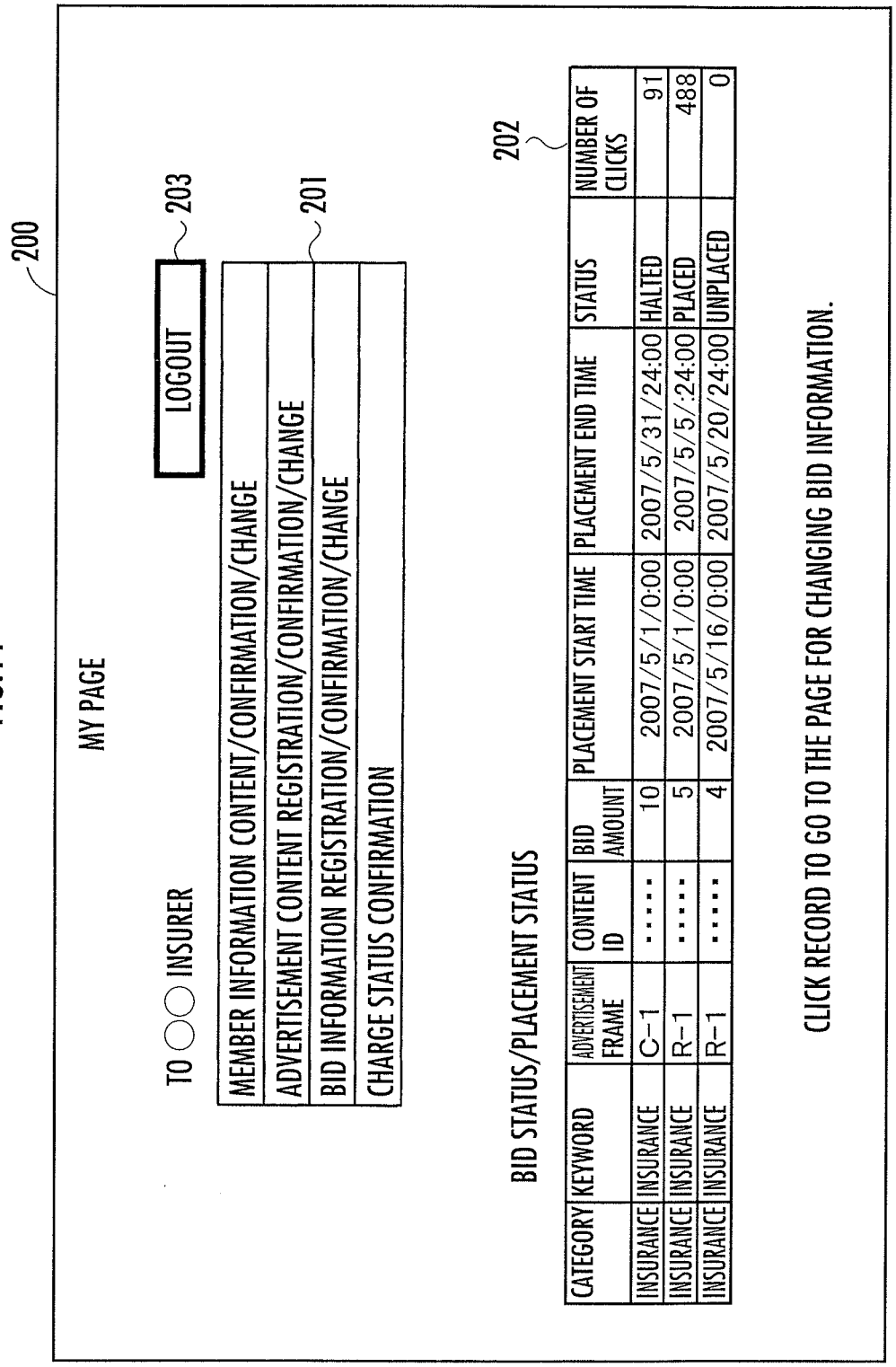
FIG. 11 is a screen display example of my page in the advertiser terminal device by the advertisement server device shown in FIG. 2.

The page structure of my page 200 is described below, with reference to FIG. 11. FIG. 11 shows a screen display example of my page 200. My page 200 is a page for enabling each advertiser that is a member of the advertisement display system S to register/confirm/change member information, advertisement content, and bid information, confirm a charge status or a placement status, and the like. My page 200 is generated based on member information, advertisement content information, bid information, charge information, and the like corresponding to the advertiser ID of the advertiser currently logged in.

For instance, my page 200 is a page to which a transition is made when the login button 103 is selected in the member login page 100 and the password authentication is successful.

As shown in FIG. 11, my page 200 includes a menu selection area 201, a bid status/placement status display area 202, and a logout button 203.

Links to transition to pages for registration/change/confirmation of various information are displayed in the menu selection area 201. When the member information registration/confirmation/change link is selected, a transition is made to the member information registration/confirmation/change page 300 shown in FIG. 9. When an advertisement content registration/confirmation/change link is selected, a transition is made to the advertisement content registration/confirmation/change page 400 shown in FIG. 12. When a bid information registration/confirmation/change link is selected, a transition is made to the keyword selection/entry page 510 which is a top page of the bid information registration/confirmation/change page 500 shown in FIG. 13. When a charge status confirmation link is selected, a transition is made to the charge status confirmation page 600 shown in FIG. 28.

A category, a keyword, an advertisement frame number, a content ID, a bid amount, a status, the number of clicks, and the like of an advertisement bid by the advertiser are displayed in the bid status/placement status display area 202. In the "status" column, "placed" indicates a status where the advertisement is currently displayed, "halted" indicates a status where the advertisement was previously displayed but is currently not displayed, and "unplaced" indicates there is no history of previous or current display.

For instance, the status is set to "halted" when the placement of the advertisement is halted due to the full number of clicks or the full charge amount or when another advertiser acquires a highest bid amount during the placement of the advertisement. By displaying "halted" as the status, the advertiser can become aware of a rebidding opportunity.

In this embodiment, bids from advertisers are executed at any time, and a successful bid is determined when a search is performed by a user. This causes a situation where, even when the advertiser bids, actually the advertisement is not displayed if another advertiser acquires a highest bid amount. In such a case, the status is set to "unplaced". Even in the case of "unplaced", there is a possibility that the advertisement is displayed as a result of the display of the advertisement of the highest bid amount ending (the placement being halted) due to the fulfillment of the advertisement condition such as the full number of clicks or the full total charge amount.

When each record in the bid status/placement status display area 202 is clicked by the advertiser, a transition is made to a bidding screen for the record. For example, when the record of R-1 in the third row is selected and clicked, a transition is made to the bidding page 530 shown in FIG. 16 described later.

Thus, after login, each bid keyword and its bid status/placement status are collectively displayed in my page 200. This enables the advertiser to recognize the bid status/placement status and immediately make a rebid.

When the logout button 203 is selected by the advertiser, a logout process from the advertisement management site is executed, and a transition is made to, for example, a page for notifying the advertiser of logout completion.

Figure 12:
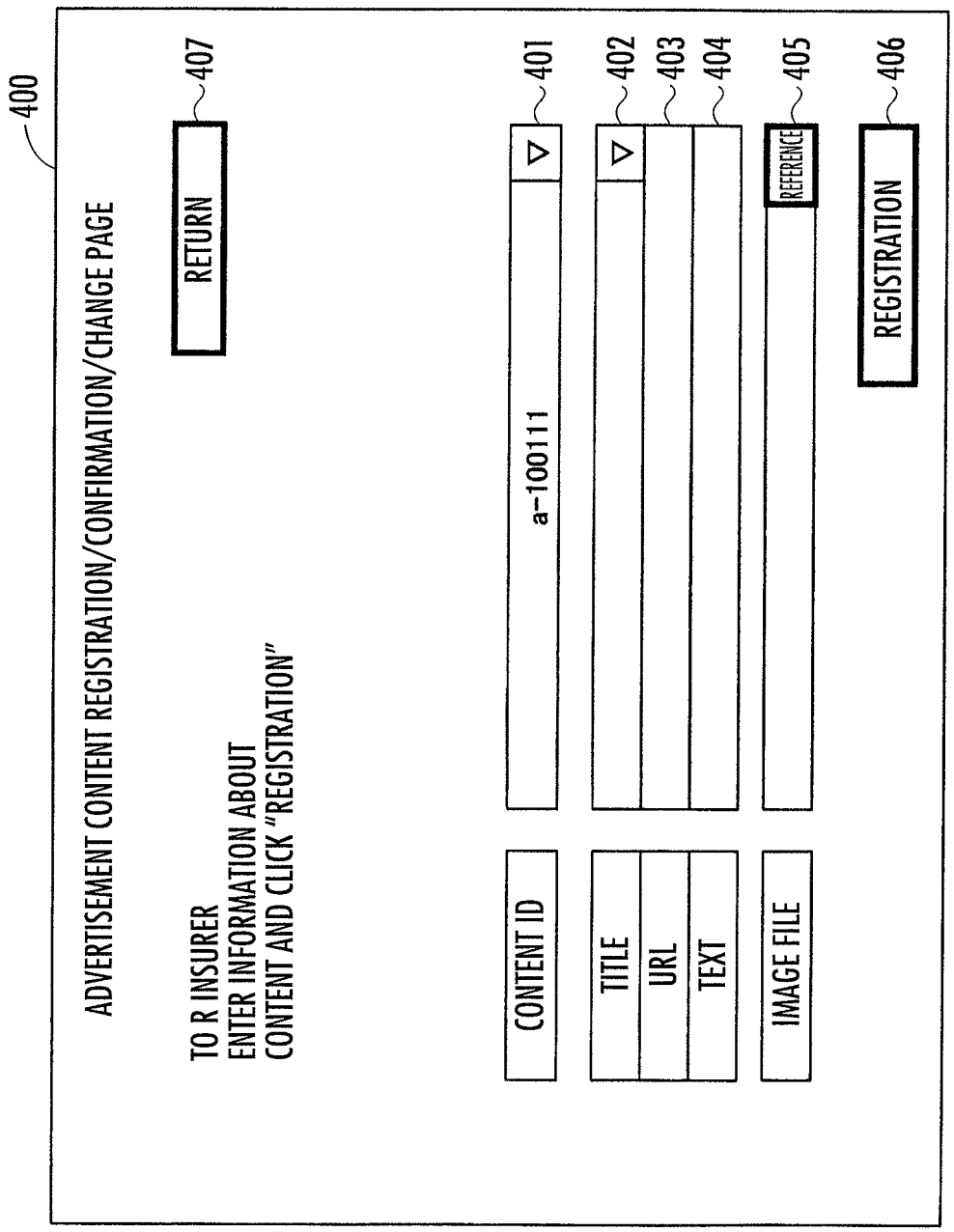
FIG. 12 is a screen display example of a content registration/confirmation/change page in the advertiser terminal device by the advertisement server device shown in FIG. 2.

The page structure of the advertisement content registration/confirmation/change-related page 400 is described below, with reference to FIG. 12. FIG. 12 shows a screen display example of the advertisement content registration/confirmation/change page 400. The advertisement content registration/confirmation/change page 400 is a page for enabling the advertiser to newly register advertisement content to be displayed, confirm/change registered advertisement content, and the like. For instance, the advertisement content registration/confirmation/change page 400 is a page to which a transition is made when the advertisement content registration/confirmation/change link is selected in my page 200.

As shown in FIG. 12, the advertisement content registration/confirmation/change page 400 includes a content ID selection area 401, a title selection/entry area 402, a URL entry area 403, a text entry area 404, an image file reference area 405, a registration button 406, and a return button 407.

A pull-down menu for selecting a content ID is displayed in the content ID selection area 401. In the case where a transition is made to the advertisement content registration/confirmation/change page 400 from another page, an unregistered content ID is always assigned automatically, and this new content ID is displayed on top of a list of the pull-down menu.

An entry box with a pull-down menu for enabling the advertiser to select or enter a title of advertisement content is displayed in the title selection/entry area 402. The advertiser can select advertisement content from the registered titles displayed by the pull-down menu, or directly enter a title associated with the new content ID in the entry box.

An entry form for entering a URL of the advertiser's site or the like is displayed in the URL entry area 403. An entry form for entering text showing the advertisement is displayed in the text entry area 404. When the reference button in the image file entry area 405 is selected by the advertiser, a sub-screen for designating a reference file appears.

In the case of changing already registered advertisement content, a content ID or a title of the advertisement content to be changed is selected by using the pull-down menu of the content ID selection area 401 or the title selection/entry area 402. As a result of selecting the content ID, information of the advertisement content of the selected content ID is displayed in the title selection/entry area 402, the URL display/entry area 403, the text display/entry area 404, and the image file reference area 405. As a result of selecting the title, the ID and information of the advertisement content of the selected title are displayed in the content ID selection area 401, the URL display/entry area 403, the text display/entry area 404, and the image file reference area 405.

When the registration button 406 is selected by the advertiser, the information entered/selected by the advertiser in the advertisement content registration/confirmation/change page 400 is registered in the content database 23 as advertisement content-related information, and a transition is made to my page 200. When the "return" button 407 is selected, a transition is made to my page 200.

The page structure of the bid information registration/confirmation/change page 500 is described below, with reference to FIGS. 13 to 30.

Figure 13:
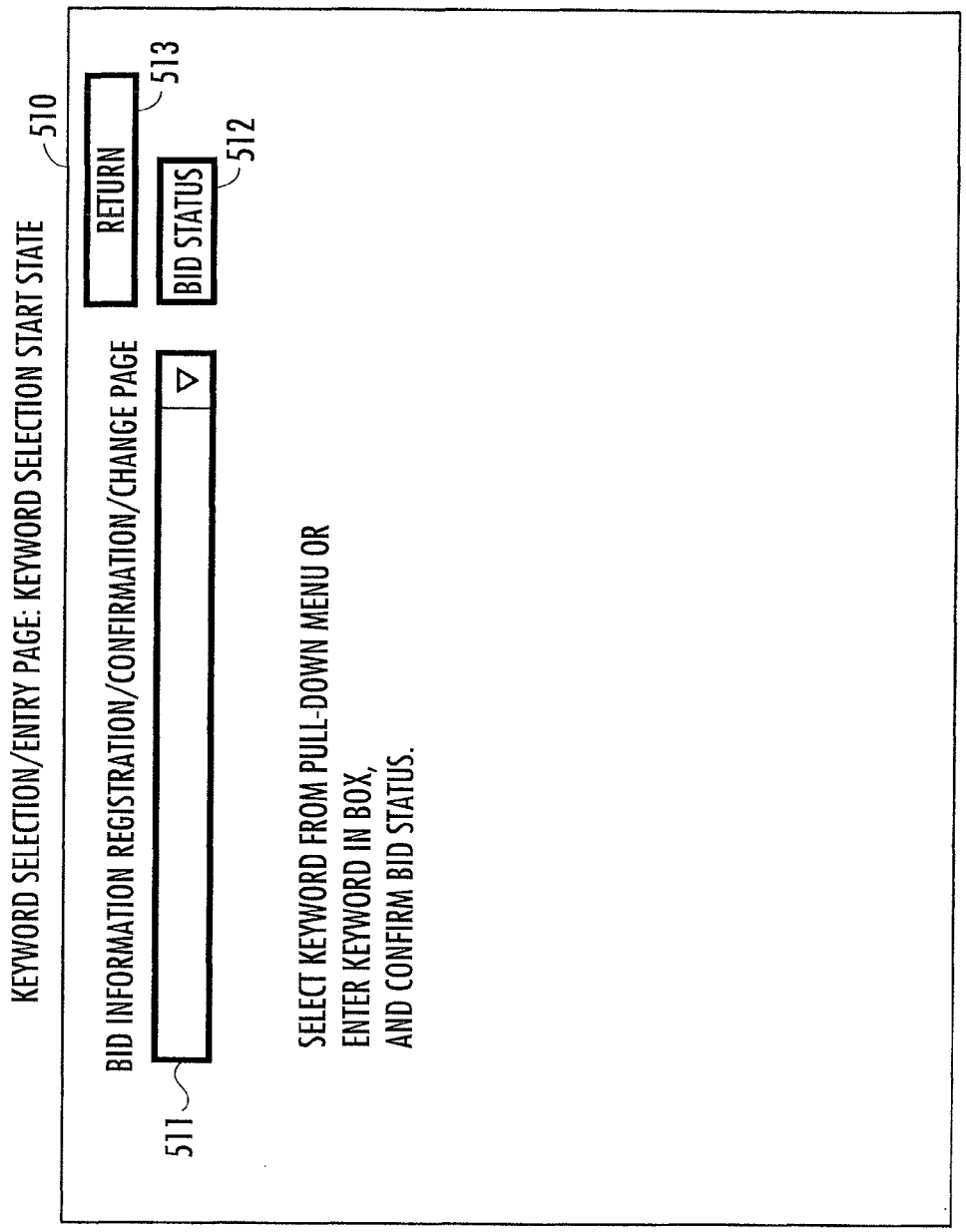
FIG. 13 is a screen display example of a keyword selection/entry page in the advertiser terminal device by the advertisement server device shown in FIG. 2.

First, the page structure of the keyword selection/entry page 510 which is the top page of the bid information registration/confirmation/change page 500 is described below, with reference to FIGS. 13, 14, and 26. FIG. 13 shows a screen display example of an initial state (a search word selection start state) of the keyword selection/entry page 510 which is the top page of the bid information registration/confirmation/change page 500. For instance, this keyword selection/entry page 510 is a page to which a transition is made when the bid information registration/confirmation/change link is selected in my page 200.

As shown in FIG. 13, the keyword selection/entry page 510 includes a keyword selection/entry area 511, a bid status confirmation button 512, and a "return" button 513.

An entry box with a pull-down menu for enabling the advertiser to select or enter a keyword which is a search word is displayed in the keyword selection/entry area 511. The advertiser can select a keyword from the registered keywords displayed by the pull-down menu, or directly enter a keyword in the entry box. When a keyword is selected or entered in the keyword selection/entry page 510, a transition is made to the bid advertisement frame display/designation page 520 described later.

When the "return" button 513 is selected by the advertiser, a transition is made to the previous page. When the bid status confirmation button 512 is selected by the advertiser, a transition is made to the bid information confirmation page 540 described later for the keyword selected or entered in the keyword selection/entry area 511.

FIG. 14 shows a screen display example when the entry box of the keyword selection/entry area 511 is pulled down in the keyword selection/entry page 510 shown in FIG. 13. For instance, keywords are classified by category such as insurance, finance, shopping, and the like, as shown in FIG. 14. As an example, the keywords such as insurance, auto insurance, life insurance, and the like are registered in the category "insurance".

FIG. 26 shows a screen display example when the advertiser directly enters an unregistered keyword in the entry box of the keyword selection/entry area 511 in the keyword selection/entry page 510 shown in FIG. 13. This corresponds to the case where the advertiser generates and bids for a keyword which is not bid by any entity. Thus, the advertiser can freely enter a keyword in the entry box of the keyword selection/entry area 511. Whether or not the entered keyword is registered can be determined by selecting the bid status confirmation button 512, transitioning to the bid advertisement frame display/designation page 520, and checking the bid status, or by performing a search process on the search page 700 using the entered keyword as a search word and checking the search result page 800.

The page structure of the bid advertisement frame display/designation page 520 is described below, with reference to FIGS. 15 and 27. FIG. 15 shows a screen display example of the bid advertisement frame display/designation page 520 to which a transition is made when the keyword "insurance" is selected in the keyword selection/entry page 510 shown in FIG. 14. This bid advertisement frame display/designation page 520 is generated based on bid information stored in the bid database 24.

As shown in FIG. 15, this bid advertisement frame display/designation page 520 includes an advertisement frame group display/designation area 523 and a "return" button 522. When the "return" button 522 is selected, a transition is made back to the keyword selection/entry page 510 before the transition to the bid advertisement frame display/designation page 520.

A plurality of (six in this screen display example) advertisement frames C-1, C-2, C-3, R-1, R-2, and R-3 that are biddable by the advertiser for the selected keyword are displayed in the advertisement frame group display/selection area 523. In this embodiment, a bid is accepted for each advertisement frame. Accordingly, by preparing a plurality of advertisement frames, the same advertiser can successfully bid for all advertisement frames. For example, when the advertiser wants to place an advertisement intensively for a short period of time, the advertiser can display the same or relevant advertisements in all advertisement frames by bidding with a bid amount exceeding the current bid amount.

For an advertisement frame which is bid, each set of bid information stored in the bid database 24 for the advertisement frame is displayed in a recognizable manner, with a predetermined number of records (for example, six records in this embodiment) being set as an upper limit. In detail, for the advertisement frame C-1 as an example, three records registered in the bid database 24 are overlap-displayed while being shifted in position by a predetermined distance, as shown in FIG. 15. Each set of bid information is shown with a solid line box, and the frontmost bid information is displayed with the advertiser and bid amount shown in the box. The order of display is determined based on the bid amount, the advertisement placement period, and the like. For instance, bid information with a higher bid amount and an earlier advertisement placement period is displayed more in the front. Thus, the predetermined number of sets of bid information registered for each advertisement frame are each displayed in a recognizable manner, so that the advertiser can easily understand the current bid status of the advertisement frame.

Here, bid information of the advertiser (company) itself currently in a bidding operation is displayed so as to be distinguishable from bid information of other advertisers. In detail, the bid information (the bid information hatched in FIG. 15) of the advertiser is displayed in a chromatic color in this embodiment. This enables the advertiser to easily understand its bid status, and designate and bid for a desired advertisement frame.

Meanwhile, an advertisement frame which is not bid is shown with a dashed line box, where "no bid" is displayed in the box. By displaying the bid advertisement frame and the unbid advertisement frame in such a distinguishable manner, the unbid advertisement frame can be easily recognized.

Preferably, in the bid advertisement frame display/designation page 520, the positional relationship of the advertisement frames C-1, C-2, C-3, R-1, R-2, and R-3 in the advertisement frame group display/designation area 523 is substantially in the same layout as the page which is generated for the user at the time of search. By displaying the advertisement frames in such a layout, the advertiser can select an advertisement frame desirable for the advertiser from the user's point of view.

When an advertisement frame is clicked by the advertiser, a transition is made to the bidding page 530 described later (see FIG. 16). Thus, the advertiser can designate a desired advertisement frame while recognizing each advertisement frame on the screen through the bid advertisement frame display/designation page 520, and easily bid for the advertisement frame in the bidding page 530.

Figure 27:
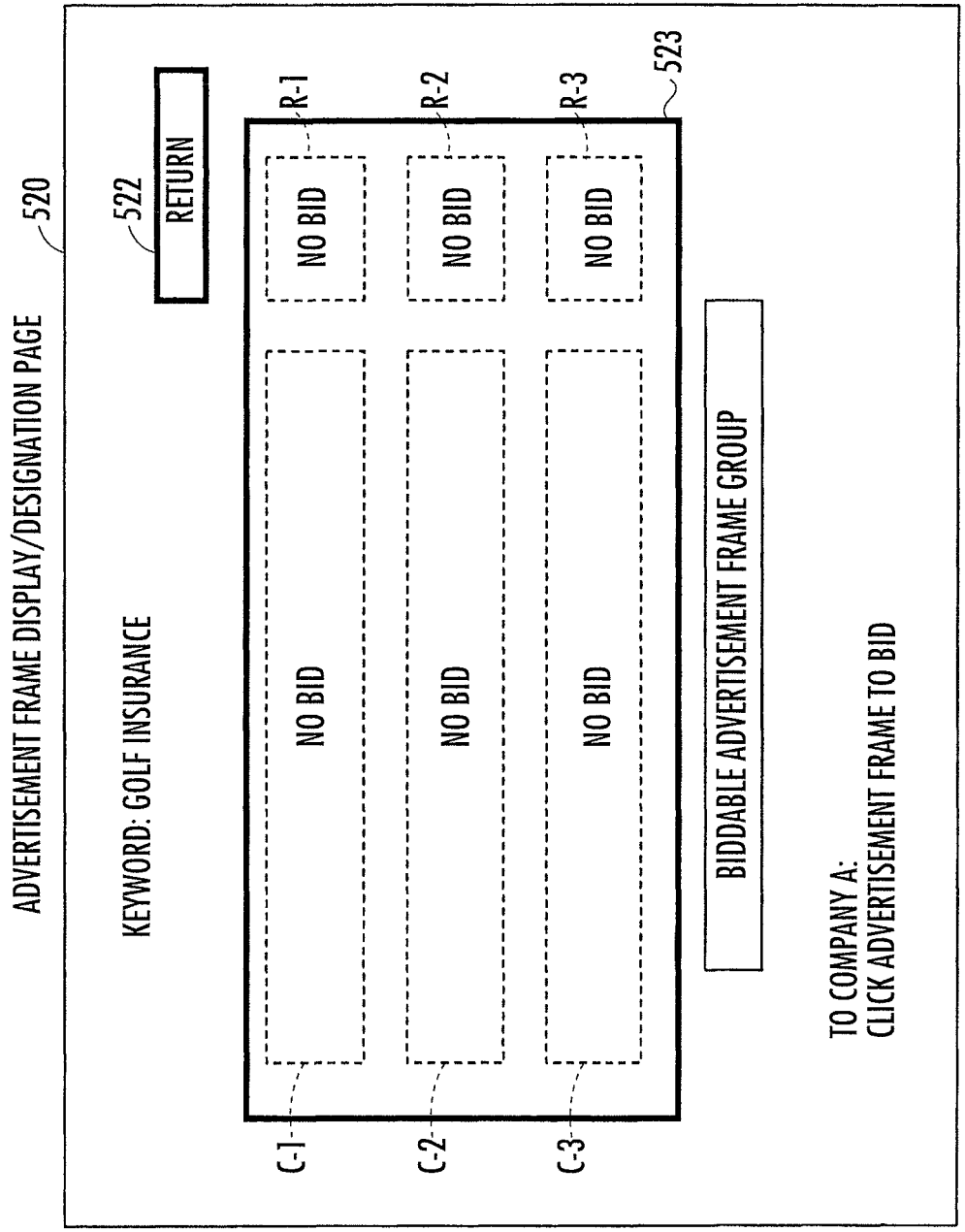
FIG. 27 is a screen display example of the bid advertisement frame display/designation page transitioned from the bidding page shown in FIG. 26.

FIG. 27 shows a screen display example of the bid advertisement frame display/designation page 520 to which a transition is made when the advertiser enters the unregistered keyword "golf insurance" and selects the bid status confirmation button 512 in the keyword selection/entry page 510 shown in FIG. 26. In this case, the selected keyword "golf insurance" is an unregistered keyword. Accordingly, in the bid advertisement frame display/designation page 520, a plurality of (six in this screen display example) advertisement frames biddable by the advertiser are all not bid, and so they are shown with a dashed line box with "no bid" being displayed in the box.

The page structure of the bidding page 530 is described below, with reference to FIGS. 16 to 18, 20 to 24, and 28. FIG. 16 shows a screen display example of the bidding page 530 to which a transition is made when the top right advertisement frame R-1 is designated in the bid advertisement frame display/designation page 520 shown in FIG. 15. This bidding page 530 includes a designated advertisement frame bid status display calendar 533a, an advertisement placement period display area 533b, a bid amount entry area 534, a bid registration button 535, an advertisement content selection area 536, an advertisement content entry button 537, a click number upper limit check box 538a, a maximum number of clicks entry area 538b, a charge amount upper limit check box 539a, and a maximum charge amount entry area 539b, in addition to a "return" button 532 similar to that in the bid advertisement frame display/designation page 520 shown in FIG. 15.

A bid status of the advertisement frame designated for the selected keyword is displayed in the bid status display calendar 533a, in chronological order of advertisement placement periods. In this embodiment, the bid status display calendar 533a has a horizontal axis as a time axis, where dates are shown at the top. A predetermined number of sets of bid information are listed in decreasing order of bid amount from the top, and the bid amounts are shown at the left.

An advertisement placement period of each set of bid information is shown in the corresponding row of the bid status display calendar 533a. Here, bid information of the advertiser (company) itself currently in a bidding operation is displayed so as to be distinguishable from bid information of other advertisers. In detail, the company name "company A" is displayed at the left of the bid information of the advertiser, and an advertisement placement period (a hatched portion in FIG. 16) bid by the advertiser and an advertisement placement period (a stippled portion in FIG. 16) bid by any of the other advertisers are displayed in different chromatic colors. This allows the advertiser to easily understand the bid statuses of the advertiser itself and the other advertisers and make an appropriate bid.

Moreover, in each row of the bid status display calendar 533a, for the bids of the advertiser and the other advertisers, the current successful bid amount for each advertisement placement period is displayed in an identifiable manner. In detail, as exemplified in FIG. 16, a portion corresponding to the current successful bid amount for each advertisement placement period is highlighted by thick solid lines on the bid status display calendar 533a. For instance, in the example shown in FIG. 16, the current successful bid amount is 5 yen in the first row from the top from 1st to 5th, 1 yen in the fourth row from the top from 6th to 10th, and 4 yen in the second row from the top from 16th to 20th.

In addition, the arrow display in the bid status display calendar 533a indicates that an upper limit for restricting a charge amount is set, as exemplified in the third row from the top in FIG. 16. In such a case, there is a possibility that the advertisement placement is halted and the lower ranking advertisement content is displayed. Therefore, the highest bid amount from 11th to 15th and from 21st to 31st exemplified in FIG. 16 is not highlighted as the successful bid amount.

Furthermore, a remarks display area is provided at the right of the bid status display calendar 533a. For instance, the remarks display area indicates that a new record is added by a bidding operation, an upper limit for restricting a charge amount is set, and there is a possibility of display when higher ranking advertisement placement is halted.

Thus, based on the bid status display calendar 533a, the advertisement placement period of each current set of bid information for the designated advertisement frame can be visually understood with ease. This makes it possible to perform bidding while easily recognizing an appropriate bid amount for each desired advertisement placement period. For example, in the case where a sale period of company A is from 21st to 25th, company A can designate this period as an advertisement placement period, and make an appropriate bid with a bid amount higher than 2 yen because it is visually easy to understand that the current highest bid amount in this period is 2 yen.

An entry form for entering a bid amount for the selected keyword and the designated advertisement frame is displayed in the bid amount entry area 534. Note that, when a transition is made from the bid advertisement frame display/designation page 520 to the bidding page 530, an amount (6 yen in the example of FIG. 16) exceeding the current highest bid amount in all advertisement placement periods is displayed in the bid amount entry area 534 as a default value.

A start time and an end time of advertisement placement for setting an advertisement placement period corresponding to the bid amount entered in the bid amount entry area 534 are displayed in the advertisement placement period display area 533b. When the bid registration button 535 is selected by the advertiser, a transition is made to the bid information confirmation page 540 described later (see FIG. 19).

A pull-down menu for selecting advertisement content is displayed in the advertisement content selection area 536. When the advertisement content entry button 537 is selected by the advertiser, a transition is made to the advertisement content registration/confirmation/change page 400 described earlier (see FIG. 12).

An entry form for entering a maximum number of clicks is displayed in the maximum number of clicks entry area 538b. An entry form for entering a maximum charge amount is displayed in the maximum charge amount entry area 593b. When the click number upper limit check box 538a is checked by the advertiser, the click number upper limit flag is set to 1. When the charge amount upper limit check box 539a is checked by the advertiser, the charge amount upper limit flag is set to 1.

FIG. 17 shows a screen display example during an operation of bidding for the period from 16th to 20th with 5 yen, in the case where company A designates and bids for the advertisement frame "R-1" for the keyword "insurance" as shown in FIG. 16. In the screen display example shown in FIG. 17, the advertiser (company A) performs an operation of dragging the period of 16th to 20th on the dates shown at the top of the bid status display calendar 533a, thereby designating the period as an advertisement placement period. As a result of this drag operation, the start time ("2007/05/16 00:00~") and the end time ("2007/05/20 24:00") of advertisement placement are automatically displayed in the advertisement placement period display area 533b. Thus, according to this embodiment, it is possible to easily designate an advertisement placement period and perform a bidding operation. Moreover, the lowest bid amount for a successful bid in the period of 16th to 20th, i.e., 5 yen, is automatically entered in the bid amount entry area 534. By clicking the bidding button 535 in this state, the bid amount for the advertisement placement period is accepted, a new record is added to the bid database 24, and bid information indicating that the period of 16th to 20th is bid with 5 yen is registered.

FIG. 18 shows a screen display example of the bidding page 530 after an operation of bidding for the period of 16th to 20th with 5 yen and bidding for the period of 21st to 25th with 3 yen, in the case where company A designates and bids for the advertisement frame "R-1" for the keyword "insurance" as shown in FIG. 17. As shown in FIG. 18, two records of bid information of company A are newly added in the second and fourth rows from the top on the bid status display calendar 533a. On the bid status display calendar 533a, the portions corresponding to the bid amounts of company A are highlighted by thick solid lines, as the current successful bid amounts for the period of 16th to 20th and the period of 21st to 25th. Since the identifiable record of the advertiser itself is displayed at the highest ranking, the advertiser can easily recognize that its advertisement is to be displayed.

FIG. 20 shows a screen display example of the bidding page 530 before a bidding operation in the case where, after company A bids as shown in FIGS. 16 to 18, company B logs into as an advertiser, and designates and bids for the advertisement frame "R-1" for the keyword "insurance". As shown in FIG. 18, bid information of company B is shown in the first and third rows from the top on the bid status display calendar 533a. Based on the bid status display calendar 533a, it is visually easy to understand that the bid by another advertiser (company A) with 5 yen (the second row from the top) is ranked higher than the bid by company B with 4 yen (the third row from the top) in the period of 16th to 20th for which company B wants to place an advertisement.

FIG. 21 shows a screen display example during an operation of bidding for the period of 16th to 20th with 6 yen, in the case where company B designates and bids for the advertisement frame "R-1" for the keyword "insurance" as shown in FIG. 20. In the screen display example shown in FIG. 21, the advertiser (company B) performs an operation of dragging the period of 16th to 20th on the dates shown at the top of the bid status display calendar 533a, thereby designating the period as an advertisement placement period. As a result of this drag operation, the start time ("2007/05/16 00:00~") and the end time ("2007/05/20 24:00") of advertisement placement are automatically displayed in the advertisement placement period display area 533b. Moreover, the lowest bid amount for a successful bid in the period of 16th to 20th, i.e., 6 yen, is automatically entered in the bid amount entry area 534. By clicking the bidding button 535 in this state, the bid amount for the advertisement placement period is accepted, a new record is added to the bid database 24, and bid information indicating that the period of 16th to 20th is bid with 6 yen is registered. Thus, the bid information of company B is added to the first row of the bid status display calendar 533a as a new record. On the bid status display calendar 533a, the portion corresponding to the bid amount of company B is highlighted by thick solid lines, as the current successful bid amount for the period of 16th to 20th.

Figure 22:
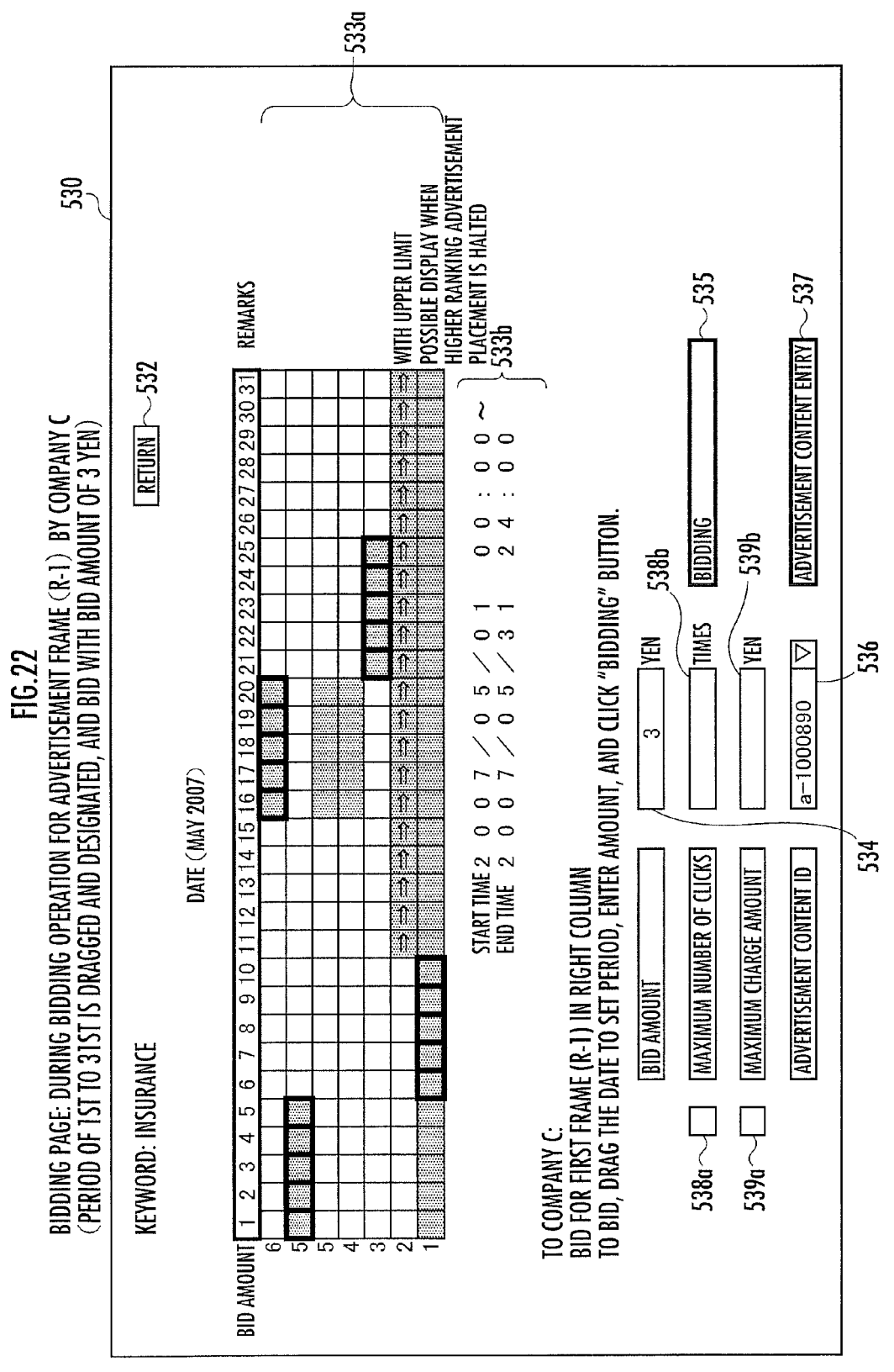

FIG. 22 shows a screen display example of the bidding page 530 during a bidding operation in the case where, after company B bids as shown in FIG. 21, company C logs into as an advertiser, designates the advertisement frame "R-1" for the keyword "insurance", and bids for the period of 1st to 31st with 3 yen. Based on the bid status display calendar 533a, it is easily understood that there is no bid information of company C before the bidding operation, as shown in FIG. 22.

In the screen display example shown in FIG. 22, the advertiser (company C) performs an operation of dragging the period of 1st to 31st on the dates shown at the top of the bid status display calendar 533a, thereby designating the period as an advertisement placement period. As a result of this drag operation, the start time ("2007/05/01 00:00~") and the end time ("2007/05/31 24:00") of advertisement placement are automatically displayed in the advertisement placement period display area 533b. Moreover, the lowest bid amount for a successful bid in the period of 1st to 31st, i.e., 3 yen, is automatically entered in the bid amount entry area 534. By clicking the bidding button 535 in this state, the bid amount for the advertisement placement period is accepted, a new record is added to the bid database 24, and bid information indicating that the period of 1st to 31st is bid with 3 yen is registered.

FIG. 23 shows a screen display example of the bidding page 530 after the operation of bidding the period of 1st to 31st with 3 yen, in the case where company C designates and bids for the advertisement frame "R-1" for the keyword "insurance" as shown in FIG. 22. As shown in FIG. 23, the bid information of company C is added as a new record in the sixth row from the top on the bid status display calendar 533a. On the bid status display calendar 533a, the portions corresponding to the bid amount of company C are highlighted by thick solid lines as the current successful bid amount for the period of 6th to 15th and the period of 26th to 31st.

FIG. 24 shows a screen display example of the bidding page 530 before a bidding operation, to which a transition is made when company A designates the bottom middle advertisement frame C-3 in the bid advertisement frame display/designation page 520 shown in FIG. 17. This corresponds to the case of bidding for an advertisement frame which is not bid by any entity. In such a case, only an empty record of company A is displayed on the bid status display calendar 533a in the bidding page 530. Moreover, 1 yen is displayed in the bid amount entry area 534 as a default value.

FIG. 28 shows a screen display example of the bidding page 530 before a bidding operation, to which a transition is made when the advertiser (company A) designates the top middle advertisement frame C-1 in the bid advertisement frame display/designation page 520 shown in FIG. 27. In this case too, only an empty record of company A is displayed on the bid status display calendar 533a in the bidding page 530, as in FIG. 24. Moreover, 1 yen is displayed in the bid amount entry area 534 as a default value.

The page structure of the bid information confirmation page 540 is described below, with reference to FIGS. 19, 25, and 29. FIG. 19 shows a screen display example of the bid information confirmation page 540 to which a transition is made when the bidding button is selected in the bidding page 530 shown in FIG. 18. This bid information confirmation page 540 includes an advertisement frame group display area 543, a registration button 544, and an other frame bidding button 545, in addition to a "return" button 542 similar to that in the bidding page 530 shown in FIG. 16.

A plurality of (six in this screen display example) advertisement frames C-1, C-2, C-3, R-1, R-2, and R-3 that are biddable by the advertiser for the selected keyword are displayed in the advertisement frame group display area 543, as in the advertisement frame group display/designation area 523 in the bid advertisement frame display/designation page 520. For an advertisement frame which is bid, each set of bid information stored in the bid database 24 for the advertisement frame is displayed in a recognizable manner, with a predetermined number of records (for example, six records in this embodiment) being set as an upper limit. Furthermore, each set of bid information is shown with a solid line box, and the frontmost bid information is displayed with the advertiser and bid amount shown in the box. The order of display is determined based on the bid amount, the advertisement placement period, and the like. For instance, bid information with a higher bid amount and an earlier advertisement placement period is displayed more in the front. Here, bid information of the advertiser (company) itself currently in a bidding operation is displayed so as to be distinguishable from bid information of other advertisers. On the other hand, an advertisement frame which is not bid is shown with a dashed line box, where "no bid" is displayed in the box. In this way, the advertiser can easily confirm its bid information.

In detail, for the advertisement frame R-1 as an example, six records registered in the bid database 24 are overlap-displayed while being shifted in position by a predetermined distance, as shown in FIG. 19. The bid information (the bid information hatched in FIG. 19) of the advertiser is displayed in a chromatic color. This allows the advertiser to confirm that its bid information is registered in the second, fourth, and sixth places for the bid advertisement frame R-1.

When the registration button 544 is selected by the advertiser, information such as a keyword, an advertisement frame, advertisement content, an advertisement placement period, and a bid amount entered/selected by the advertiser is registered in the bid database 24 as bid information, and a transition is made to my page 200 (see FIG. 11). When the other frame bidding button 545 is selected by the advertiser, a transition is made to the bid advertisement frame display/designation page 520 described earlier (see FIG. 15).

FIG. 25 shows a screen display example of the bid information confirmation page 540 to which a transition is made when the bidding button is selected in the bidding page 530 shown in FIG. 24. In the bidding page 520 in this case, for each of the five advertisement frames which are bid for the selected keyword "insurance", each set of bid information stored in the bid database 24 for the advertisement frame is displayed in a recognizable manner in the advertisement frame group display area 543, with a predetermined number of records being set as an upper limit. On the other hand, one advertisement frame which is not bid is shown with a dashed line box, where "no bid" is displayed in the box. This allows the advertiser to confirm that its bid information is registered in the first place for the bid advertisement frame C-3.

Figure 29:
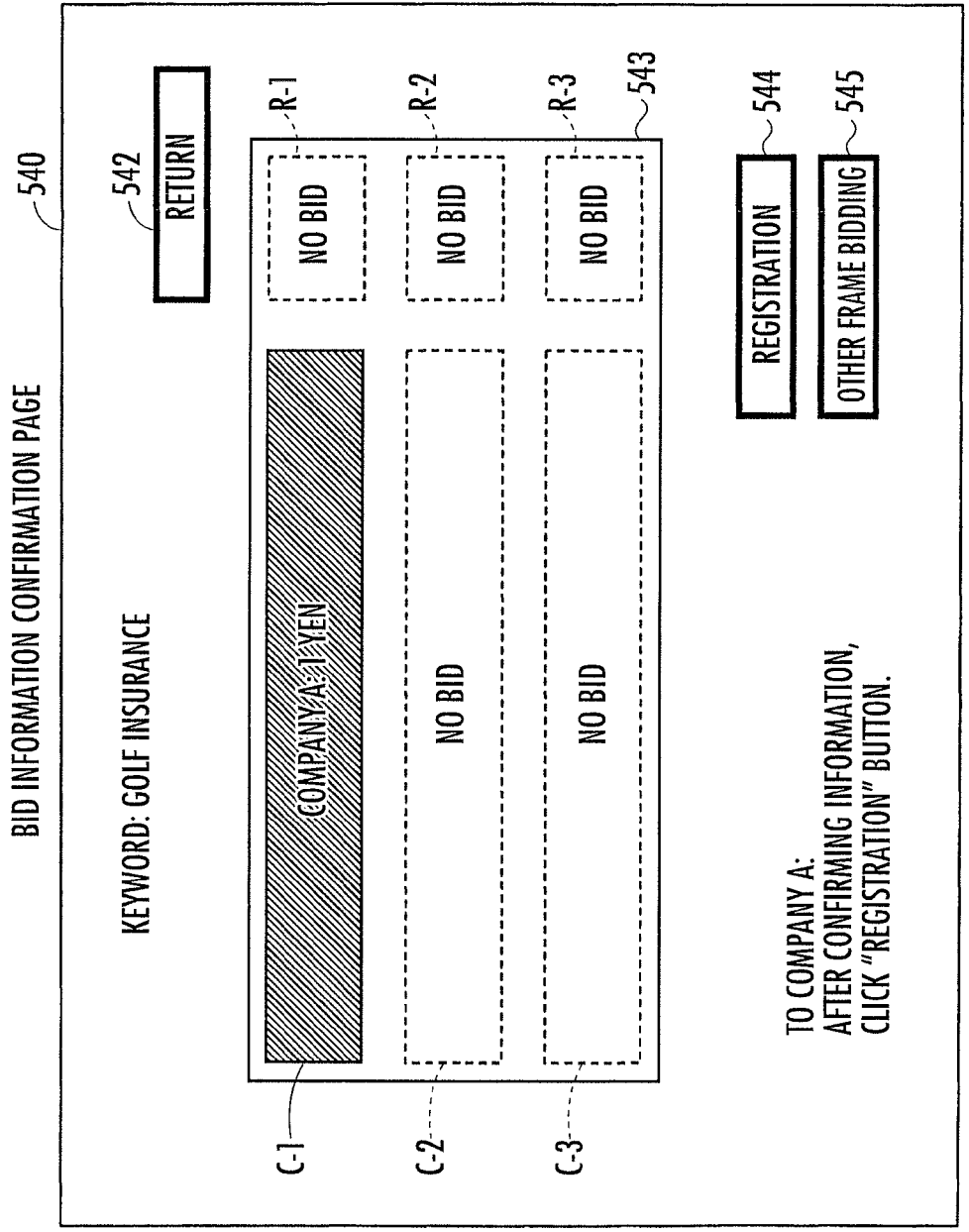
FIG. 29 is a screen display example of the bid information confirmation page transitioned from the bidding page shown in FIG. 28.

FIG. 29 shows a screen display example of the bid information confirmation page 540 to which a transition is made when the bidding button 535 is selected in the bidding page 530 shown in FIG. 28. In the bid information confirmation page 540 in this case, for one advertisement frame C-1 bid by the advertiser for the entered keyword "golf insurance", bid information stored in the bid database 24 for the advertisement frame C-1 is displayed in the advertisement frame group display area. On the other hand, five advertisement frames each of which is not bid are shown with a dashed line box, where "no bid" is displayed in the box. This allows the advertiser to confirm that its bid information is registered in the first place for the bid advertisement frame C-1.

The page structure of the search page 700 provided to the user terminal device is described below, with reference to FIGS. 30 and 32. For example, the search page 700 is a top page of the search site.

Figure 30:
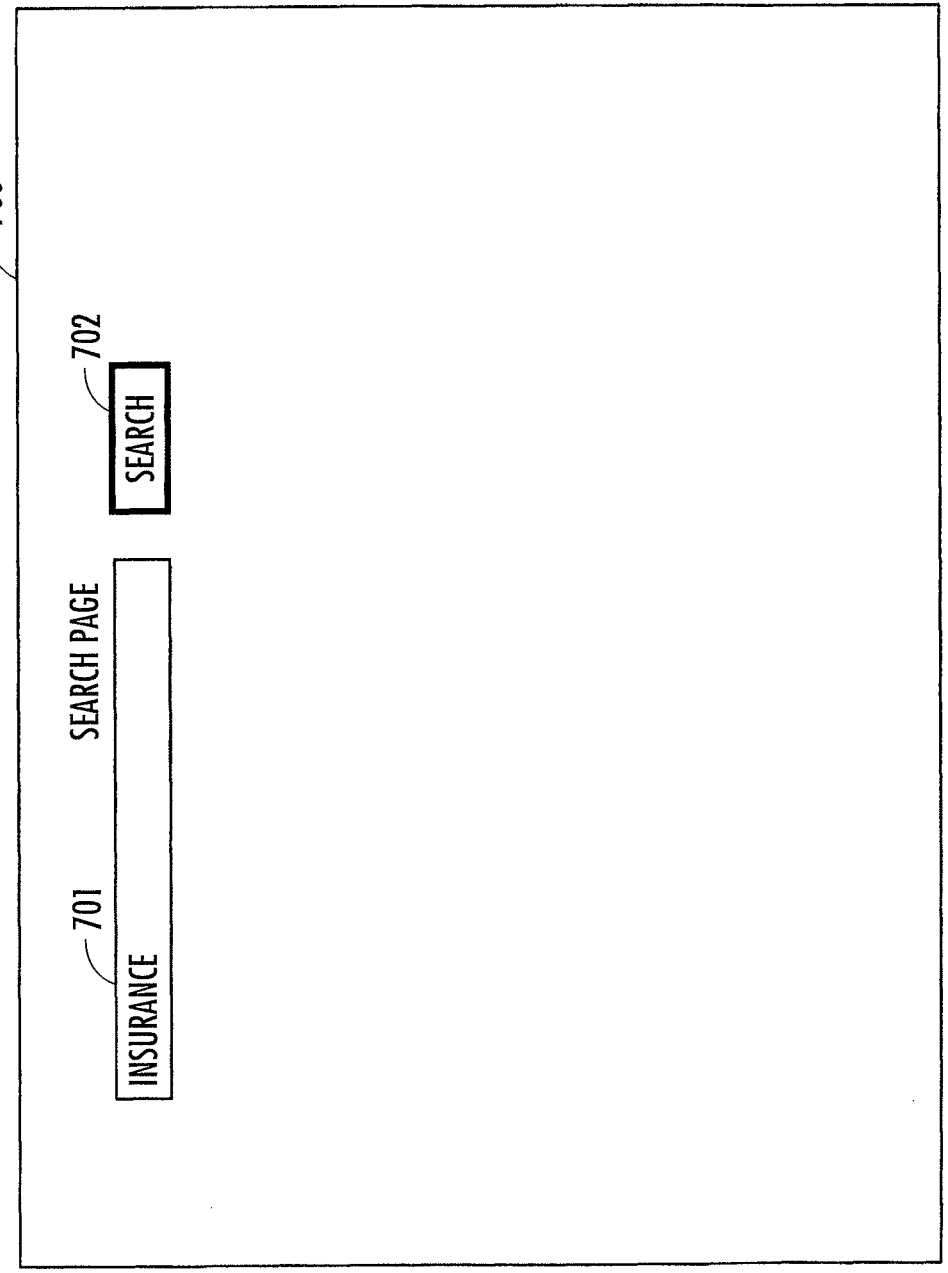
FIG. 30 is a screen display example of a search page in a user terminal device shown in FIG. 1.

As shown in FIG. 30, the search page 700 includes a search word entry area 701 and a search button 702. An entry form for entering a search word is displayed in the search word entry area 701. When the search button 702 is selected by the user, a search process is executed based on the search word 701 entered through the search page 700, and also a process of adding advertisement content to search results of the search process is executed, after which a transition is made to the search result page 800 (see FIG. 31). In an image example of the search page 700 shown in FIG. 30, "insurance" is entered as a search word. In an image example of the search page 700 shown in FIG. 32, "golf insurance" is entered as a search word.

The page structure of the search result page 800 provided to the user terminal device 2-k is described below, with reference to FIGS. 31 and 32. FIG. 31 shows an image example of the search result page 800 to which a transition is made when "insurance" is entered as a search word and the search button 702 is selected in the search page 700 shown in FIG. 30. The search result page 800 is generated using search results based on the search word, bid information, and information relating to advertisement content. For instance, the search result page 800 is a page to which a transition is made when a search word is entered and the search button 702 is selected in the search page 700.

As shown in FIG. 31, the search result page 800 includes an advertisement display space 803, a search result list display area 804, and a member registration button 805, in addition to a search word entry area 801 and a search button 802 similar to those in the search page 700.

Advertisement content associated with the search word is displayed in the advertisement display space 803, at a position and a size corresponding to a bid advertisement frame. That is, a title, a URL, text, an image, and the like stored in the content database 23 are displayed in the advertisement frame. When doing so, instead of explicitly displaying the URL, a predetermined address corresponding to the URL may be presented. A list of web sites relevant to the search word is displayed in the search result list display area 804, as the search results based on the search word. It is preferable to visually distinguish each advertisement frame in the advertisement space area 803 from the list in the search result list display area, for example by changing a character color or a background color.

When the member registration button 805 is selected by the user (the user wants to become a member as an advertiser in this case), a transition is made to the above-mentioned member login page 100.

Figure 32:
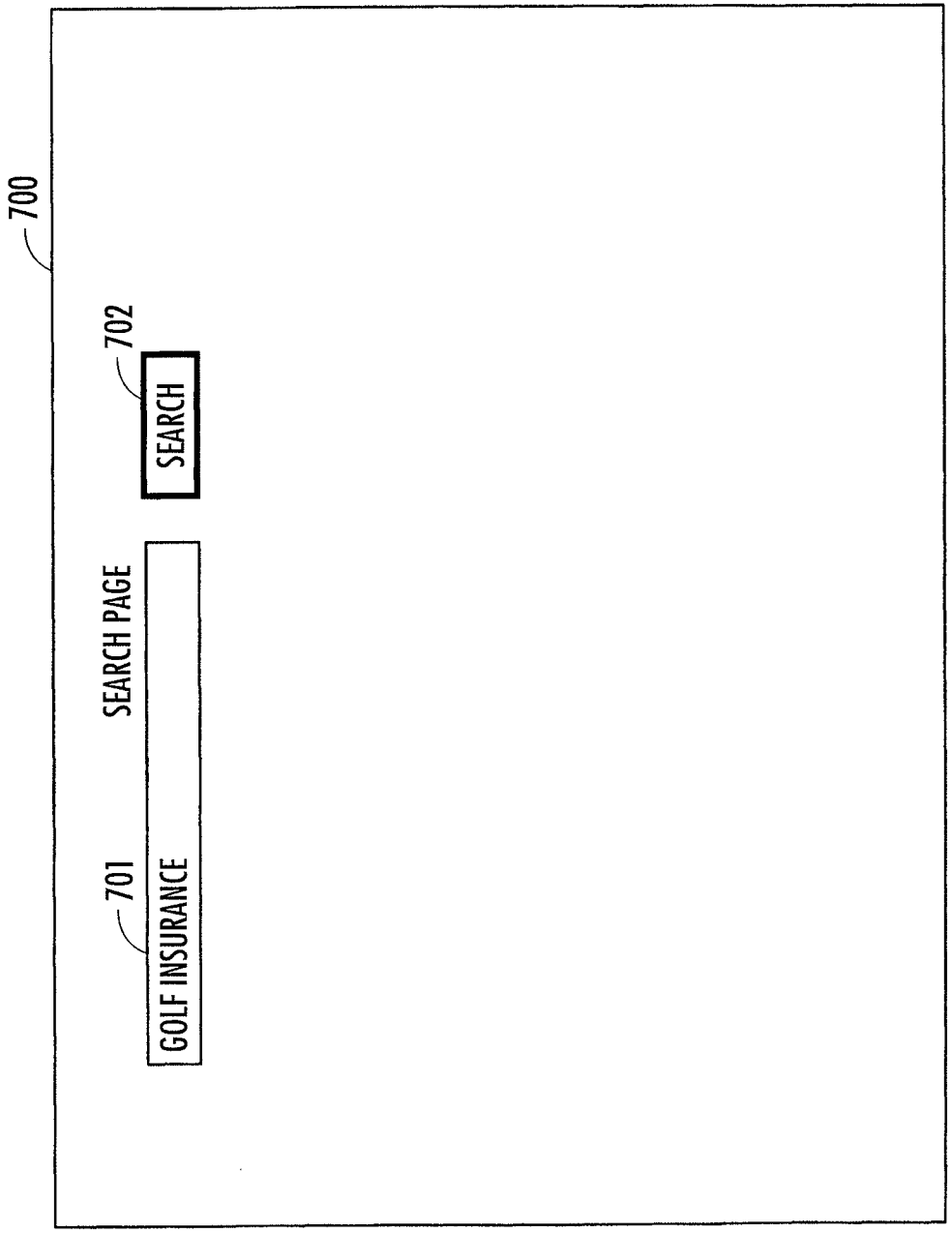
FIG. 32 is a second screen display example of the search page in the user terminal device shown in FIG. 1.
Figure 33:
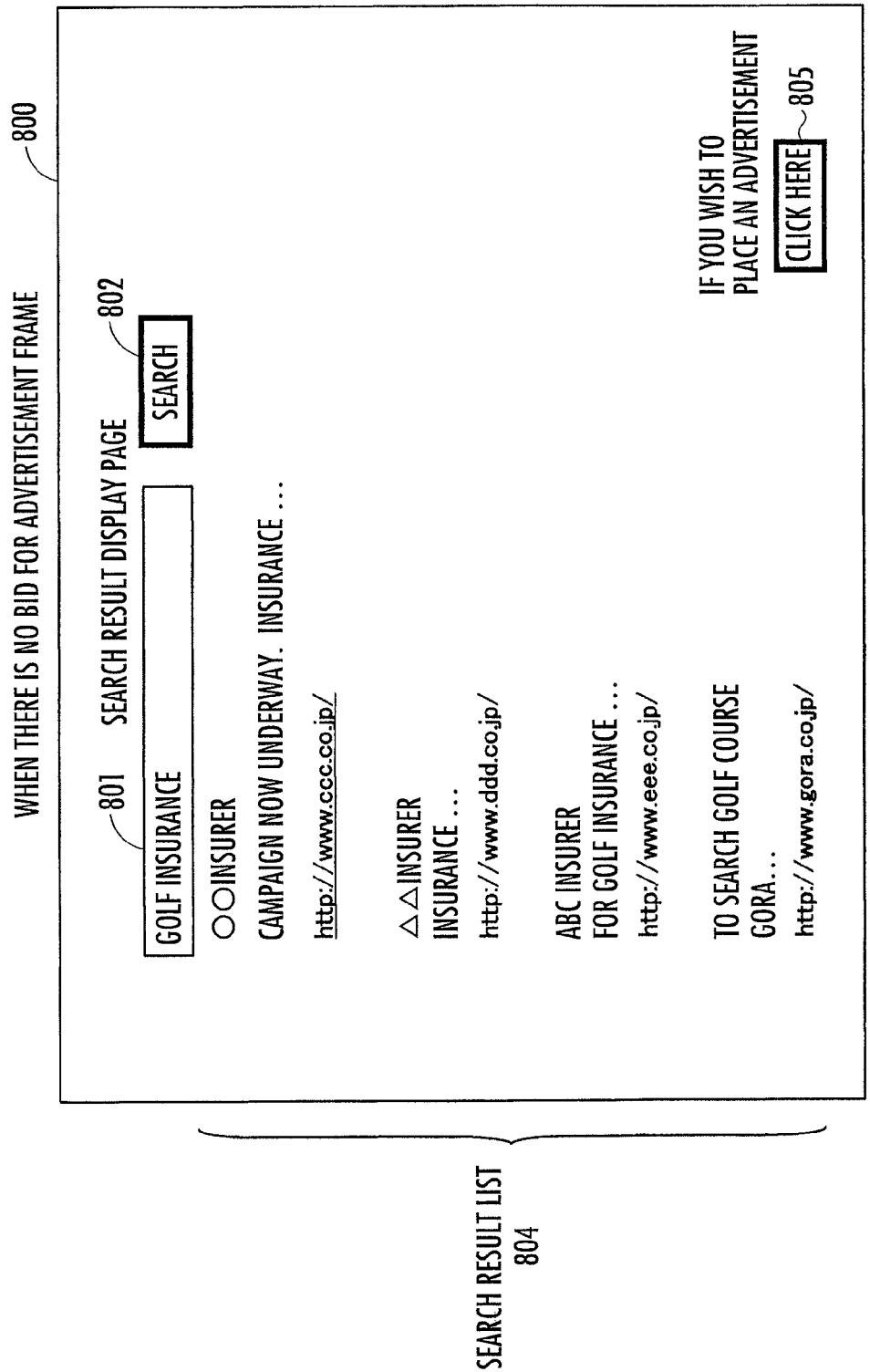
FIG. 33 is a second screen display example of the search result page transitioned from the search page shown in FIG. 32.

FIG. 33 shows an image example of the search result page 800 to which a transition is made when "golf insurance" is entered as a search word and the search button 702 is selected in the search page 700 shown in FIG. 32. As shown in FIG. 32, in the case where there is no bid advertisement frame, the advertisement display space 803 is omitted.

The page structure of the charge status confirmation page 600 provided to the advertiser terminal device 3-k is described below, with reference to FIG. 34. The charge status confirmation page 600 is generated based on bid information stored in the bid database 24 and information stored in the charge database 25. For instance, the charge status confirmation page 600 is a page to which a transition is made when the charge status confirmation link is selected in my page 200 (see FIG. 11).

Figure 34:
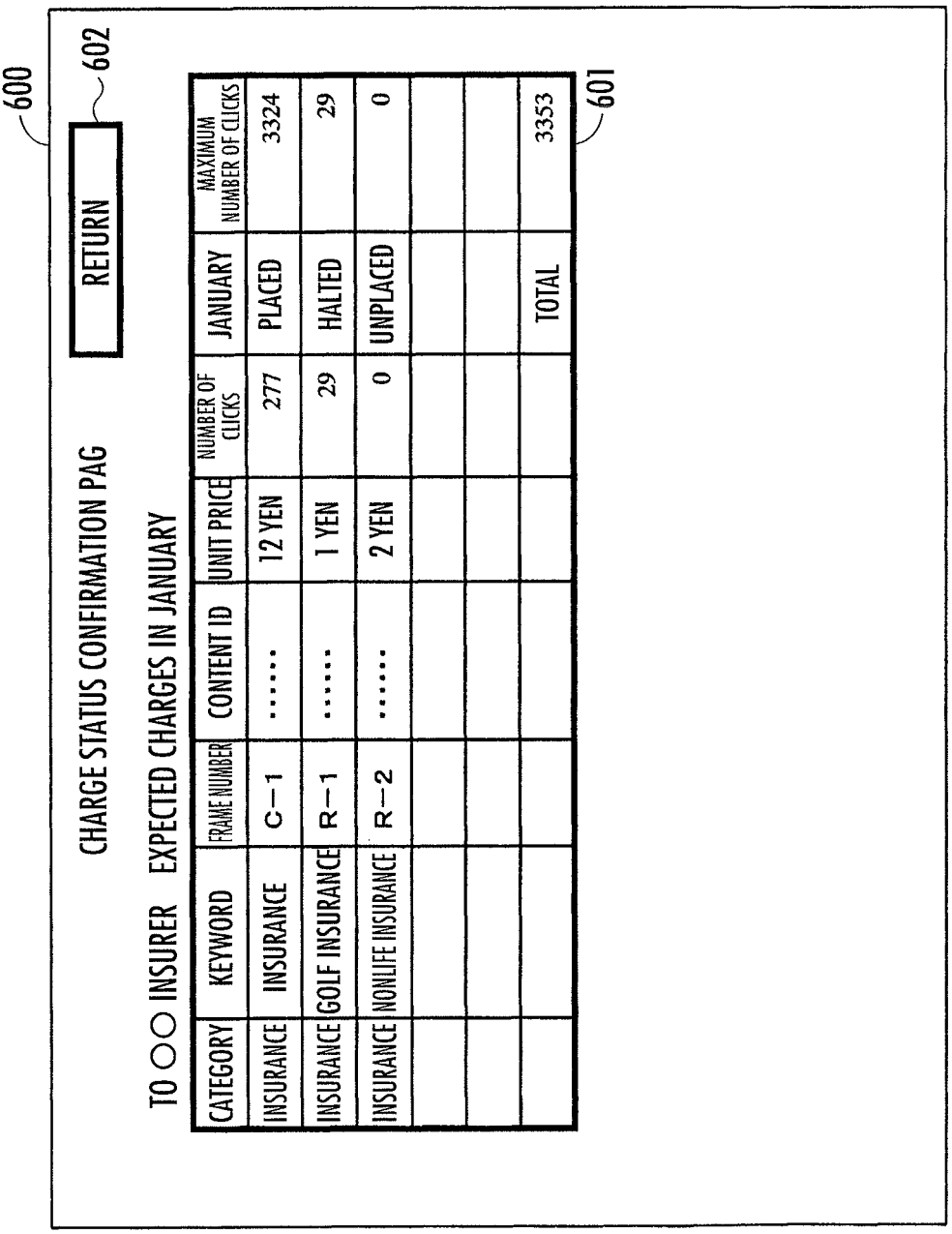
FIG. 34 is a screen display example of a charge status confirmation page in the advertiser terminal device by the advertisement server device shown in FIG. 2.

As shown in FIG. 34, the charge status confirmation page 600 includes a charge status display area 601 and a "return" button 602. A keyword category, a keyword, an advertisement frame number, a content ID of advertisement content, a unit price, the number of clicks, a placement status in a predetermined month, a maximum number of clicks, and the like are displayed in the charge status display area 601.

The placement status indicates, for each bid by the target advertiser for each keyword and advertisement frame, which of "placed", "halted", and "unplaced" the advertisement content of the advertiser is in the predetermined month, as in the bid status/placement status display area 202 in my page 200 shown in FIG. 11.

The following describes an operation of the advertisement display system S achieved by the advertisement server device 1 in this embodiment, with reference to flowcharts shown in FIGS. 35 to 41. The following description uses an example where the user uses the user terminal device 2-1 and the advertiser uses the advertiser terminal device 3-1.

An overall operation is described first. In the advertisement display system S, a login process, a member information registration/confirmation/change process, an advertisement content registration/confirmation/change process, a bid information registration/confirmation/change process, and a charge status confirmation process by the advertiser are performed through the advertiser terminal device 3-1. In addition, a search process by the user is performed through the user terminal device 2-1, and a search result provision process and a charge computation process are performed through the user terminal device 2-1 following the search process. These processes are each executed at any time according to a request from the advertiser or the user.

The login process is a process for obtaining and authenticating an advertiser ID and a password of the advertiser that accesses the advertisement management site. This process corresponds to a process by the authentication means 30.

The member information registration/confirmation/change process is a process for causing the advertiser terminal device 3-1 to display the member information registration/confirmation/change page 200 according to a request from the advertiser, and registering information entered in this page by the advertiser in the member information database 22. This process corresponds to a process by the member information registration means 31.

The advertisement content registration/confirmation/change process is a process for causing the advertiser terminal device 3-1 to display the advertisement content registration/confirmation/change page 400 according to a request from the advertiser logged in the advertisement management site, and registering information entered in this page by the advertiser in the content database. This process corresponds to a process by the content registration means 32.

The bid information registration/confirmation/change process is a process for causing the advertiser terminal device 3-1 to display the bid information registration/confirmation/change page 500 according to a request from the advertiser logged in the advertisement management site, and accepting a bid from the advertiser and determining a successful bid. This process corresponds to a process by the search word acceptance means 33, the bid advertisement frame display means 34, the bid amount acceptance means 35, and the successful bid determination means 37.

The charge status confirmation process is a process for causing the advertiser terminal device 3-1 to display the charge status confirmation page 600 according to a request from the advertiser logged in the advertisement management site. This process corresponds to a process by the charge management means 39.

The search process is a process for causing the user terminal device 2-1 to display the search page according to a request from the user, performing a search based on a search word entered in the page by the user, and outputting a list of sites relevant to the search word as a search result list. This process corresponds to a process by the search means 5.

The search result provision process is a process for adding advertisement content relevant to the search word to the search result list corresponding to the search word, and causing the user terminal device 2-1 to display the search result list to which the advertisement content is added. This process corresponds to a process by the advertisement frame extraction means 36, the successful bid determination means 37, the advertisement extraction means 38, the search result page generation means 6a, and the search result provision means 6b.

The charge computation process is a process for computing a charge to the advertiser. This process corresponds to a process by the charge management means 39.

Each process is described in detail below. The login process is described first. In the login process, the advertisement server device 1 receives and accepts a login request transmitted from the advertiser terminal device 3-1, generates the member login page 100, and transmits the member login page 100 to the advertiser terminal device 3-1. As a result, the member login page 100 is received in the advertiser terminal device 3-1 and displayed on the screen as exemplified in FIG. 8. Next, the advertisement server device 1 receives an advertiser ID and a password entered by the advertiser through the member login page 100, from the advertiser terminal device 3-1. The advertisement server device 1 then performs password authentication based on the received advertiser ID and password and information about the advertiser registered in the member information database 22. When the password authentication is successful, to maintain a connection state using session management or the like, the advertisement server device 1 generates a session ID which is unique identification information for each session, and holds the received advertiser ID and the session ID in association with each other. Consequently, the login process in the advertisement server device 1 is completed.

Figure 35:
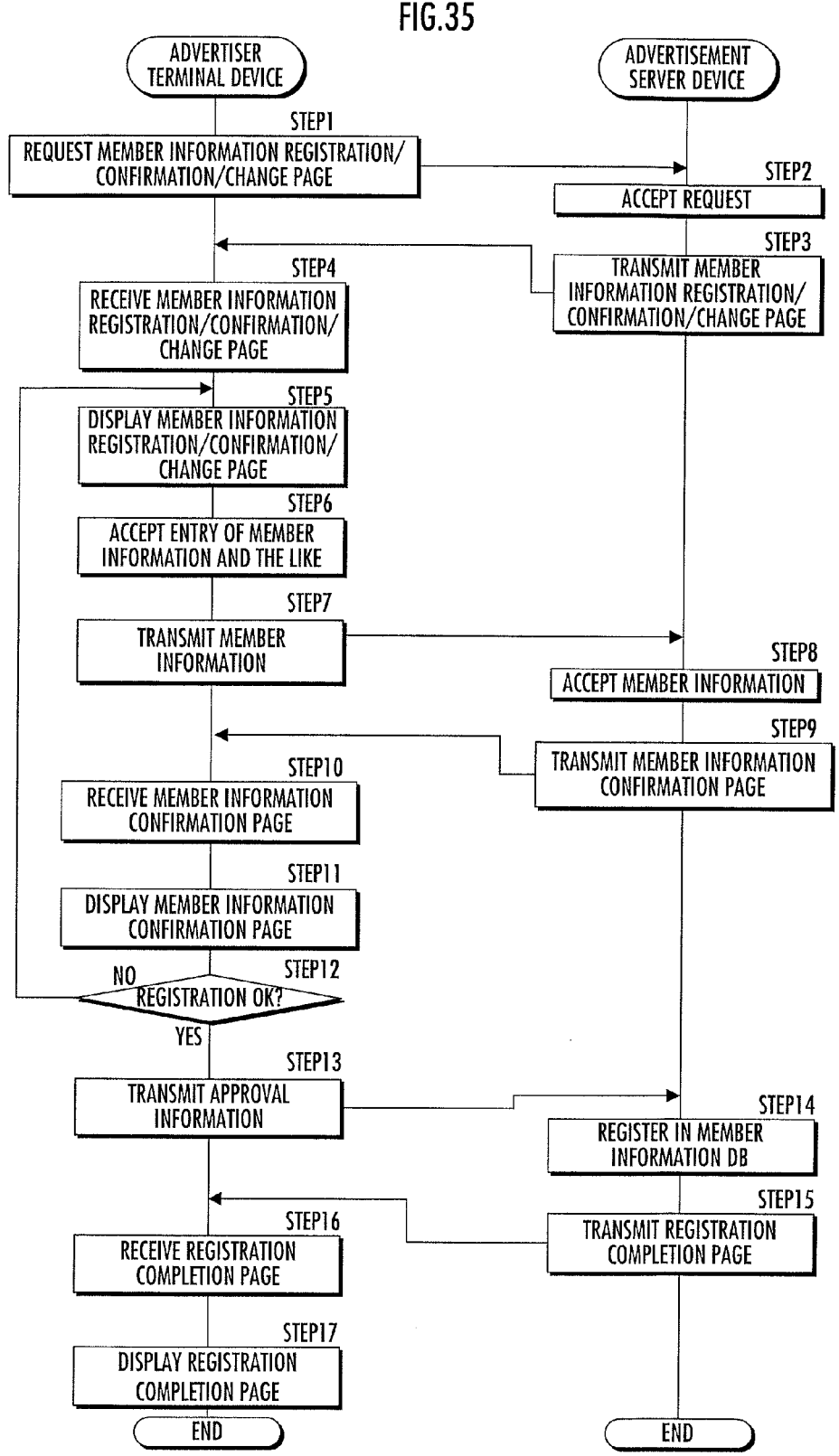
FIG. 35 is a flowchart of a member information registration/confirmation/change process by the advertisement server device shown in FIG. 2.

The member information registration/confirmation/change process is described below, with reference to the flowchart shown in FIG. 35. For instance, this process starts when the member information registration/confirmation/change link is selected by the advertiser in my page 200 displayed on the screen of the advertiser terminal device 3-1.

First, in the advertiser terminal device 3-1, a member information registration/confirmation/change page request is transmitted to the advertisement server device 1 (STEP 1). Next, the advertisement server device 1 receives and accepts the member information registration/confirmation/change page request transmitted from the advertiser terminal device 3-1 (STEP 2). The advertisement server device 1 then generates the member information registration/confirmation/change page 300 using information stored in the page database 20 and information stored in the member information database 22, and transmits the member information registration/confirmation/change page 300 to the advertiser terminal device 3-1 (STEP 3).

Following this, in the advertiser terminal device 3-1, the member information registration/confirmation/change page 300 transmitted from the advertisement server device 1 is received (STEP 4), and displayed on the screen (STEP 5). This causes the screen display of the advertiser terminal device 3-1 to transition from my page 200 to the member information registration/confirmation/change page 300 exemplified in FIG. 9. After this, in the advertiser terminal device 3-1, information entered in the member information registration/confirmation/change page 300 by the advertiser is accepted (STEP 6). Upon selection of the registration button 302 by the advertiser, the entered information is transmitted to the advertisement server device 1 as member information (STEP 7).

Next, the advertisement server device 1 receives and accepts the member information transmitted from the advertiser terminal device 3-1 (STEP 8). The advertisement server device 1 then generates the member information confirmation page 310 using information stored in the page database 20 and the received member information, and transmits the member information confirmation page 310 to the advertiser terminal device 3-1 (STEP 9).

Next, in the advertiser terminal device 3-1, the member information confirmation page 310 transmitted from the advertisement server device 1 is received (STEP 10), and displayed on the screen (STEP 11). This causes the screen display of the advertiser terminal device 3-1 to transition from the member information registration/confirmation/change page 300 to the member information confirmation page 310 exemplified in FIG. 10.

Next, whether or not to approve the registration information displayed in the member information confirmation page 310 is determined by the advertiser (STEP 12). When the determination in STEP 12 results in NO (the registration information is not approved), a state where the "reentry" button is selected by the advertiser arises. In this case, in the advertiser terminal device 3-1, the entry of the "reentry" button is accepted, the process returns to STEP 5, and the member information registration/confirmation/change page 300 is redisplayed on the screen. This causes the screen display of the advertiser terminal device 3-1 to transition from the member information confirmation page 310 to the member information registration/confirmation/change page 300.

When the determination in STEP 12 results in YES (the registration information is approved), a state where the "registration" button is selected by the advertiser arises. In this case, the process advances to STEP 13. In the advertiser terminal device 3-1, the entry of the "registration" button is accepted, and approval information is transmitted to the advertisement server device 1. Next, the advertisement server device 1 receives the approval information transmitted from the advertiser terminal device 3-1, and registers the member information accepted in STEP 8 and the advertiser ID in the member information database 22 in association with each other (STEP 14). The advertisement server device 1 then generates a member information registration completion page using information in the page database 20 and the like, and transmits the member information registration completion page to the advertiser terminal device 3-1 (STEP 15).

Next, in the advertiser terminal device 3-1, the registration completion page transmitted from the advertisement server device 1 is received (STEP 16), and displayed on the screen (STEP 17). This causes the screen display of the advertiser terminal device 3-1 to transition from the member information confirmation page 310 to the registration completion page. Consequently, the member information registration/confirmation/change process is completed.

Note that, for example, the registration completion page specifically includes a display area for displaying that the registration is completed and a "my page" button. Upon selection of the "my page" button in the registration completion page by the advertiser, the screen display of the advertiser terminal device 3-1 transitions from the registration completion page to my page 200.

Figure 36:
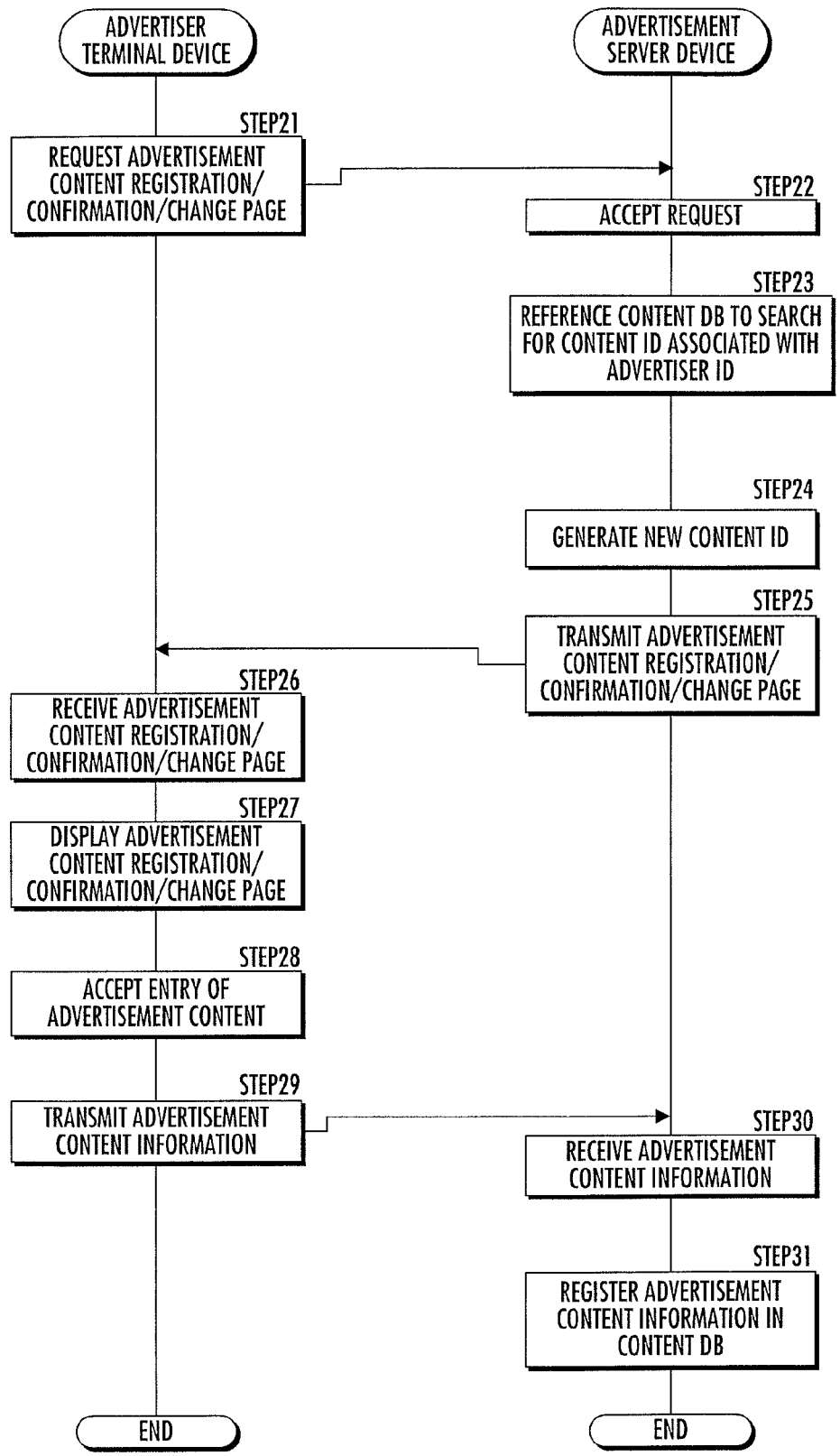
FIG. 36 is a flowchart of a content registration/confirmation/change process by the advertisement server device shown in FIG. 2.

The advertisement content registration/confirmation/change process is described below, with reference to the flowchart shown in FIG. 36. For instance, this process starts when the member information registration/confirmation/change link is selected by the advertiser currently logged in, in my page 200 displayed on the screen of the advertiser terminal device 3-1.

First, in the advertiser terminal device 3-1, an advertisement content registration/confirmation/change page request is transmitted to the advertisement server device 1 (STEP 21). Next, the advertisement server device 1 receives and accepts the advertisement content registration/confirmation/change page request transmitted from the advertiser terminal device 3-1 (STEP 22). The advertisement server device 1 then obtains the advertiser ID from the above-mentioned session ID, references the content database 23 to search for and extract a content ID (already registered content ID) associated with the advertiser ID, and reads advertisement content associated with the extracted content ID (STEP 23). Following this, the advertisement server device 1 generates a new content ID for newly registering advertisement content (STEP 24). The advertisement server device 1 generates the advertisement content registration/confirmation/change page 400 using the new content ID, the already registered content ID and the corresponding advertisement content, information stored in the page database 20, and the like, and transmits the advertisement content registration/confirmation/change page 400 to the advertiser terminal device 3-1 (STEP 25).

Next, in the advertiser terminal device 3-1, the advertisement content registration/confirmation/change page 400 transmitted from the advertisement server device 1 is received (STEP 26), and displayed on the screen (STEP 27). This causes the screen display of the advertiser terminal device 3-1 to transition from my page 200 to the advertisement content registration/confirmation/change page 400 exemplified in FIG. 13. After this, in the advertiser terminal device 3-1, information entered in the advertisement content registration/confirmation/change page 400 by the advertiser is accepted (STEP 28). Next, in the advertiser terminal device 3-1, upon selection of the registration button 406 in the advertisement content registration/confirmation/change page 400, the entered information is transmitted to the advertisement server device 1 as advertisement content-related information (STEP 29).

Meanwhile, the advertisement server device 1 receives and accepts the advertisement content-related information transmitted from the advertiser terminal device 3-1 (STEP 30). The advertisement server device 1 receives the transmitted advertisement content information, and registers it in the content database 23 (STEP 31). Consequently, the advertisement content registration/change/confirmation process is completed. Note that, after the completion of the advertisement content registration/confirmation/change process, the screen of the advertiser terminal device 3-1 transitions from the advertisement content registration/confirmation/change page 400 to my page 200, as an example.

Figure 37:
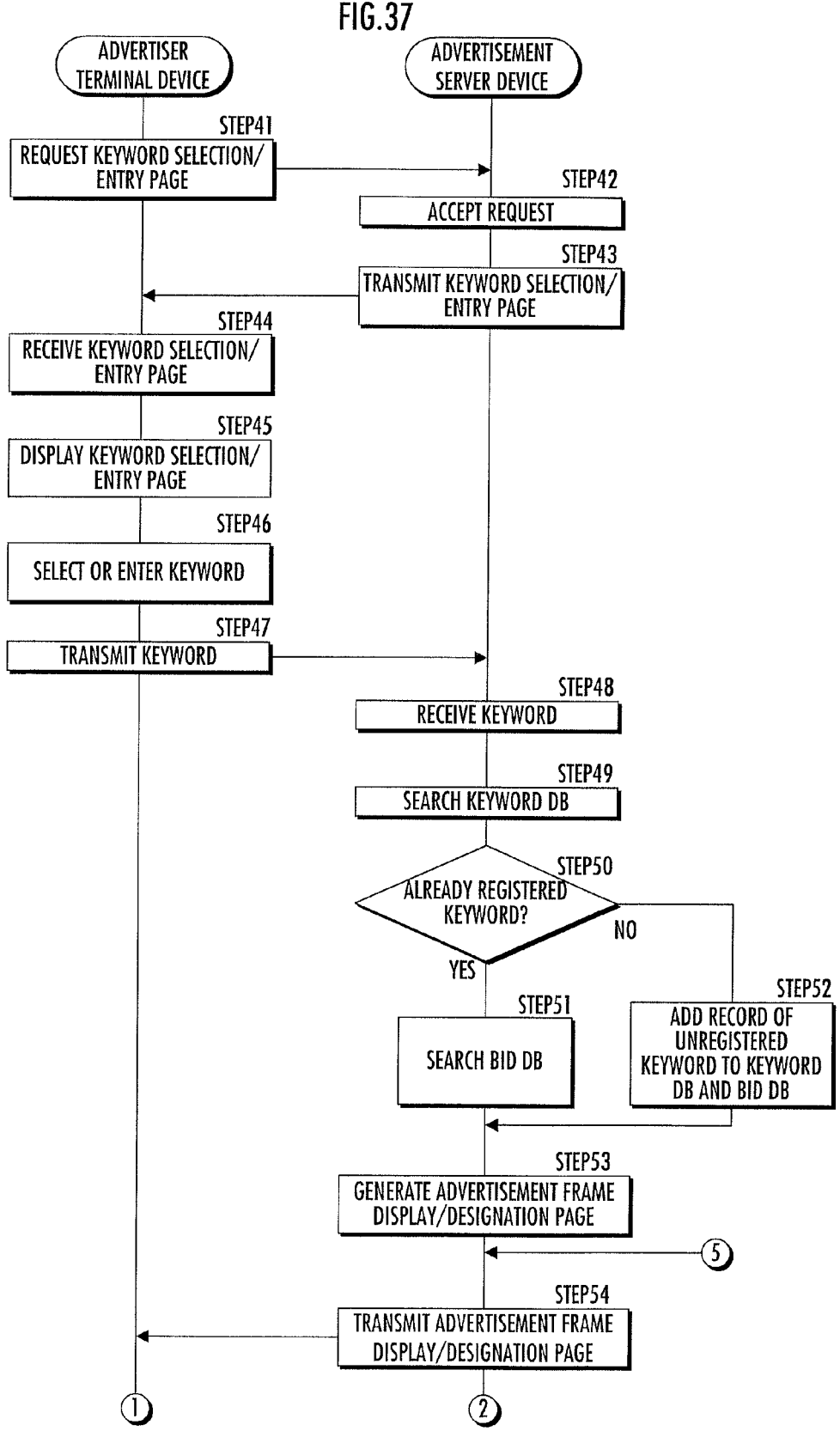
FIG. 37 is a flowchart of a bid information registration/confirmation/change process by the advertisement server device shown in FIG. 2.
Figure 38:
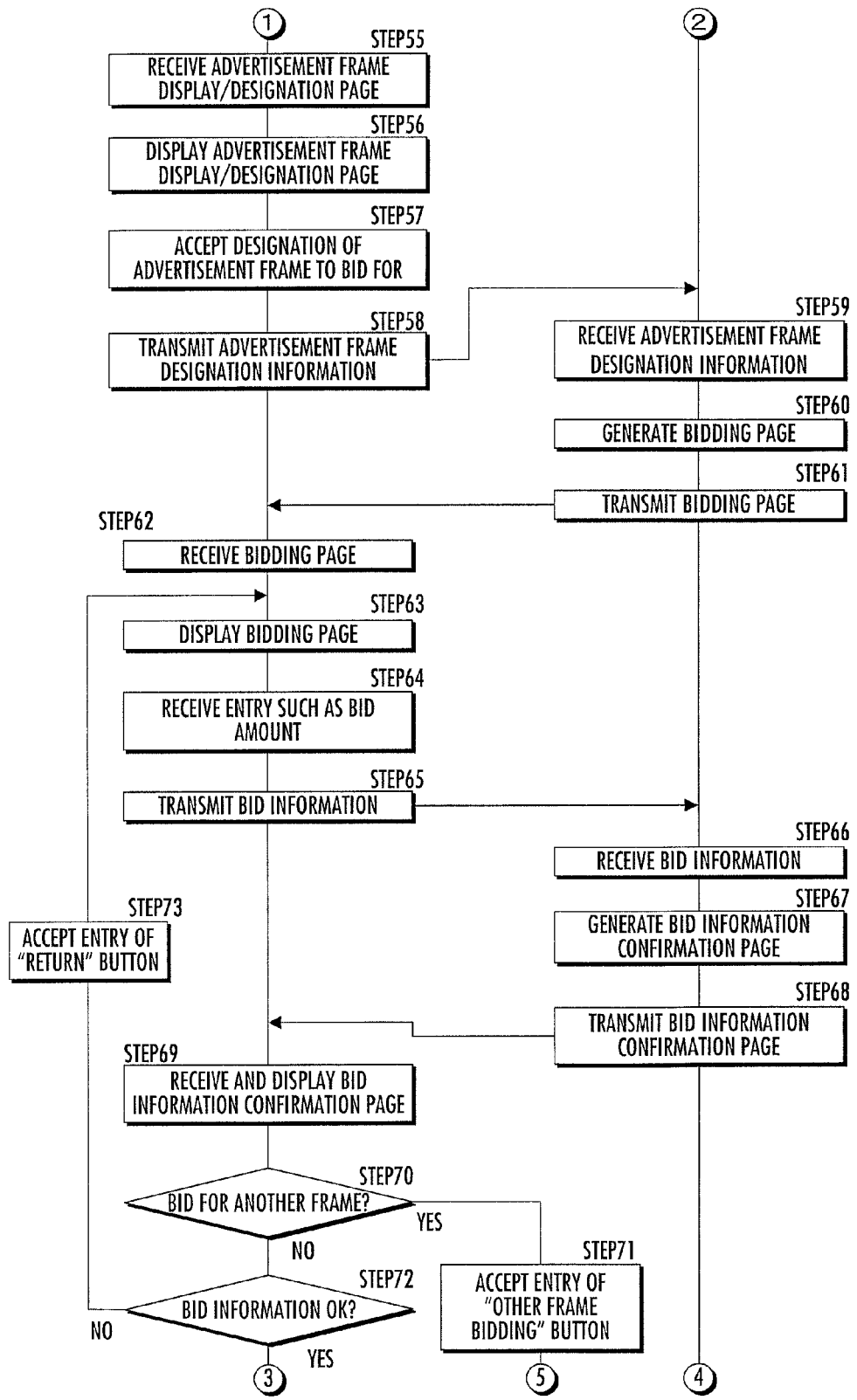
FIG. 38 is a flowchart of the bid information registration/confirmation/change process following FIG. 37.
Figure 39:
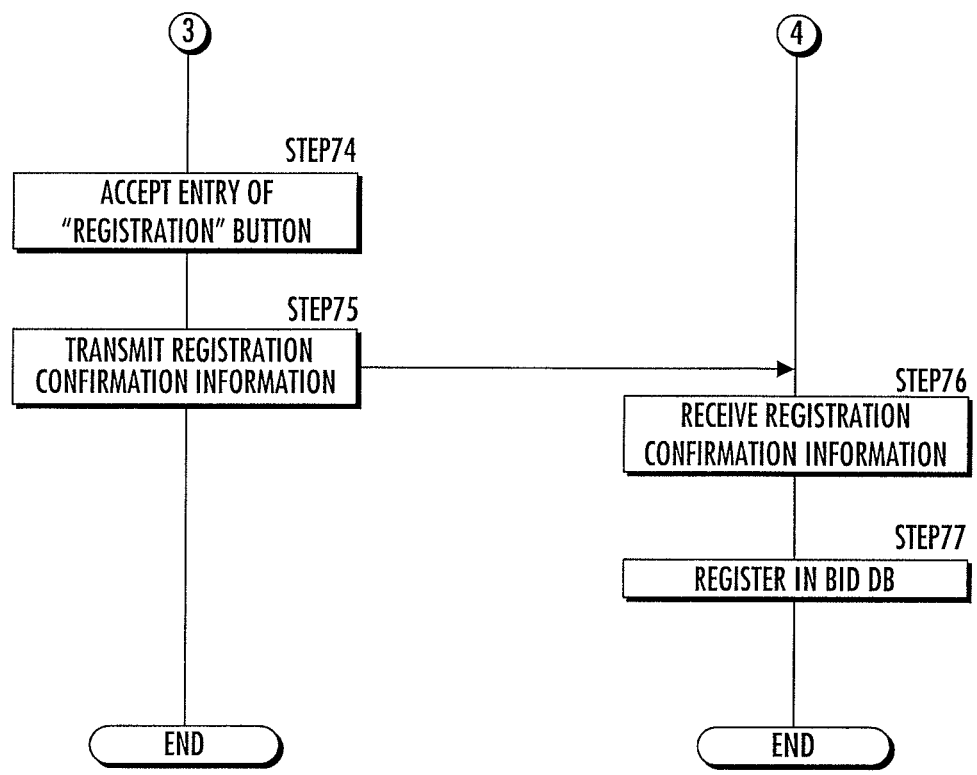
FIG. 39 is a flowchart of the bid information registration/confirmation/change process following FIG. 38.

The bid information registration/confirmation/change process is described below, with reference to the flowcharts shown in FIGS. 37 to 39. For instance, the bid information registration/confirmation/change process starts when the bid information registration/confirmation/change link is selected by the advertiser in my page 200 displayed on the screen of the advertiser terminal device 3-1. In the following description of the process, it is assumed that the advertisement content of the advertiser is already registered.

First, in the advertiser terminal device 3-1, a keyword selection/entry page request is transmitted to the advertisement server device 1 (STEP 41). Next, the advertisement server device 1 receives and accepts the keyword selection/entry page request transmitted from the advertiser terminal device 3-1 (STEP 42). The advertisement server device 1 then generates the keyword selection/entry page 510 using information stored in the page database 20, information stored in the keyword database 21, and information in the bid database 24 associated with the advertiser ID, and transmits the keyword selection/entry page 510 to the advertiser terminal device 3-1 (STEP 43).

Following this, in the advertiser terminal device 3-1, the keyword selection/entry page 510 transmitted from the advertisement server device 1 is received (STEP 44), and displayed on the screen (STEP 45). This causes the screen display of the advertiser terminal device 3-1 to transition from my page 200 to the keyword selection/entry page 510 which is the top page of the bid information registration/confirmation/change page 500 as exemplified in FIG. 13.

Next, in the advertiser terminal device 3-1, a keyword selected as exemplified in FIG. 14 or entered as exemplified in FIG. 26 by the advertiser in the keyword selection/entry page 510 is accepted (STEP 46), and transmitted to the advertisement server device 1 as a keyword (STEP 47).

Next, the advertisement server device 1 receives the keyword transmitted from the advertiser terminal device 3-1 (STEP 48). The advertisement server device 1 then references the keyword database 21, and searches for a keyword matching the received keyword (STEP 49). The advertisement server device 1 determines whether or not the received keyword is already registered in the keyword database 21 (STEP 50).

When the determination in STEP 50 results in YES (the received keyword is already registered), the process advances to STEP 51. The advertisement server device 1 references the bid database 24, and reads bid information associated with the received keyword. When the determination in STEP 50 results in NO (the received keyword is unregistered), on the other hand, the process advances to STEP 52, and the advertisement server device 1 adds a record of the received keyword to the keyword database 21 and the bid database 24.

Following this, the advertisement server device 1 generates the bid advertisement frame display/designation page 520 based on information stored in the page database 20 and information stored in the bid database 24 (STEP 53), and transmits the bid advertisement frame display/designation page 520 to the advertiser terminal device 3-1 (STEP 54).

Next, in the advertiser terminal device 3-1, the bid advertisement frame display/designation page 520 transmitted from the advertisement server device 1 is received (STEP 55), and displayed on the screen (STEP 56). This causes the screen display of the advertiser terminal device 3-1 to transition from the keyword selection/entry page 510 to the bid advertisement frame display/designation page 520 exemplified in FIGS. 15 and 27. Following this, in the advertiser terminal device 3-1, designation of an advertisement frame the advertiser wants to bid, which is entered by the advertiser in the bid advertisement frame display/designation page 520, is accepted (STEP 57), and transmitted to the advertisement server device 1 as advertisement frame designation information (STEP 58).

Next, the advertisement server device 1 receives the advertisement frame designation information transmitted from the advertiser terminal device 3-1 (STEP 59). The advertisement server device 1 then generates the bidding page 530 based on bid information associated with the obtained keyword and advertisement frame and page-related information (STEP 60), and transmits the bidding page 530 to the advertiser terminal device 3-1 (STEP 61).

Following this, in the advertiser terminal device 3-1, the bidding page 530 transmitted from the advertisement server device 1 is received (STEP 62), and displayed on the screen (STEP 63). This causes the screen display of the advertiser terminal device 3-1 to transition from the bid advertisement frame display/designation page 520 to the bidding page 530 exemplified in FIGS. 16, 20, 22, 24, and 26. Subsequently, in the advertiser terminal device 3-1, information such as a bid amount entered in the bidding page 530 by the advertiser is accepted (STEP 64), and the entered information is transmitted to the advertisement server device 1 as bid information (STEP 65).

Next, the advertisement server device 1 receives the bid information transmitted from the advertiser terminal device 3-1 (STEP 66). The advertisement server device 1 then generates the bid information confirmation page 540 based on the received keyword, advertisement frame designation information, and bid information, as well as page-related information (STEP 67), and transmits the bid information confirmation page 540 to the advertiser server (STEP 68).

Following this, in the advertiser terminal device 3-1, the bid information confirmation page 540 transmitted from the advertisement server device 1 is received and displayed on the screen (STEP 69). This causes the screen display of the advertiser terminal device 3-1 to transition from the bidding page 530 to the bid information confirmation page 540 exemplified in FIGS. 19, 25, and 29. Next, the advertiser views the displayed bid information confirmation page 540, and determines whether or not to designate and bid for another advertisement frame (STEP 70). When the determination in STEP 70 results in YES, a state where the "other frame bidding" button is selected by the advertiser arises. In this case, in the advertiser terminal device 3-1, the entry of the "other frame bidding" button is accepted (STEP 71), and the process returns to STEP 54.

When the determination in STEP 70 results in NO (the advertiser does not bid for another frame), on the other hand, the process advances to STEP 72, and the advertiser determines whether or not to register the bid information displayed in the bid information confirmation page 540. When the determination in STEP 72 results in NO, a state where the "return" button is selected by the advertiser arises. In this case, in the advertiser terminal device 3-1, the entry of the "return" button is accepted (STEP 73), the process returns to STEP 63, and the bidding page 530 is redisplayed.

When the determination in STEP 72 results in YES, on the other hand, a state where the "registration" button is selected by the advertiser arises. In this case, in the advertiser terminal device 3-1, the entry of the "registration" button is accepted (STEP 74), and transmitted to the advertisement server device 1 as registration confirmation information (STEP 75).

Meanwhile, the advertisement server device 1 receives the registration confirmation information transmitted from the advertiser terminal device 3-1 (STEP 76). The advertisement server device 1 then registers the keyword information obtained in STEP 48, the advertisement frame designation information obtained in STEP 59, and the bid information obtained in STEP 66, in the bid database 24 (STEP 77). Consequently, the bid information registration/confirmation/change process is completed.

The charge status confirmation process is described below. For instance, this process starts when the charge status confirmation link is selected by the advertiser in my page 200 displayed on the screen of the advertiser terminal device 3-1.

In the charge status confirmation process, the advertisement server device 1 receives and accepts a charge status confirmation page request transmitted from the advertiser terminal device 3-1. The advertisement server device 1 then obtains the advertiser ID from the session ID, and generates the charge status confirmation page 600 based on information stored in the charge database 25. After this, the advertisement server device 1 transmits the generated charge status confirmation page 600 to the advertiser terminal device 3-1. The charge status confirmation page 600 is received in the advertiser terminal device 3-1, and displayed on the screen as exemplified in FIG. 34. Consequently, the charge status confirmation process is completed.

Figure 40:
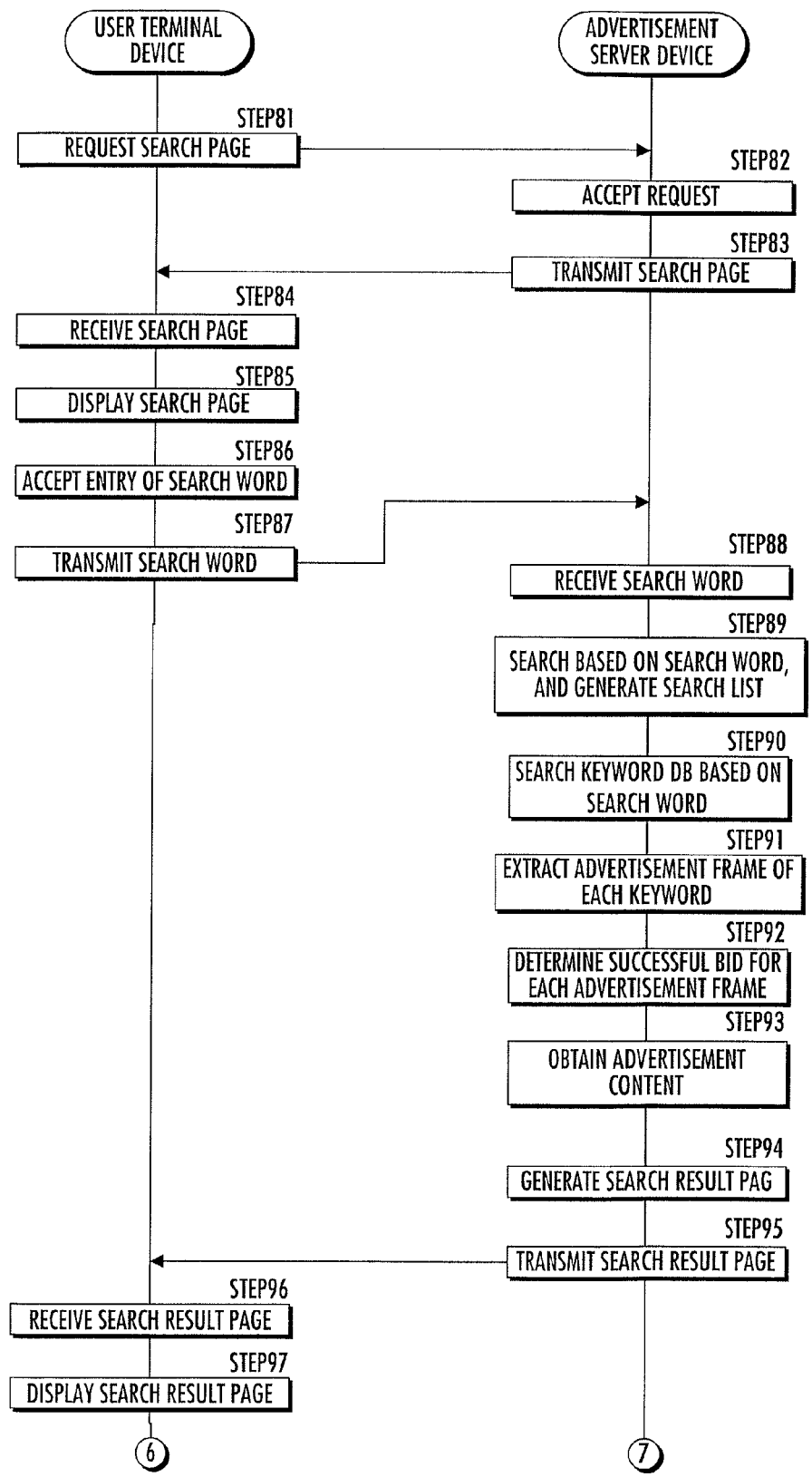
FIG. 40 is a flowchart of a search process and a search result provision process by the advertisement server device shown in FIG. 2.
Figure 41:
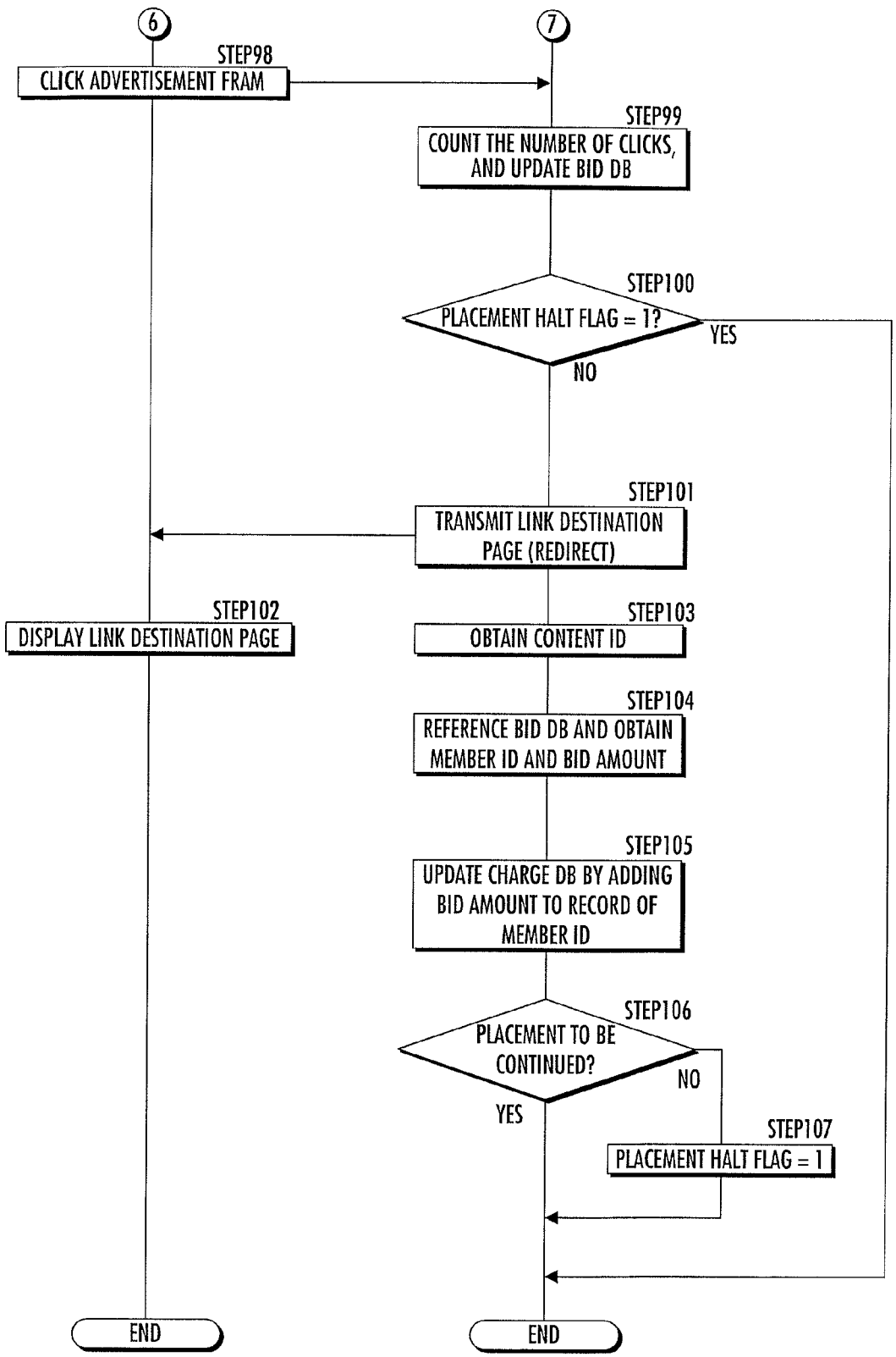
FIG. 41 is a flowchart of a charge determination process following FIG. 40.

The search process and the search result provision process which are based on a search word from the user and the subsequent charge computation process are described below, with reference to the flowcharts shown in FIGS. 40 and 41. For instance, these processes start when a link to the search page 700 is selected by the user on the browser of the user terminal device 2-1.

First, in the user terminal device 2-1, a search page request is transmitted to the advertisement server device 1 (STEP 81). Next, the advertisement server device 1 receives and accepts the search page request transmitted from the user terminal device 2-1 (STEP 82). The advertisement server device 1 then generates the search page 700 based on page-related information, and transmits the search page 700 to the user terminal device 2-1 (STEP 83).

Next, in the user terminal device 2-1, the search page 700 transmitted from the advertisement server device 1 is received (STEP 84), and displayed on the screen (STEP 85). This causes the screen display of the user terminal device 2-1 to transition to the search page 700 exemplified in FIGS. 30 and 32. Following this, in the user terminal device 2-1, information entered in the search page by the user is accepted (STEP 86), and the entered information is transmitted to the advertisement server device 1 as a search word (STEP 87).

Next, the advertisement server device 1 receives the search word transmitted from the user terminal device 2-1 (STEP 88). The advertisement server device 1 then executes a process of searching for search objects based on the received search word, and generates a search result list (STEP 89). After this, the advertisement server device 1 searches the keyword database 21 based on the received search word, and obtains a keyword associated with the search word (STEP 90). For each keyword obtained in STEP 90, the advertisement server device 1 references the bid database 24, and extracts an advertisement frame associated with the keyword (STEP 91). For each advertisement frame, the advertisement server device 1 determines, from among the records currently stored in the bid database 24 for the search word and the advertisement frame, a record of a highest bid amount that satisfies the condition that the current time is within the advertisement placement period and the condition that the advertisement placement is not halted, as a successful bid, that is, a record of advertisement content to be displayed as an advertisement (STEP 92). Next, for each advertisement frame, the advertisement server device 1 extracts a content ID of advertisement content associated with the record which is determined as a successful bid (STEP 93).

Following this, the advertisement server device 1 references the content database 23, and reads information about the advertisement content associated with the content ID. The advertisement server device 1 generates the search result page 800 based on the search result list, the read advertisement content-related information, and page-related information stored in the page database 20 (STEP 94). The advertisement server device 1 then transmits the generated search result page 800 to the user terminal device 2-1 (STEP 95).

Next, in the user terminal device 2-1, the search result page 800 transmitted from the advertisement server device 1 is received (STEP 96), and displayed on the screen (STEP 97). This causes the screen display of the user terminal device 2-1 to transition from the search page 700 to the search result page 800 exemplified in FIGS. 31 and 33.

After this, an advertisement frame in the search result page 800 is clicked by the user, and this click information is transmitted from the user terminal device 2-1 to the advertisement server device 1 (STEP 98). Next, the advertisement server device 1 counts the number of clicks, and updates the number of clicks stored in the bid database 24 (STEP 99). The advertisement server device 1 then determines whether or not the placement halt flag is 1 (STEP 100). When the determination in STEP 100 results in YES (the placement halt flag is 1), the advertisement placement is in a halted state, so that the process is completed here.

When the determination in STEP 100 results in NO (the placement halt flag is 0), on the other hand, the process advances to STEP 101, and the advertisement server device 1 transmits a link destination page associated with advertisement content of the clicked advertisement frame, to the user terminal device 2-1 by a redirection function.

Next, in the user terminal device 2-1, the information transmitted from the advertisement server device 1 is recognized and a URL of a redirection destination is read, and the link destination page is displayed on the screen (STEP 102).

Meanwhile, the advertisement server device 1 obtains a content ID of the advertisement content displayed in the clicked advertisement frame (STEP 103). The advertisement server device 1 then references the bid database 24, and obtains an advertiser ID and a bid amount of a successful bid of the clicked advertisement frame (STEP 104). The advertisement server device 1 updates the unit price based on the bid amount, adds 1 to the number of clicks, and adds the bid amount to the charge amount in a predetermined record of the advertiser ID in the charge database 25, thereby updating the charge database 25 (STEP 105).

Next, the advertisement server device 1 determines whether or not to halt the placement (STEP 106). In detail, the advertisement server device 1 determines to halt the placement, when the click number upper limit flag is 1 and also the number of clicks is not less than the maximum number of clicks, or when the charge amount upper limit flag is 1 and also the charge amount is not less than the maximum charge amount. Otherwise, the advertisement server device 1 determines not to halt the placement. When the determination in STEP 104 results in NO, the process in the advertisement server device 1 is completed here.

When the determination in STEP 106 results in YES, on the other hand, the process advances to STEP 107, and the advertisement server device 1 sets the placement halt flag to 1. Consequently, the process in the advertisement server device 1 is completed.

According to each of the processes described above, when displaying an advertisement within a screen for displaying search results based on an entered search word or the like, the advertisement can be easily displayed in a manner better suited to the advertiser's needs.

In this embodiment, the bid unit price which is a unit for computing the charge to the advertiser is used as the bid amount. However, a bid total amount may be used as the bid amount according to another embodiment.

In this embodiment, the value obtained by multiplying the bid unit price by the number of clicks is used as the charge amount. As another embodiment, the value obtained by multiplying the bid unit price by the number of times the advertisement content is displayed may be used as the charge amount (impression charging). Alternatively, when computing the charge amount, sales, profits, and the like of products relating to the advertisement content of the advertiser may be taken into account.

INDUSTRIAL APPLICABILITY

As described above, the present invention can provide an advertisement server device, an advertisement display method, and an advertisement server program that can, when displaying an advertisement within a page for displaying search results based on an entered search word or the like, easily display the advertisement in a manner better suited to the advertiser's needs.

The invention claimed is:

1. An advertisement server device that is connected to a user terminal device and an advertiser terminal device via a network, the advertisement server device comprising:
  a search result page generation means for generating, according to a search word transmitted from the user terminal device, a search result page to which advertisement content relevant to the search word is added and which displays the advertisement content in a predetermined layout stored in a page database;
  a search result provision means for transmitting the search result page to the user terminal device;
  a search word acceptance means for accepting a search word transmitted from the advertiser terminal device;
  a bid advertisement frame display means for generating a bid information registration page for causing the advertiser terminal device to display a plurality of advertisement frames each of which corresponds to the search word accepted by the search word acceptance means and each of which has a specified display position on the search result page that is substantially the same as the predetermined layout stored in the page database, together with bid statuses of each of the advertisement frames;
  a bid amount acceptance means for accepting a bid amount for an advertisement placement period, for one or more of the plurality of advertisement frames displayed by the advertiser terminal device, each such bid amount being applied in a fixed manner for one of the one or more of the plurality of advertisement frames, wherein such bid amount is incapable of being applied to a different advertisement frame other than the advertisement frame designated by the advertiser terminal device;
  a storage means for, every time a bid amount is accepted, storing information for specifying an advertiser, the search word, the designated advertisement frame, the advertisement placement period, the bid amount, and advertisement content in association with each other, as a set of bid information;
  an advertisement frame extraction means for, when the search word transmitted from the user terminal device is accepted, referencing the storage means, and extracting the plurality of advertisement frames associated with the search word;
  a successful bid determination means for, at a time of accepting the search word transmitted from the user terminal device, extracting, for each advertisement frame of the plurality of advertisement frames extracted by the advertisement frame extraction means, each set of bid information the advertisement placement period of which contains the time from among sets of bid information for the one or more of the plurality of advertisement frames stored in the storage means, and determining that the advertisement frame is successfully bid with a highest bid amount included in the extracted set of bid information; and an advertisement extraction means for extracting advertisement content associated with each of the one or more of the plurality of advertisement frames for which a successful bid is determined by the successful bid determination means, as the advertisement content to be added to the search result page by the search result page generation means, wherein said predetermined layout includes at least size and display position information for each of the plurality of advertisement frames, each of said advertisement frames having a specified size and display position on said search result page that is substantially the same as the predetermined layout stored in the page database, and the server device enables said user terminal device and said advertiser terminal device to both access said predetermined layout stored in said page database, such that a relative size and positional relationship of said plurality of advertisement frames displayed on said advertiser terminal device during said bidding operation is substantially in the same layout as in the search result page displayed on the user terminal device which is generated for the user at a time of search.

2. The advertisement server device as claimed in claim 1, wherein the advertisement placement period is set by a placement start time which is a desired date and time to start advertisement placement in the advertisement frame and a placement end time which is a desired date and time to end the advertisement placement in the advertisement frame, and wherein the bid advertisement frame display means generates the bid information registration page so as to enable the advertiser to set the placement start time and the placement end time from the advertiser terminal device.

3. The advertisement server device as claimed in claim 1, wherein the bid advertisement frame display means causes the advertiser terminal device to display, as the bid status of each of the advertisement frames, whether or not the advertisement frame is bid.

4. The advertisement server device as claimed in claim 1, wherein the bid advertisement frame display means causes the advertiser terminal device to display, as the bid status of each of the advertisement frames, each set of bid information stored in the storage means for the advertisement frame.

5. The advertisement server device as claimed in claim 4, wherein the bid advertisement frame display means causes the advertiser terminal device to display, as the bid status of each of the advertisement frames, each of a predetermined number of sets of bid information for the advertisement frame.

6. The advertisement server device as claimed in claim 5, wherein the bid advertisement frame display means causes the advertiser terminal device to display each set of bid information for the advertisement frame so that a set of bid information accepted from a predetermined advertiser is distinguished from a set of bid information accepted from another advertiser.

7. The advertisement server device as claimed in claim 4, wherein the bid advertisement frame display means causes the advertiser terminal device to display the bid status of each of the advertisement frames in chronological order of advertisement placement periods.

8. The advertisement server device as claimed in claim 1, wherein the bid information registration page includes a bid advertisement frame display page for displaying one or more advertisement frames corresponding to the search word so as to be designatable by the advertiser, and a bid amount entry page for entering a bid amount for the advertisement frame designated by the advertiser from the bid advertisement frame display page, and wherein the bid advertisement frame display means generates the bid information registration page so that the advertisement frame is designated by performing a click operation on the advertisement frame on the bid advertisement frame display page, and the bid amount entry page for the designated advertisement frame is displayed.

9. The advertisement server device as claimed in claim 8, wherein the bid advertisement frame display means causes a bid status of the advertisement frame designated from the bid advertisement frame display page, to be displayed in a form of a calendar on the bid amount entry page.

10. The advertisement server device as claimed in claim 9, wherein the bid advertisement frame display means generates the bid amount entry page so that an advertisement placement period of each set of bid information stored in the storage means for the advertisement frame is displayed on the calendar indicating the bid status of the designated advertisement frame in the bid amount entry page, and a drag operation of a period designating an advertisement placement period for the bid amount entered in the bid amount entry page for the advertisement frame is performed on the calendar to set the advertisement placement period for the bid amount.

11. The advertisement server device as claimed in claim 1, comprising a charge management means for, based at least on a bid amount of each advertisement frame, computing a charge amount to the advertiser for displaying advertisement content in the advertisement frame, and also restricting the charge amount based on a predetermined upper limit.

12. The advertisement server device as claimed in claim 11, wherein the upper limit is a predetermined maximum charge amount set for the advertisement frame, and the maximum charge amount is settable in the bid information registration page, and wherein, when the charge amount for displaying the advertisement content in the advertisement frame becomes not less than the maximum charge amount set for the advertisement frame, the charge management means halts the display of the advertisement content in the advertisement frame.

13. The advertisement server device as claimed in claim 11, wherein the charge amount is a value obtained by multiplying the bid amount of the advertisement frame by a number of clicks on the advertisement content displayed in the advertisement frame on the search result page, the upper limit is a predetermined maximum number of clicks set beforehand as an upper limit of the number of clicks, and the maximum number of clicks is settable in the bid information registration page, and wherein, when the number of clicks on the advertisement content displayed in the advertisement frame becomes not less than the maximum number of clicks set for the advertisement frame, the charge management means halts the display of the advertisement content in the advertisement frame.

14. The advertisement server device as claimed in claim 12, wherein, when display of predetermined advertisement content in the advertisement frame is halted by the charge management means, the successful bid determination means performs a process of determining a successful bid while excluding, from the extracted set of bid information, a set of bid information relating to the advertisement content the display of which in the advertisement frame is halted by the charge management means.

15. The advertisement server device as claimed in claim 14, wherein the bid advertisement frame display means causes the advertiser terminal device to display, as the bid status of each of the advertisement frames, whether or not the upper limit for restricting the charge amount is set for advertisement content of each set of bid information stored in the storage means for the advertisement frame.

16. An advertisement display method comprising:
- a search result page generation step of generating, according to a search word transmitted from a user terminal device via a network, a search result page to which advertisement content relevant to the search word is added and which displays the advertisement content in a predetermined layout stored in a page database;
- a search result provision step of transmitting the search result page to the user terminal device;
- a search word acceptance step of accepting a search word transmitted from an advertiser terminal device;
- a bid advertisement frame display step of generating a bid information registration page for causing the advertiser terminal device to display a plurality of advertisement frames each of which corresponds to the search word accepted in the search word acceptance step and each of which has a specified display position on the search result page that is substantially the same as the predetermined layout stored in the page database, together with bid statuses for the advertisement frames;
- a bid amount acceptance step of accepting a bid amount for an advertisement placement period, for one or more of the plurality of advertisement frames displayed by the advertiser terminal device, each such bid amount being applied in a fixed manner for one of the one or more of the plurality of advertisement frames, wherein such bid amount is incapable of being applied to a different advertisement frame other than the advertisement frame designated by the advertiser terminal device;
- a storage step of, every time a bid amount is accepted, storing information for specifying an advertiser, the search word, the designated advertisement frame, the advertisement placement period, the bid amount, and advertisement content in a storage means in association with each other, as a set of bid information;
- an advertisement frame extraction step of, when the search word transmitted from the user terminal device is accepted, referencing the storage means, and extracting the plurality of advertisement frames associated with the search word;
- a successful bid determination step of, at a time of accepting the search word transmitted from the user terminal device, extracting, for each advertisement frame of the plurality of advertisement frames extracted in the advertisement frame extraction step, each set of bid information the advertisement placement period of which contains the time from among sets of bid information for the one or more of the plurality of advertisement frames stored in the storage means, and determining that the advertisement frame is successfully bid with a highest bid amount included in the extracted set of bid information; and
- an advertisement extraction step of extracting advertisement content associated with each of the one or more of the plurality of advertisement frames for which a successful bid is determined in the successful bid determination step, as the advertisement content to be added to the search result page,
- wherein said predetermined layout includes at least size and display position information for each of the plurality of advertisement frames, each of said advertisement frames having a specified size and display position on said search result page that is substantially the same as the predetermined layout stored in the page database, and said user terminal device and said advertiser terminal device both access said predetermined layout stored in said page database, such that a relative size and positional relationship of said plurality of advertisement frames displayed on said advertiser terminal device during said bidding operation is substantially in the same layout as in the search result page displayed on the user terminal device which is generated for the user at a time of search.

17. An advertisement server program embodied in a non-transitory computer readable storage medium storing said server program, the advertisement server program having a function for causing a computer to execute:
- a search result page generation process of generating, according to a search word transmitted from a user terminal device via a network, a search result page to which advertisement content relevant to the search word is added and which displays the advertisement content in a predetermined layout stored in a page database;
- a search result provision process of transmitting the search result page to the user terminal device;
- a search word acceptance process of accepting a search word transmitted from an advertiser terminal device;
- a bid advertisement frame display process of generating a bid information registration page for causing the advertiser terminal device to display a plurality of advertisement frames each of which corresponds to the search word accepted in the search word acceptance process and each of which has a specified display position on the search result page that is substantially the same as the predetermined layout stored in the page database, together with bid statuses for the advertisement frames;
- a bid amount acceptance process of accepting a bid amount for an advertisement placement period, for one or more of the plurality of advertisement frames displayed by the advertiser terminal device, each such bid amount being applied in a fixed manner for one of the one or more of the plurality of advertisement frames, wherein such bid amount is incapable of being applied to a different advertisement frame other than the advertisement frame designated by the advertiser terminal device;
- a storage process of, every a bid amount is accepted, storing information for specifying an advertiser, the search word, the designated advertisement frame, the advertisement placement period, the bid amount, and advertisement content in a storage means in association with each other, as a set of bid information;
- an advertisement frame extraction process of, when the search word transmitted from the user terminal device is accepted, referencing the storage means, and extracting the plurality of advertisement frames associated with the search word;

a successful bid determination process of, at a time of accepting the search word transmitted from the user terminal device, extracting, for each advertisement frame of the plurality of advertisement frames extracted by the advertisement frame extraction process, each set of bid information the advertisement placement period of which contains the time from among sets of bid information for the one or more of the plurality of advertisement frames stored in the storage process, and determining that the advertisement frame is successfully bid with a highest bid amount included in the extracted set of bid information; and an advertisement extraction process of extracting advertisement content associated with each of the one or more of the plurality of advertisement frames for which a successful bid is determined in the successful bid determination process, as the advertisement content to be added to the search result page, wherein said predetermined layout includes at least size and display position information for each of the plurality of advertisement frames, each of said advertisement frames having a specified size and display position on said search result page that is substantially the same as the predetermined layout stored in the page database, and the server program enables said user terminal device and said advertiser terminal device to both access said predetermined layout stored in said page database, such that a relative size and positional relationship of said plurality of advertisement frames displayed on said advertiser terminal device during said bidding operation is substantially in the same layout as in the search result page displayed on the user terminal device which is generated for the user at a time of search.

18. The advertisement server device as claimed in claim 1, wherein, for each of the advertisement frames, the bid advertisement frame display means overlap-displays the sets of bid information while shifting the sets of bid information associated with each advertisement frame in position by a predetermined distance based on bid amounts stored in the storage means, a set of bid information of an advertiser currently in a bidding operation being displayed distinguishably from a set of bid information of an other advertiser.

19. The advertisement display method as claimed in claim 16, wherein, for each of the advertisement frames, the bid advertisement frame display step overlap-displays the sets of bid information while shifting the sets of bid information associated with each advertisement frame in position by a predetermined distance based on bid amounts stored in the storage step, a set of bid information of an advertiser currently in a bidding operation being displayed distinguishably from a set of bid information of an other advertiser.

20. The advertisement server program as claimed in claim 17, wherein, for each of the advertisement frames, the bid advertisement frame display process overlap-displays the sets of bid information while shifting the sets of bid information associated with each advertisement frame in position by a predetermined distance based on bid amounts stored in the storage process, a set of bid information of an advertiser currently in a bidding operation being displayed distinguishably from a set of bid information of an other advertiser.

* * * * *